US011921339B2

(12) United States Patent
Sedor et al.

(10) Patent No.: US 11,921,339 B2
(45) Date of Patent: Mar. 5, 2024

(54) OPTICAL DISTRIBUTION AND SPLICE FRAME INCLUDING VERTICAL CABLE MANAGERS

(71) Applicant: Panduit Corp., Tinley Park, IL (US)

(72) Inventors: Thomas M. Sedor, Orland Park, IL (US); Max W. Hibner, Glenview, IL (US); Michael R. Walters, Chicago, IL (US); Alex C. Brouwer, New Lenox, IL (US); Michael Mayo, New Lenox, IL (US); Bon B. Sledzinski, Westmont, IL (US); Benjamin J. Berridge, Griffith, IN (US)

(*) Notice: Subject to any disclaimer, the term of this patent is extended or adjusted under 35 U.S.C. 154(b) by 140 days.

(21) Appl. No.: 17/477,874

(22) Filed: Sep. 17, 2021

(65) Prior Publication Data

US 2022/0082776 A1    Mar. 17, 2022

Related U.S. Application Data

(60) Provisional application No. 63/079,739, filed on Sep. 17, 2020, provisional application No. 63/231,457, filed on Aug. 10, 2021.

(51) Int. Cl.
*G02B 6/00* (2006.01)
*G02B 6/38* (2006.01)
*G02B 6/44* (2006.01)

(52) U.S. Cl.
CPC ........ *G02B 6/4452* (2013.01); *G02B 6/3825* (2013.01); *G02B 6/4455* (2013.01)

(58) Field of Classification Search
CPC .. G02B 6/4452; G02B 6/3825; G02B 6/4455; G02B 6/00
See application file for complete search history.

(56) References Cited

U.S. PATENT DOCUMENTS

| 3,944,176 | A | 3/1976 | Danko |
|---|---|---|---|
| 4,619,428 | A | 10/1986 | Bailey |
| 4,715,502 | A | 12/1987 | Salmon |
| 4,792,203 | A | 12/1988 | Nelson et al. |
| 4,899,892 | A | 2/1990 | Rheault |
| 4,964,020 | A | 10/1990 | Savage et al. |
| 5,284,254 | A | 2/1994 | Rinderer |
| 5,311,612 | A | 5/1994 | Vincent et al. |
| 5,339,379 | A | 8/1994 | Kutsch et al. |
| 5,511,144 | A | 4/1996 | Hawkins et al. |
| 5,553,183 | A | 9/1996 | Bechamps |
| 5,613,030 | A | 3/1997 | Hoffer et al. |
| 5,640,482 | A | 6/1997 | Barry et al. |
| 5,758,002 | A | 5/1998 | Walters |
| 5,819,956 | A | 10/1998 | Rinderer |

(Continued)

FOREIGN PATENT DOCUMENTS

| EP | 1166161 A2 | 1/2002 |
|---|---|---|
| EP | 2871505 A1 | 5/2015 |

(Continued)

*Primary Examiner* — Jennifer Doan

(57) ABSTRACT

An optical distribution and splice frame system includes rack(s), enclosure(s), cable management component(s), and/or cassette(s) that have features to allow for different cable management configurations not yet available in the market. A fiber optic cassette and enclosure are designed to enable flexibility in cable management configurations for the overall system.

9 Claims, 64 Drawing Sheets

(56) References Cited

U.S. PATENT DOCUMENTS

| | | |
|---|---|---|
| 5,934,485 A | 8/1999 | Harris et al. |
| 5,975,315 A | 11/1999 | Jordan |
| 6,179,133 B1 | 1/2001 | Reece |
| 6,201,919 B1 | 3/2001 | Puetz et al. |
| 6,256,444 B1 | 7/2001 | Bechamps et al. |
| 6,279,756 B1 | 8/2001 | Walter et al. |
| 6,321,917 B1 | 11/2001 | Mendoza |
| 6,347,714 B1 | 2/2002 | Fournier et al. |
| 6,362,422 B1 | 3/2002 | Vavrik et al. |
| 6,468,112 B1 | 10/2002 | Follingstad et al. |
| 6,501,899 B1 | 12/2002 | Marrs et al. |
| 6,504,988 B1 | 1/2003 | Trebesch et al. |
| 6,561,602 B1 | 5/2003 | Sevier et al. |
| 6,584,267 B1 | 6/2003 | Caveney et al. |
| 6,600,107 B1 | 7/2003 | Wright et al. |
| 6,614,978 B1 | 9/2003 | Caveney |
| 6,915,057 B2 | 7/2005 | Vincent et al. |
| 6,918,796 B2 | 7/2005 | Elliot et al. |
| 6,920,274 B2 | 7/2005 | Rapp et al. |
| 6,951,288 B2 | 10/2005 | Henderson |
| 7,083,051 B2 | 8/2006 | Smith et al. |
| 7,086,707 B2 | 8/2006 | Wyatt et al. |
| 7,218,828 B2 | 5/2007 | Feustel et al. |
| 7,298,951 B2 | 11/2007 | Smrha et al. |
| 7,310,471 B2 | 12/2007 | Bayazit et al. |
| 7,376,321 B2 | 5/2008 | Bolster et al. |
| 7,431,610 B2 | 10/2008 | Laursen |
| 7,437,048 B2 | 10/2008 | Farrell et al. |
| 7,513,374 B2 | 4/2009 | Smith et al. |
| 7,570,860 B2 | 8/2009 | Smrha et al. |
| 7,570,861 B2 | 8/2009 | Smrha et al. |
| 7,637,771 B2 | 12/2009 | Laursen |
| 7,677,400 B2 | 3/2010 | Bayazit et al. |
| 7,748,541 B2 | 7/2010 | Smith et al. |
| 7,873,252 B2 | 1/2011 | Smrha et al. |
| 7,873,253 B2 | 1/2011 | Smrha et al. |
| 7,874,443 B2 | 1/2011 | Levesque et al. |
| 7,973,242 B2 | 7/2011 | Jones et al. |
| 7,974,105 B2 | 7/2011 | Dean, Jr. et al. |
| 8,273,989 B2 | 9/2012 | Garza et al. |
| 8,280,216 B2 | 10/2012 | Cooke et al. |
| 8,290,331 B2 | 10/2012 | Redmann et al. |
| 8,340,490 B2 | 12/2012 | Smrha et al. |
| 8,344,247 B2 * | 1/2013 | Sayres .................... H02G 3/32 |
| | | 174/72 A |
| 8,346,044 B2 | 1/2013 | Smrha et al. |
| 8,351,753 B2 | 1/2013 | Taylor |
| 8,385,711 B2 | 2/2013 | Fabrykowski et al. |
| 8,403,154 B2 | 3/2013 | Smith et al. |
| 8,424,691 B2 | 4/2013 | McMillian, III et al. |
| 8,443,171 B2 | 4/2013 | Cooke et al. |
| 8,437,147 B2 | 5/2013 | Dean, Jr. et al. |
| 8,452,148 B2 | 5/2013 | Cooke et al. |
| 8,457,464 B2 | 6/2013 | O'Connor |
| 8,538,226 B2 | 9/2013 | Makrides-Saravanos et al. |
| 8,705,926 B2 | 4/2014 | Giraud et al. |
| 8,705,927 B2 | 4/2014 | Krampotich et al. |
| 8,712,206 B2 | 4/2014 | Cooke et al. |
| 8,744,229 B2 | 6/2014 | Geens et al. |
| 8,867,884 B2 | 10/2014 | Smrha et al. |
| 8,873,922 B2 | 10/2014 | Kowalczyk et al. |
| 8,899,424 B2 | 12/2014 | Bayazit et al. |
| 8,953,921 B2 | 2/2015 | Smrha et al. |
| 8,989,547 B2 | 3/2015 | Brouwer et al. |
| 9,020,320 B2 | 4/2015 | Cooke et al. |
| 9,057,859 B2 | 6/2015 | Solheid et al. |
| 9,069,150 B2 | 6/2015 | Solheid et al. |
| 9,097,871 B2 | 8/2015 | Smrha et al. |
| 9,128,262 B2 | 9/2015 | Campbell et al. |
| 9,170,391 B2 | 10/2015 | Holmberg et al. |
| 9,207,422 B2 | 12/2015 | Ray et al. |
| 9,213,363 B2 | 12/2015 | Anderson et al. |
| 9,329,353 B2 | 5/2016 | Solheid et al. |
| 9,354,416 B2 | 5/2016 | Solheid et al. |
| 9,372,318 B2 | 6/2016 | Veatch et al. |
| 9,383,538 B2 | 7/2016 | Giraud et al. |
| 9,423,585 B2 | 8/2016 | Timmins et al. |
| 9,435,916 B2 | 9/2016 | Smrha et al. |
| 9,435,974 B2 | 9/2016 | Smrha et al. |
| 9,448,378 B2 | 9/2016 | Smrha et al. |
| 9,448,379 B2 | 9/2016 | Smrha et al. |
| 9,448,796 B2 | 11/2016 | Smrha et al. |
| 9,494,758 B2 | 11/2016 | Holmberg et al. |
| 9,523,833 B2 | 12/2016 | Campbell et al. |
| 9,541,725 B2 | 1/2017 | Holmberg et al. |
| 9,548,597 B2 | 1/2017 | Vacca et al. |
| 9,575,275 B2 | 2/2017 | Blackwell, Jr. et al. |
| 9,638,879 B2 | 5/2017 | Smrha et al. |
| 9,638,880 B2 | 5/2017 | Smrha et al. |
| 9,645,342 B2 | 5/2017 | Smrha et al. |
| 9,678,294 B2 | 6/2017 | Yin et al. |
| 9,678,296 B2 | 6/2017 | Krampotich et al. |
| 9,690,064 B2 | 6/2017 | Sauter et al. |
| 9,690,066 B2 | 6/2017 | Smrha et al. |
| 9,703,059 B2 | 7/2017 | Smrha et al. |
| 9,709,764 B2 | 7/2017 | Smrha et al. |
| 9,715,075 B2 | 7/2017 | Solheid et al. |
| 9,810,869 B2 | 11/2017 | Campbell et al. |
| 9,817,201 B2 | 11/2017 | Lee et al. |
| 9,851,524 B2 | 12/2017 | Vongseng et al. |
| 9,910,236 B2 | 3/2018 | Cooke et al. |
| 9,977,212 B2 | 5/2018 | Holmberg et al. |
| 9,977,213 B2 | 5/2018 | Holmberg et al. |
| 9,995,897 B2 | 6/2018 | Smrha et al. |
| 10,025,055 B2 | 7/2018 | Alexi et al. |
| 10,082,635 B2 | 9/2018 | Feng et al. |
| 10,094,996 B2 | 10/2018 | Cooke et al. |
| 10,120,153 B2 | 11/2018 | Cooke et al. |
| 10,126,514 B2 | 11/2018 | Cooke et al. |
| 10,146,023 B2 | 12/2018 | Douglas et al. |
| 10,203,464 B1 | 2/2019 | Smrha et al. |
| 10,209,470 B2 | 2/2019 | Geling et al. |
| 10,209,471 B2 | 2/2019 | Campbell et al. |
| 10,222,570 B2 | 3/2019 | Cooke et al. |
| 10,261,281 B2 | 4/2019 | Geens et al. |
| 10,295,773 B2 | 5/2019 | Leonard et al. |
| 10,310,204 B2 | 6/2019 | Smrha et al. |
| 10,416,405 B2 | 9/2019 | Cooke et al. |
| 10,422,971 B2 | 9/2019 | Cooke et al. |
| 10,437,000 B2 | 10/2019 | Holmberg et al. |
| 10,444,456 B2 | 10/2019 | Cooke et al. |
| 10,459,184 B2 | 10/2019 | Cooke et al. |
| 10,473,874 B2 | 11/2019 | Smrha et al. |
| 10,481,357 B2 | 11/2019 | Holmberg et al. |
| 10,509,190 B2 | 12/2019 | Alexi et al. |
| 10,545,306 B2 | 1/2020 | Geling et al. |
| 10,545,307 B2 | 1/2020 | Vongseng et al. |
| 10,564,378 B2 | 2/2020 | Cooke et al. |
| 10,585,258 B2 | 3/2020 | Wentworth et al. |
| 10,606,011 B2 | 3/2020 | Sedor et al. |
| 10,606,014 B2 | 3/2020 | Cooke et al. |
| 10,656,320 B2 | 5/2020 | Tanabe et al. |
| 10,670,822 B2 | 6/2020 | Vogel |
| 10,678,010 B2 | 6/2020 | Solheid et al. |
| 10,690,874 B2 | 6/2020 | Haataja |
| 10,718,919 B2 | 7/2020 | Courchaine et al. |
| 10,718,920 B2 | 7/2020 | Ellison et al. |
| 10,732,371 B2 | 8/2020 | Campbell et al. |
| 10,739,544 B2 | 8/2020 | Smrha et al. |
| 10,809,480 B1 | 10/2020 | Cox et al. |
| 10,845,561 B1 | 11/2020 | Courchaine et al. |
| 10,852,499 B2 | 12/2020 | Cooke et al. |
| 10,859,782 B2 | 12/2020 | Grunwald et al. |
| 10,969,553 B2 | 4/2021 | Smrha et al. |
| 11,086,089 B2 | 8/2021 | Cooke et al. |
| 11,092,767 B2 | 8/2021 | Cooke et al. |
| 2003/0185535 A1 | 10/2003 | Tinuucci et al. |
| 2004/0094491 A1 | 5/2004 | Smith et al. |
| 2004/0099771 A1 | 5/2004 | Schloss |
| 2006/0043031 A1 | 3/2006 | Rinderer |
| 2006/0228086 A1 | 10/2006 | Holmberg et al. |
| 2010/0110621 A1 | 5/2010 | Dunn et al. |
| 2010/0193754 A1 | 8/2010 | Garza et al. |
| 2010/0195969 A1 | 8/2010 | Kennedy et al. |

(56) References Cited

U.S. PATENT DOCUMENTS

| | | |
|---|---|---|
| 2010/0322580 A1 | 12/2010 | Beamon et al. |
| 2012/0134639 A1 | 5/2012 | Giraud et al. |
| 2012/0234778 A1 | 9/2012 | Anderson et al. |
| 2013/0287357 A1 | 10/2013 | Solheid et al. |
| 2014/0133822 A1 | 5/2014 | De Los Santos Campos et al. |
| 2014/0348467 A1 | 11/2014 | Cote et al. |
| 2014/0348480 A1 | 11/2014 | Giraud et al. |
| 2015/0071597 A1 | 3/2015 | Beamon et al. |
| 2015/0268436 A1 | 9/2015 | Blackwell, Jr. et al. |
| 2016/0174402 A1* | 6/2016 | Krietzman ............... H05K 7/18 211/26.2 |
| 2017/0153399 A1 | 6/2017 | Rodriguez |
| 2019/0072736 A1 | 3/2019 | Glatzl et al. |
| 2019/0098790 A1* | 3/2019 | Mordick ............... H05K 7/1491 |
| 2020/0132957 A1 | 4/2020 | Beri et al. |
| 2020/0142147 A1 | 5/2020 | Alexi et al. |
| 2020/0158976 A1 | 5/2020 | Holmberg et al. |
| 2020/0233169 A1 | 7/2020 | Geling et al. |
| 2020/0241227 A1 | 7/2020 | Smrha et al. |
| 2020/0241228 A1 | 7/2020 | Smrha et al. |
| 2020/0249408 A1 | 8/2020 | Smrha et al. |
| 2020/0249409 A1 | 8/2020 | Smrha et al. |
| 2020/0249410 A1 | 8/2020 | Smrha et al. |
| 2020/0371303 A1 | 11/2020 | Haataja |
| 2021/0003799 A1 | 1/2021 | Campbell et al. |
| 2021/0181447 A1 | 6/2021 | Van Baelen et al. |

FOREIGN PATENT DOCUMENTS

| | | |
|---|---|---|
| EP | 2929387 A1 | 10/2015 |
| EP | 2960697 A1 | 12/2015 |
| EP | 3018514 A1 | 5/2016 |
| WO | 2020043896 A1 | 3/2020 |
| WO | 2020043909 A1 | 3/2020 |
| WO | 2020043911 A1 | 3/2020 |
| WO | 2020043914 A1 | 3/2020 |
| WO | 2020043918 A1 | 3/2020 |
| WO | 2020152347 A1 | 7/2020 |

* cited by examiner

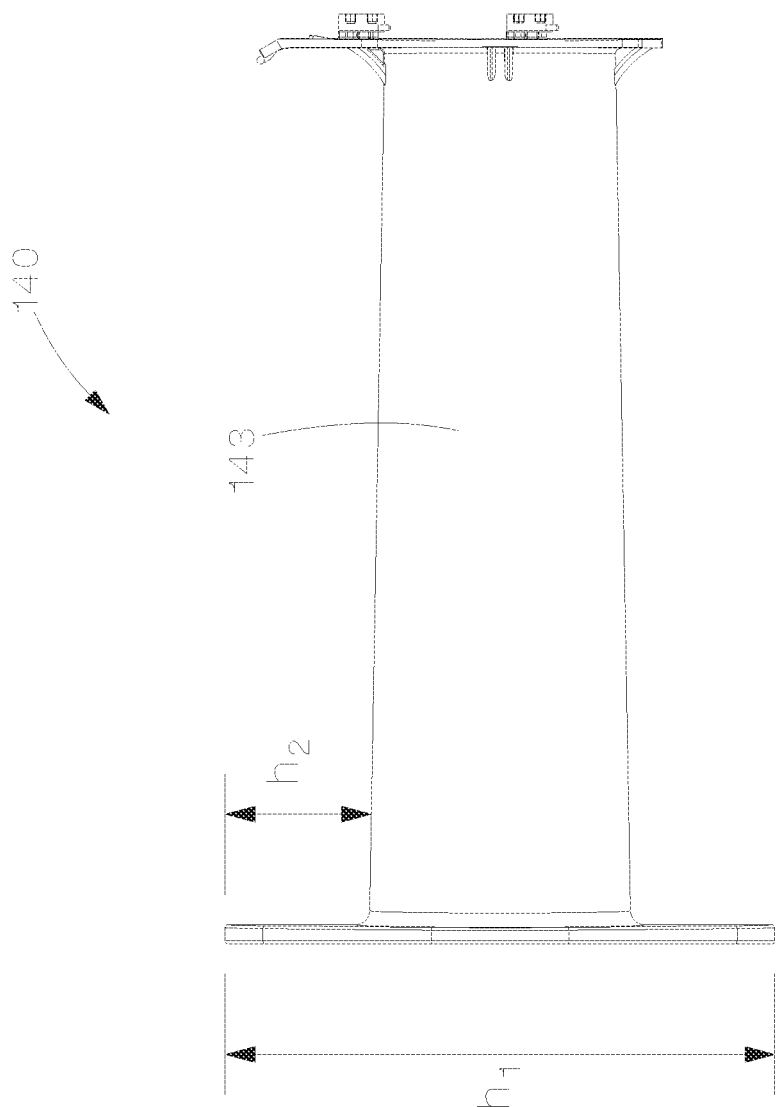
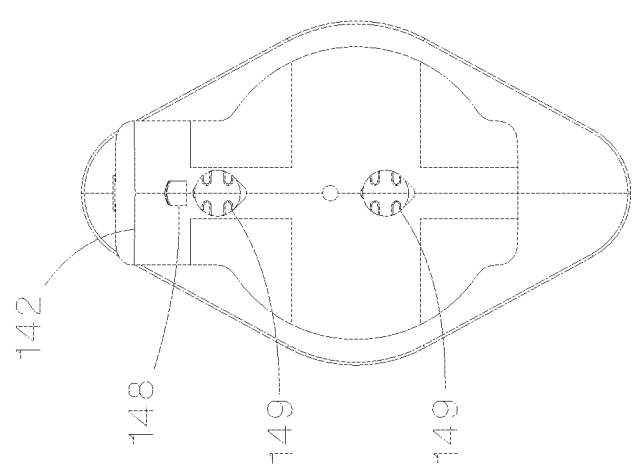
FIG. 57
FIG. 56

OPTICAL DISTRIBUTION AND SPLICE FRAME INCLUDING VERTICAL CABLE MANAGERS

CROSS-REFERENCE TO RELATED APPLICATIONS

This application claims benefit to U.S. Provisional Patent Application No. 63/079,739, filed Sep. 17, 2020, and to U.S. Provisional Patent Application No. 63/231,457, filed Aug. 10, 2021, the entirety of all of which are incorporated by reference herein.

BACKGROUND

Optical fibers allow for transmission of communications over longer distances and at higher bandwidths than wire cables. Optical fibers are also advantageous for communication systems because signals suffer less loss than wire cables and are immune to electromagnetic interference. Optical fibers are therefore often used for high bandwidth, long distance applications. One of the primary functions of a data center is to provide connections between incoming and outgoing optical fiber connections.

For example, an optical distribution and splice frame may be used to provide cable interconnections between a network provider and the facilities receiving the communications data. However, not all facilities are the same and may require different cable management configurations. Thus, a system that includes rack(s), enclosure(s), cable management component(s), and/or cassette(s) having the features to allow for different cable management configurations that are not yet available in the market may be advantageous.

SUMMARY

The present disclosure describes embodiments of a vertical cable manager for use in a optical distribution and splice frame system. The vertical cable manager provides enhanced cable management capabilities.

According to some embodiments, a cable management system is disclosed. The cable management system comprising a rack, an enclosure configured to be installed onto the rack, a vertical cable manager configured to be secured to a first side of the rack, the vertical cable manager comprising a first vertical panel including a plurality of apertures arranged in a predetermined pattern, a first management feature configured to attach to the first vertical panel via at least one of the plurality of apertures, and an incoming cable manager configured to secure to a second side of the rack, the incoming cable manager comprising a second vertical panel including a plurality of openings arranged in a predetermined pattern, and a second management feature configured to attach to the second vertical panel via at least one of the openings.

BRIEF DESCRIPTION OF THE DRAWINGS

FIG. 56 is a rear-side view of the spool shown in FIG. 55.

FIG. 57 is a side view of the spool shown in FIG. 55.

DETAILED DESCRIPTION

This disclosure describes embodiments of a cable management system (e.g., an optical distribution and/or splice frame system) including components that enable enhanced flexibility for installing and managing cables into unique configurations for use in a network environment. The front access features also provide the components to be mounted against a wall.

Figure 1:
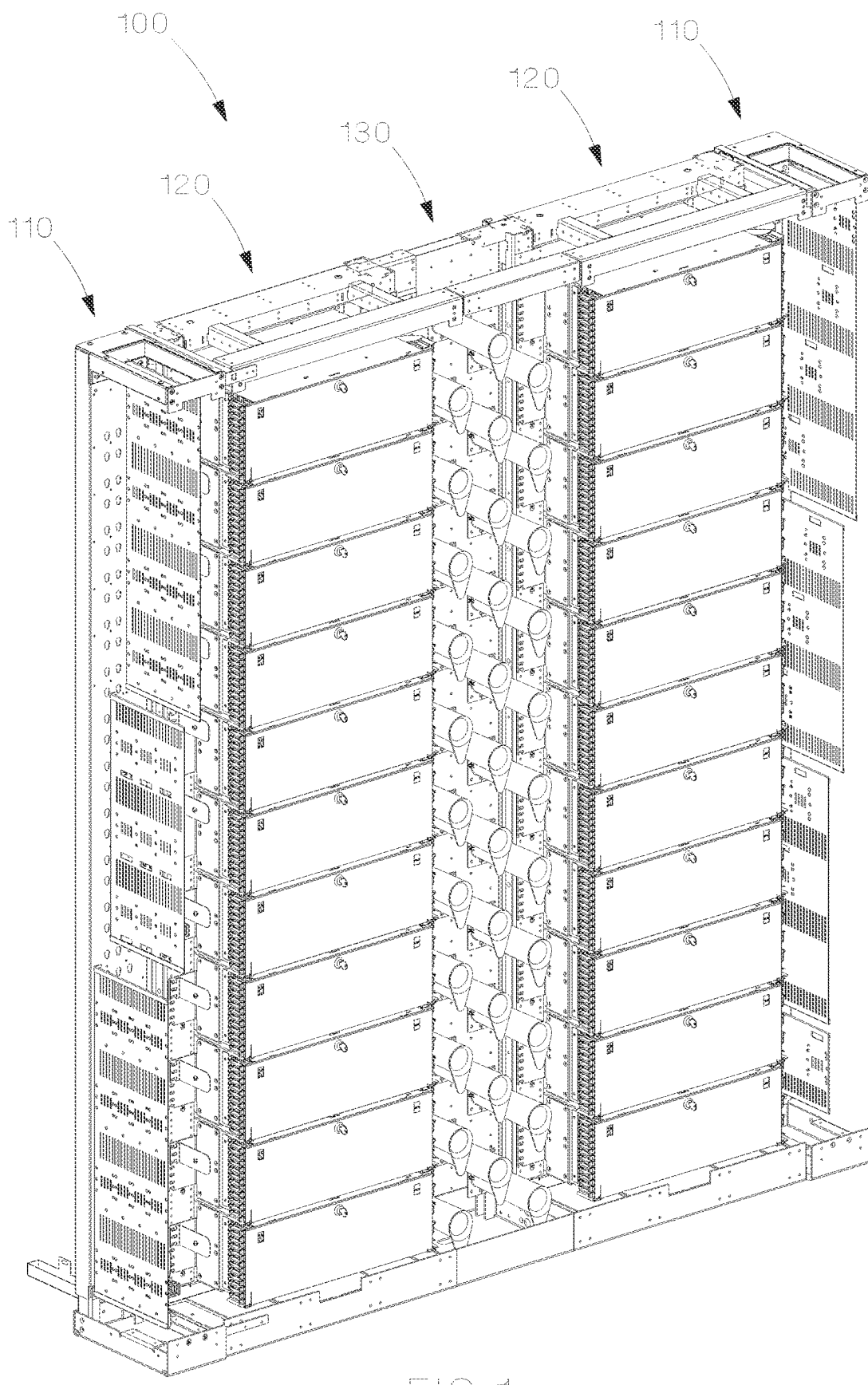
FIG. 1 is a front perspective view of a cable management system, according to some embodiments.

FIG. 1 shows an exemplary cable management system 100 comprising a vertical cable manager system 130, an enclosure rack system 120 secured to both sides of the vertical cable manager system 130, and an incoming cable management system 110 (e.g., including an end panel) secured to each of the enclosure rack system 120 at the outer ends. Each of the systems comprising the cable management system 100 may have a predetermined width to allow for standardized components and arrangements of components within the cable management system 100. For example, the vertical cable manager system 130 may have a width of 300 mm, the enclosure rack system 120 may have a width of 600 mm, and the incoming cable management system 110 may have a width of 150 mm. The cable management system 100 offers a level of standardized modularity that allows users to reliably plan their network systems, while also providing the flexibility of enhanced options that fit a wide range of network system design requirements that other more rigid systems cannot provide.

Figure 2:
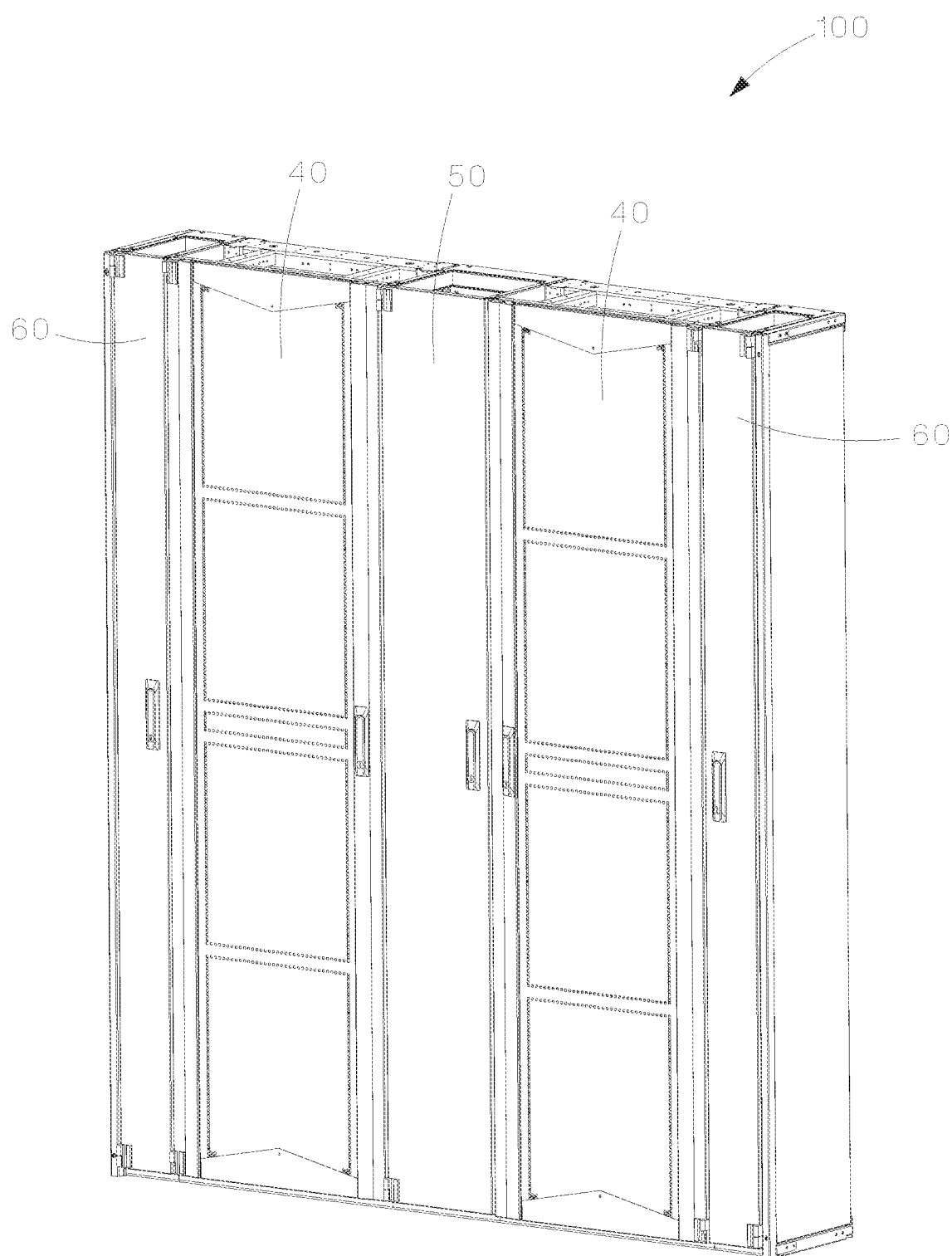
FIG. 2 is a front perspective view of the cable management system shown in FIG. 1 having doors attached, according to some embodiments.

FIG. 2 shows an exemplary embodiment where doors are attached to a front side of the cable management system 100. In particular, a door 40 is attached to a front side of the enclosure rack systems 120, a door 50 is attached to the vertical cable manager system 130, and a door 60 is attached to the incoming cable management systems 110.

Figure 3:
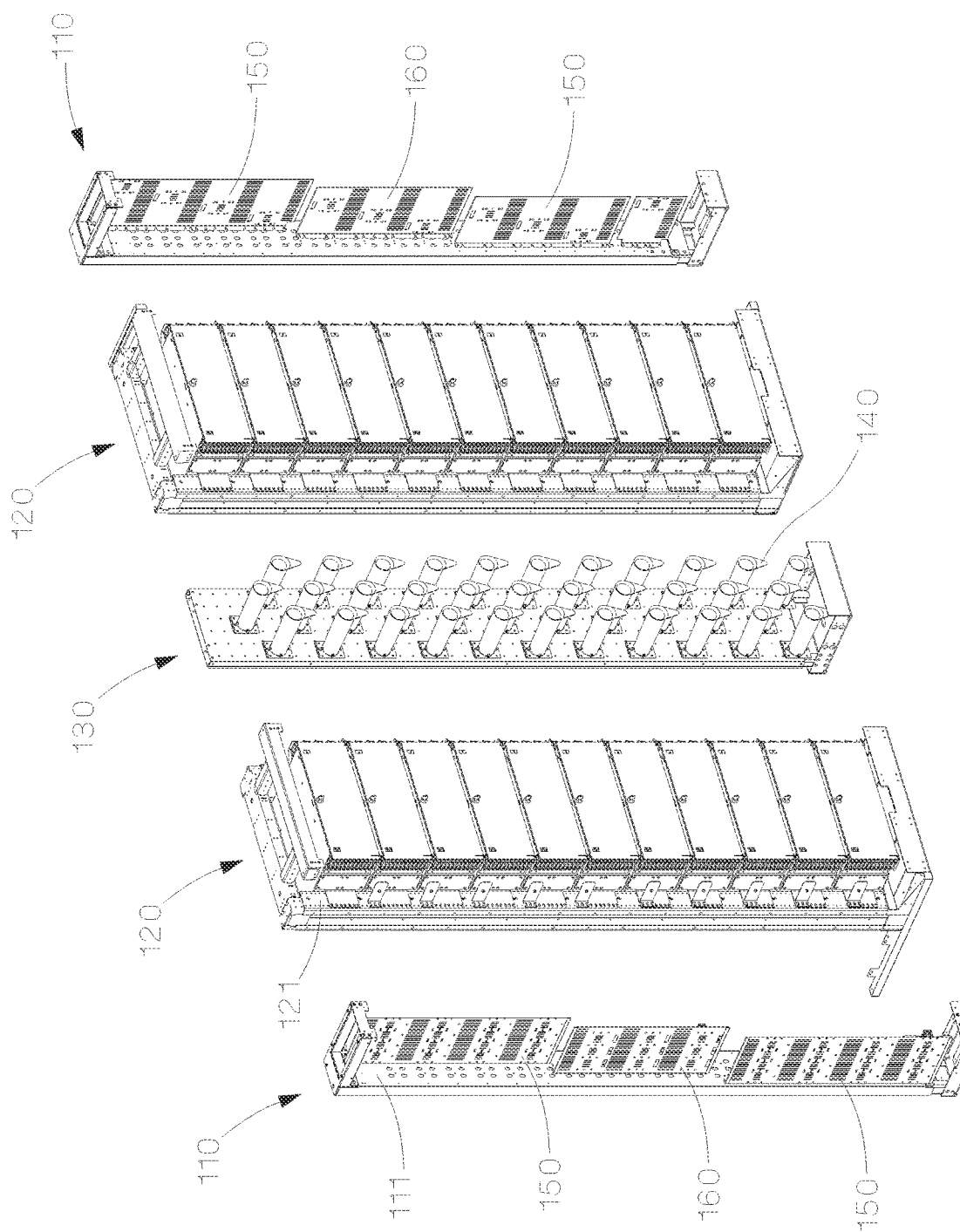
FIG. 3 is a partially exploded view showing the sub-systems that comprise the cable management system shown in FIG. 1, according to some embodiments.

FIG. 3 is a partially exploded view of the cable management system 100 showing each of the sub-systems that may comprise the cable management system 100. As illustrated, the vertical cable manager system 130 is positioned in a center portion of the cable management system 100, and one enclosure rack system 120 is secured to each side of the vertical cable manager system 130. Then to each remaining side of the enclosure rack system 120, an incoming cable management system 110 is secured to make up the outer ends of the cable management system 100. In this exemplary arrangement the overall width of the cable management system 100 is 1800 mm.

Incoming cables may work their way through the cable management system 100 by being received by the incoming cable management system 110 at a first end, routed to a cassette held by an enclosure in the adjacent enclosure rack system 120, routed out to the vertical cable manager system 130, routed to a cassette held by an enclosure in the adjacent enclosure rack system 120 at a second end (opposite the first end), then routed to the incoming cable management system 110 at the second end to be send to an intended destination. Specifically, the incoming cable management system 110 includes a vertical panel 111 that holds a number of cable plates 150, 160 for securing incoming cables into predetermined configurations, and the vertical cable manager system 130 includes a plurality of spools 140 for routing the cables from the first side enclosure rack system 120 to the second side enclosure rack system 120. For example, FIG. 3 shows a plurality of cable plates 150, 160 arranged into a staggered design from each other, and the spools 140 are arranged into a diamond offset design. The cable plate 160 is shown to have a smaller size (e.g., due to shorter height) than the cable plate 150.

The arrangement of the spools 140 may be according to a predetermined design to optimize organization of the cables, and/or for standardizing a travel distance for cables being routed through the cable management system 100. In other words, by using predetermined arrangements of spools 140 within a predetermined configuration of sub-systems in a cable management system (e.g., the 1800 mm cable management system 100 shown in FIGS. 1 and 3), the cable lengths for cables being routed through the cable management system 100 can be more accurately calculated. By standardizing a travel distance for cables being routed through the cable management system 100, pre-cut cables that are manufactured into predetermined (standardized) lengths for use in the cable management system 100 may be used, thus providing further ease in installation. Further description on the cable organization offered by the predetermined positioning of the cable plates 150 on the vertical panel 111 and the predetermined positioning of cable management accessories on the cable plates 150 will be provided in more detail below.

Figure 63:
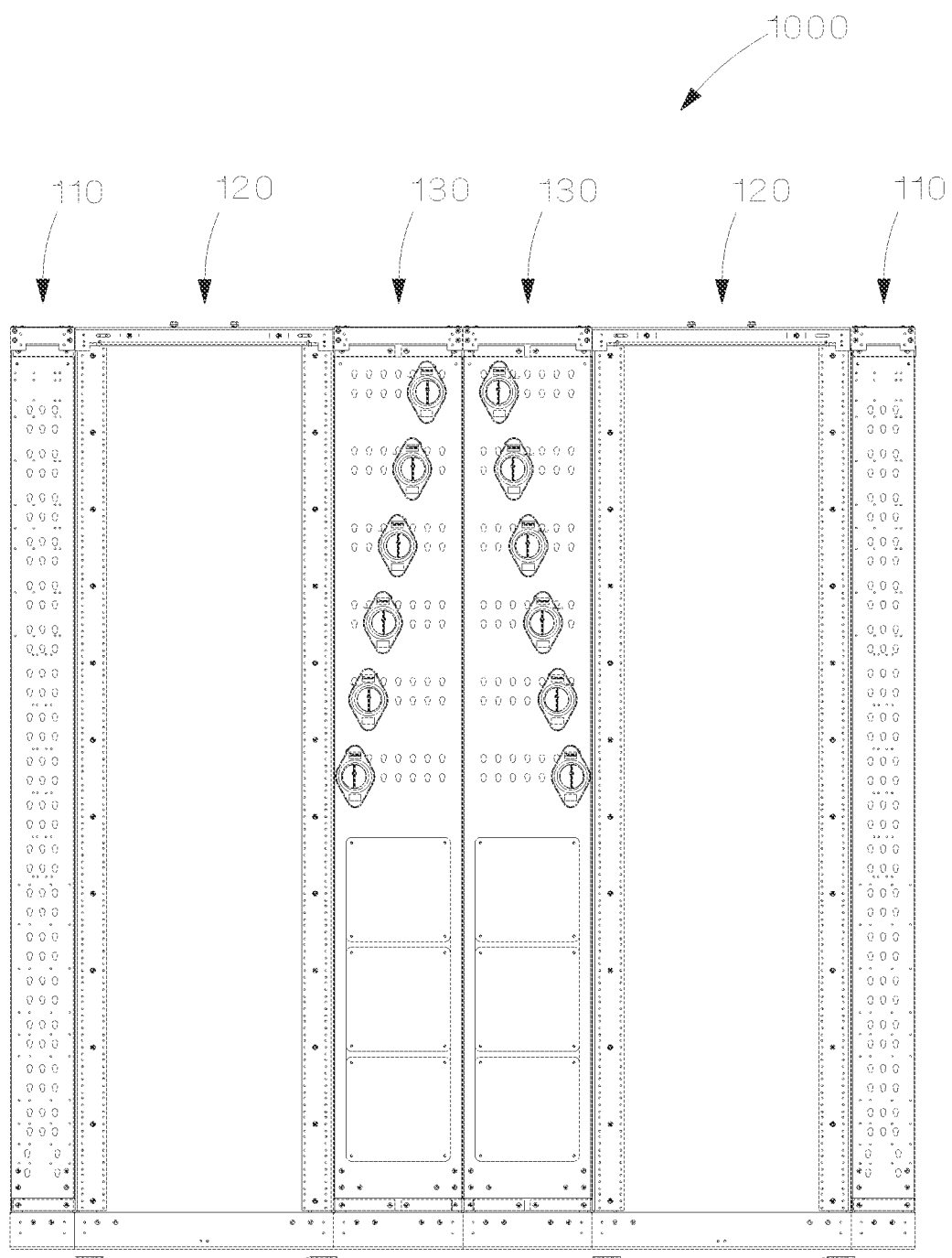
FIG. 63 is a front head-on view of a cable management system including an exemplary arrangement of two vertical cable managers, according to some embodiments.

According to other embodiments, other arrangements of the sub-systems are provided and enabled. For example, FIG. 63 shows an alternative embodiment of the cable management system 1000 where the center portion is comprised of two vertical cable manager systems 130 secured adjacent to each other. The added width provided by the two vertical cable management systems 130 within the center portion of the cable management system 1000 allows for different, and more, arrangements of spools 140 hanging from the vertical cable management system 130 that would not be possible when using just a single vertical cable manager 130 as in the cable management system 100 shown in FIG. 1. The overall width of the cable management system 1000 is increased to 2100 mm by adding the additional vertical cable manager 130.

Figure 4:
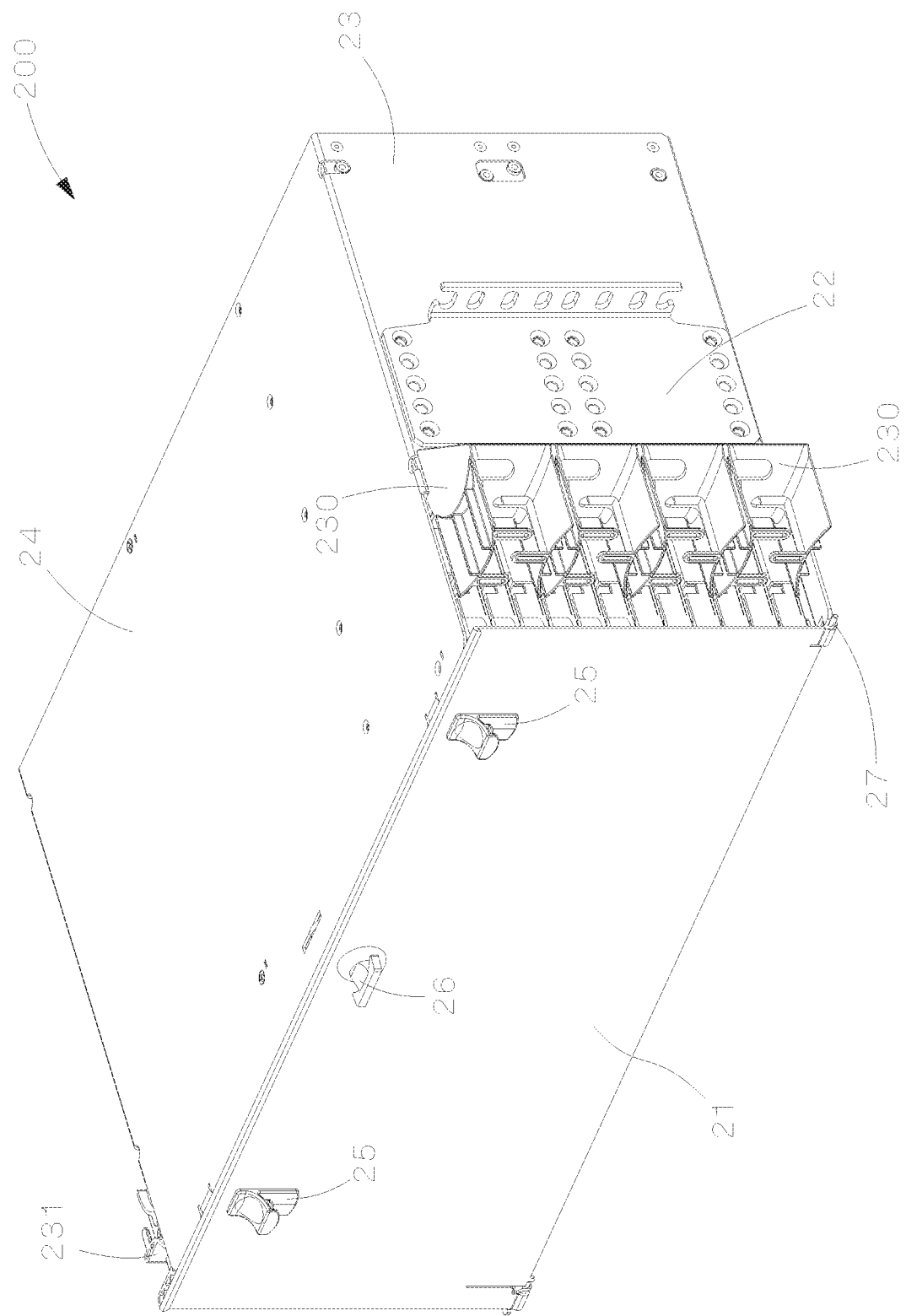
FIG. 4 is a front perspective view of a first exemplary enclosure that may be installed into the cable management system, according to some embodiments.

Further description of the components comprising the sub-systems of the cable management system 100 is now provided. FIG. 4 shows an exemplary enclosure 200 that may be installed into the enclosure rack system 120. The enclosure 200 is a 4 RU sized enclosure, although the enclosure 200 may be modified into other rack sized dimensions (e.g., 1 RU, 2 RU, 3 RU) by reducing a number of cassette tray rows according to other embodiments.

The enclosure 200 includes a front access door 21 located at a front side, where the front access door 21 rotates about a hinge 27 to open and closed positions. In the open position the front access door 21 rotates down to enable access into the enclosure 200, and in the closed position the front access door 21 rotates up to close off access into the enclosure 200. The front access door 21 includes two latches 25 located at opposite sides of the front access door 21, as well as a turning latch 26 acting as a locking mechanism and located at a center top of the front access door 21. The latches 26 may include latch hooks for attaching into latch openings on a top cover 24 of the enclosure 200. According to other embodiments, the turning latch 26 may be removed from its position at a center between the two latches 25, and be relocated to under one or both of the two latches 25.

Figure 5:
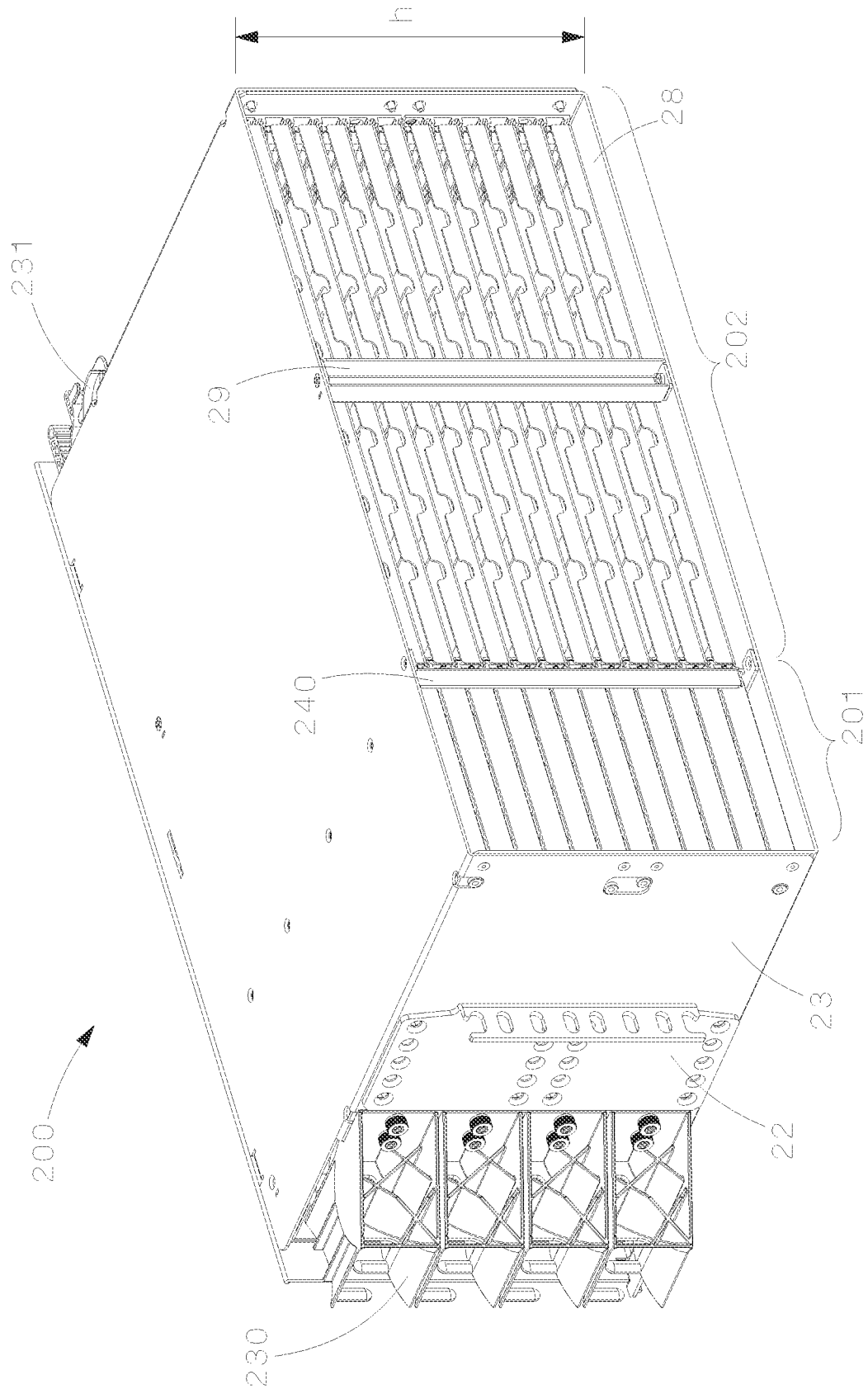
FIG. 5 is rear perspective view of the enclosure shown in FIG. 4.

The enclosure 200 also includes a housing comprised of two side walls 23 positioned at opposite ends to each other, a top cover 24 connecting the two side walls 23 at a top portion, and a bottom floor 28 (shown in FIG. 5). Mounting brackets 22 are secured to each side wall 23 and then used to secure the enclosure 200 to rack posts 121 included in the enclosure rack system 120. According to some embodiments, the mounting brackets 22 used for the enclosure 200 may be switched out for wider sized alternatives such as mounting brackets 32 shown on enclosure 300 in FIG. 21, to accommodate installation onto rail posts of the enclosure rack system 120. The enclosure 200 also includes a first type of outer cable manager 230 on one side, and a second type of outer cable manager 231 on a second (opposite) side. Depending on the positioning of the enclosure 200 relative to the vertical cable manager system 130 or other application use case considerations, the sides of the enclosure 200 on which the first type of outer cable manager 230 and the second type of outer cable manager 231 are secured may be swapped.

FIG. 5 shows a rear side of the enclosure 200 is left mainly open other than a stop brace 29 and a divider wall 240 for holding tray guides. The stop brace 29 is included at the rear of the enclosure 200 within the fiber cassette holding portion 202 to prevent the trays 210 from extending out through the rear opening. According to some embodiments, the stop brace 29 may not be included in the enclosure 200. As shown more clearly from the rear view of the enclosure 200, the enclosure 200 is partitioned into a dynamic cable slack manager portion 201 and a fiber cassette holding portion 202, where the two portions are divided by the divider wall 240. As the overall width of the enclosure 200 is 1 RU width (e.g., EIA standard 19" width), the width of the dynamic cable slack manager portion 201 is approximately ¼ RU width, while the width of the fiber cassette holding portion 202 is approximately ¾ RU width. Within the dynamic cable slack manager portion 201 are stored dynamic cable slack managers 220. Within the fiber cassette holding portion 202 are stored cassette trays 210 for holding cassettes. The cassette trays 210 are configured to hold a single triple wide cassette, or other combinations of single wide and double wide cassettes by using removable divider rail(s), as will be described in more detail herein.

Figure 6:
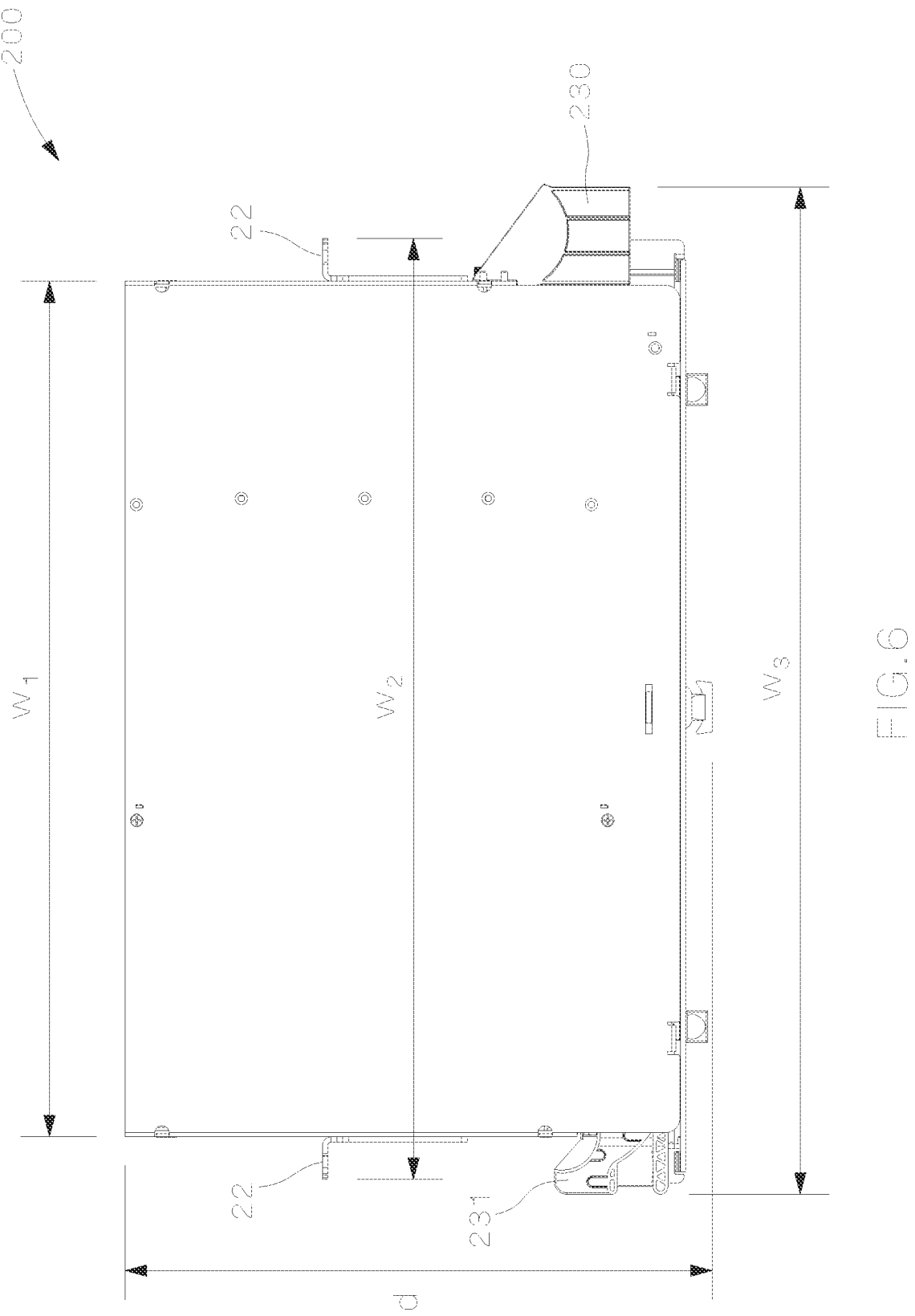
FIG. 6 is a top-down view of the enclosure shown in FIG. 4.

As the enclosure 200 is a 4 RU spaced enclosure, it has a standard RU width and a 4 RU height including 12 rows for trays holding cassettes. FIG. 6 is a top-down view of the enclosure 200 that provides some exemplary dimensional measurements. For example, a first width $w_1$ of the enclosure 200 measured from side wall 23 to side wall 23 is approximately 17-18 inches (e.g., 17.35 inches/440.58 mm), a second width $w_2$ measured from mounting bracket 22 to mounting bracket 22 is approximately 19-20 inches (e.g., 19.11 inches/485.51 mm), and a third width $w_3$ measured from the outer cable manager 230 to the outer cable manager 231 is approximately 20-21 inches (e.g., 20.48 inches/520.14 mm). A first depth d of the enclosure measured from the latch to a rear of the enclosure 200 is approximately 11-12 inches (e.g., 11.81 inches/299.91 mm).

Figure 7:
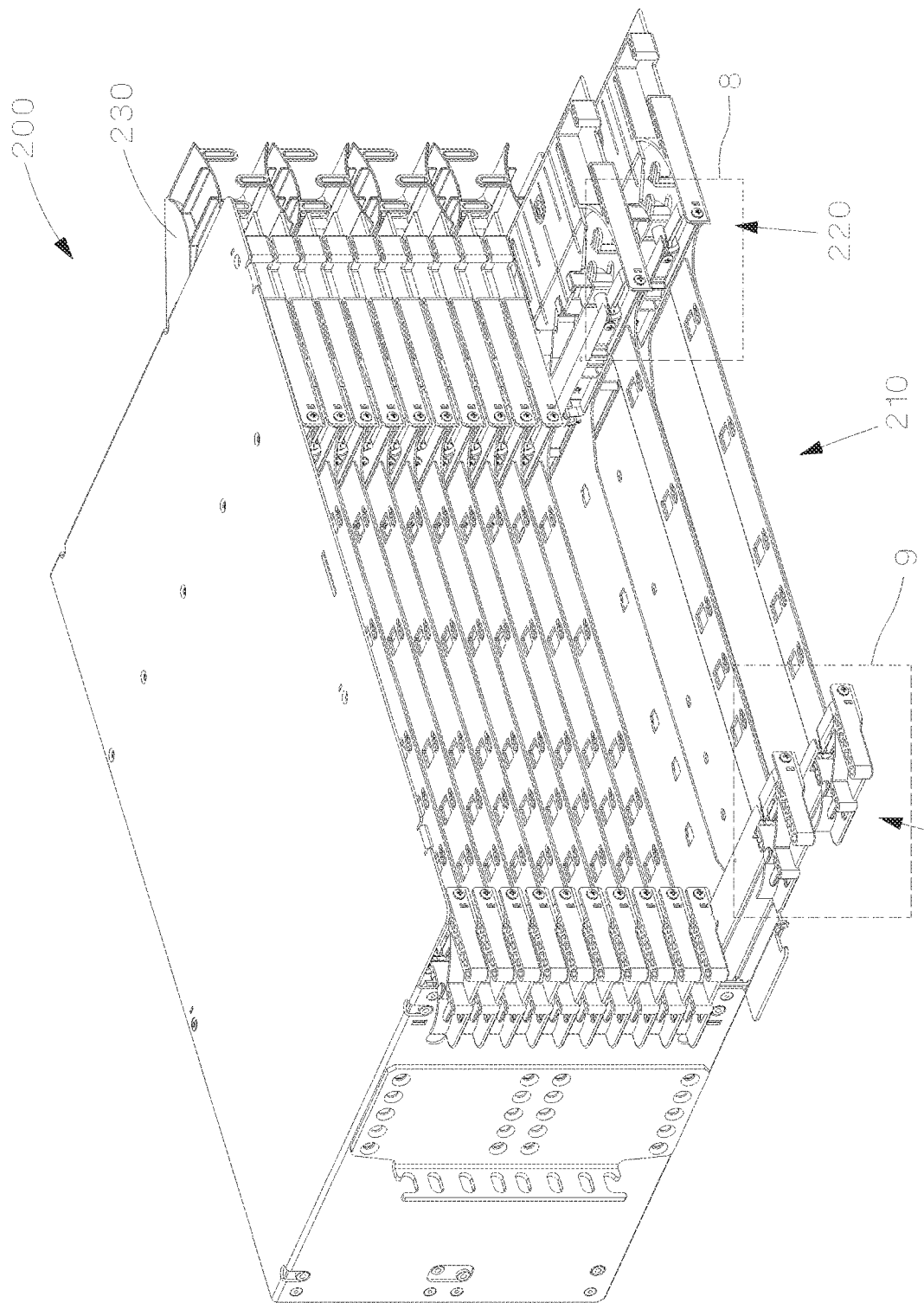
FIG. 7 is a front perspective view of the enclosure shown in FIG. 4 having trays pulled out in various states of use, according to some embodiments.
Figure 8:
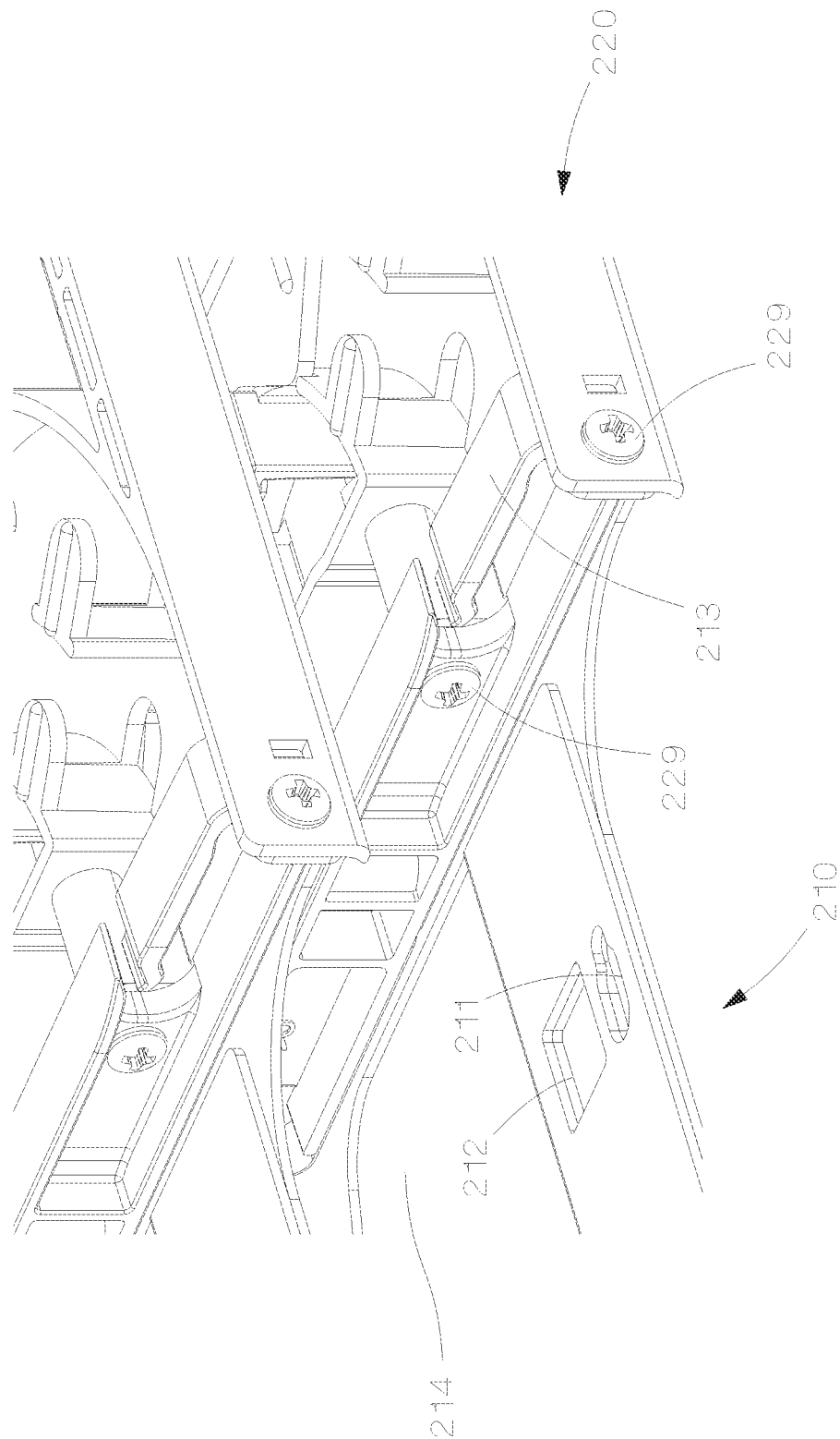
FIG. 8 is a close-up partial view of a portion in the enclosure shown in FIG. 4 where a tray and a cable slack manager are secured together, according to some embodiments.

FIG. 7 shows the enclosure 200 having the bottom two rows of cassette trays 210 and cable slack managers 220 extended to different degrees. The cassette trays 210 and cable slack managers 220 may be extended out to one or more extended positions, and preferably three extended positions, as enabled by stopping positions within tray guides inside the enclosure 200. FIG. 8 shows a close-up of how the cable slack manager 220 secures to the cassette tray 210. The front side of the cassette tray 210 includes a front loop 213 for guiding cables being routed out from cassettes installed into the cassette tray 210. Fasteners 229 may be used for fastening portions of the cassette tray 210 to the cable slack manager 220. In addition or alternatively, the cable slack manager 220 may be secured to a flange coming up from the bottom of the cassette tray 210. FIG. 8 also shows portions of a front strip 211 in the cassette tray 210, where the front strip 211 includes minor openings 212 that may enable an installer to use a finger (or other object) to push up and through the minor openings 212 to assist in removing an installed cassette. The cassette tray 210 also includes a major opening 214 which is larger than the minor opening 212, which may also assist an installer to push up and through the minor openings 212 to remove an installed cassette.

Figure 9:
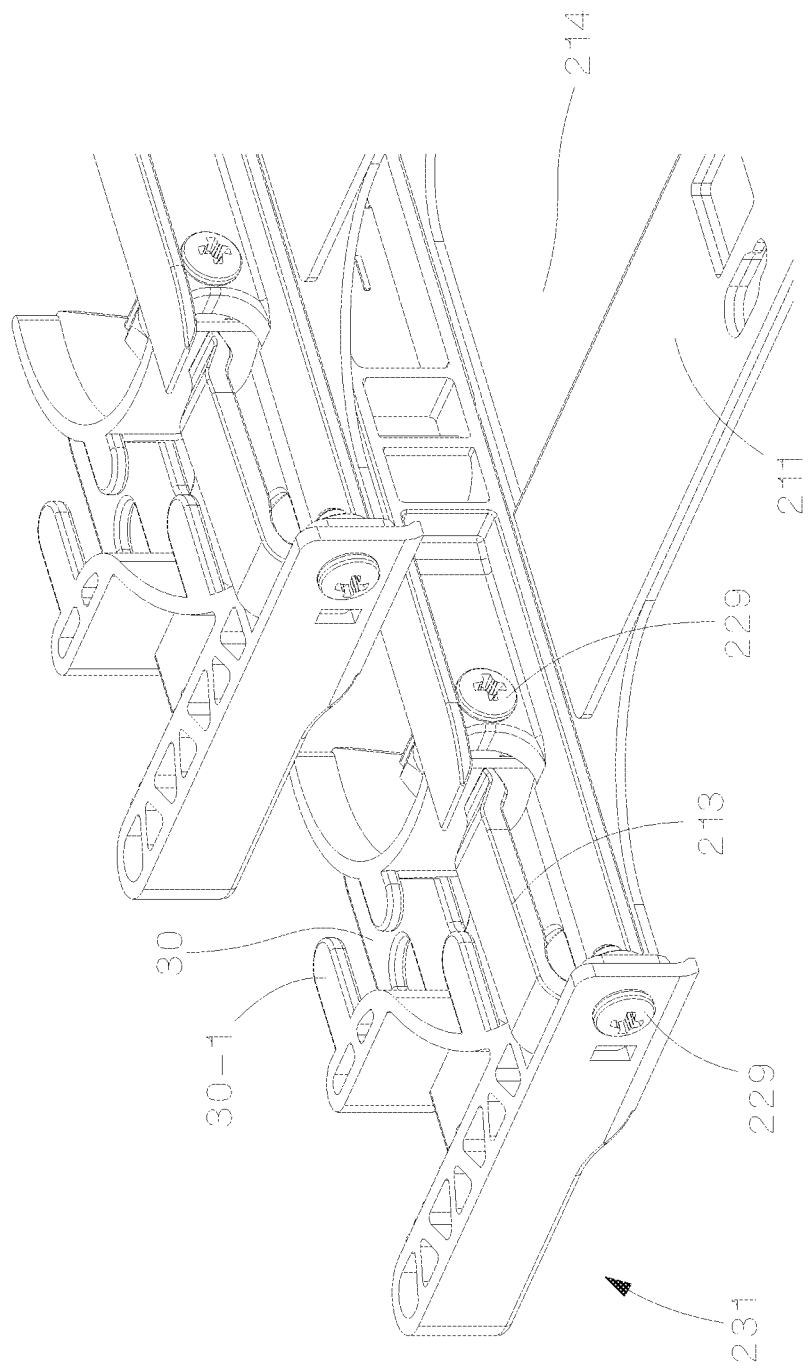
FIG. 9 is a close-up partial view of a portion in the enclosure shown in FIG. 4 where a tray and a first type of outer cable manager are secured together, according to some embodiments d.

FIG. 9 shows a close-up view of how the outer cable manager 231 secures to the cassette tray 210. Fasteners 229 may be used for fastening portions of the cassette tray 210 to the outer cable manager 231. In addition or alternatively, the outer cable manager 231 may be secured to a flange coming up from a bottom of the cassette tray 210. The outer cable manager 231 includes a passage 30 for guiding cables that originates from the attached front loop 213 and travels to an exit opening away from the cassette tray 210. The top ceiling to the passage 30 is partially covered by a plurality of fingers 30-1.

Figure 10:
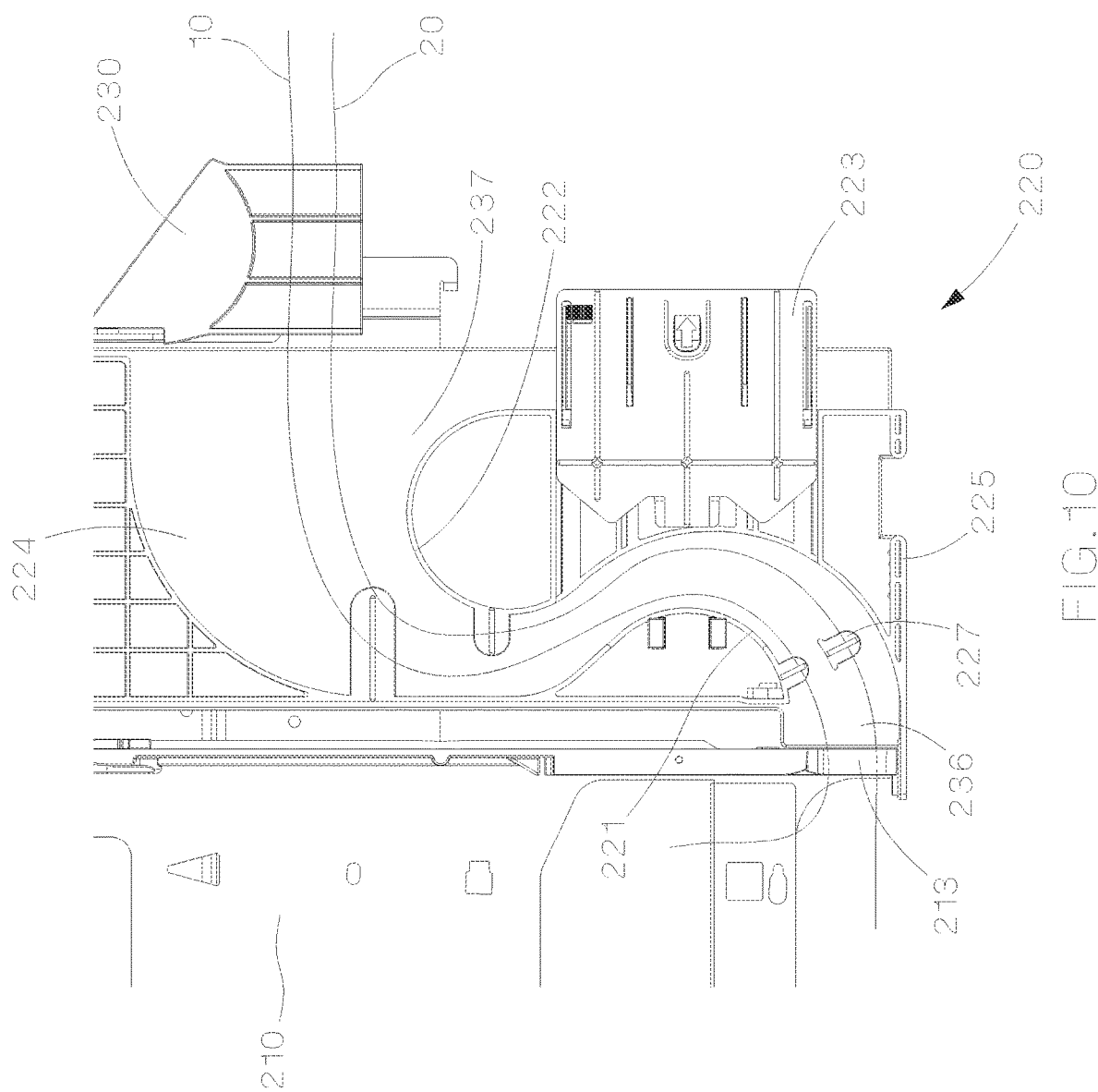
FIG. 10 is a top-down partial view of the cable slack manager in an open position.

FIG. 10 shows a top-down view of the cable slack manager 220 in an open position where the cable slack manager 220 is fully extended out. From this view, an exemplary first cable 10 and an exemplary second cable 20 may be routed from cassettes (not illustrated) installed in the cassette tray 210 via the front loop 213, through the cable slack manager 220, and finally out through the outer cable manager 230. Specifically, the cables 10, 20 enter into the cable slack manager 220 via an enter opening 236, and exit the cable slack manager 220 via a wide mouthed exit opening 237. In between the enter opening 236 and the exit opening 237, the cables 10, 20 travel via a tunnel pathway defined by bend radius features 221, 222 while laying on top of a tray floor 224. Partially covering a ceiling of the tunnel pathway are a plurality of ceiling fingers 227. A slidable cover 223 is also included for adjustably allowing access into the tunnel pathway by sliding between an open and closed positions. FIG. 10 shows the slidable cover 223 in an open position. In a closed position (as shown in FIG. 11), the slidable cover 223 slides into a position that covers at least a portion of the tunnel pathway.

Figure 11:
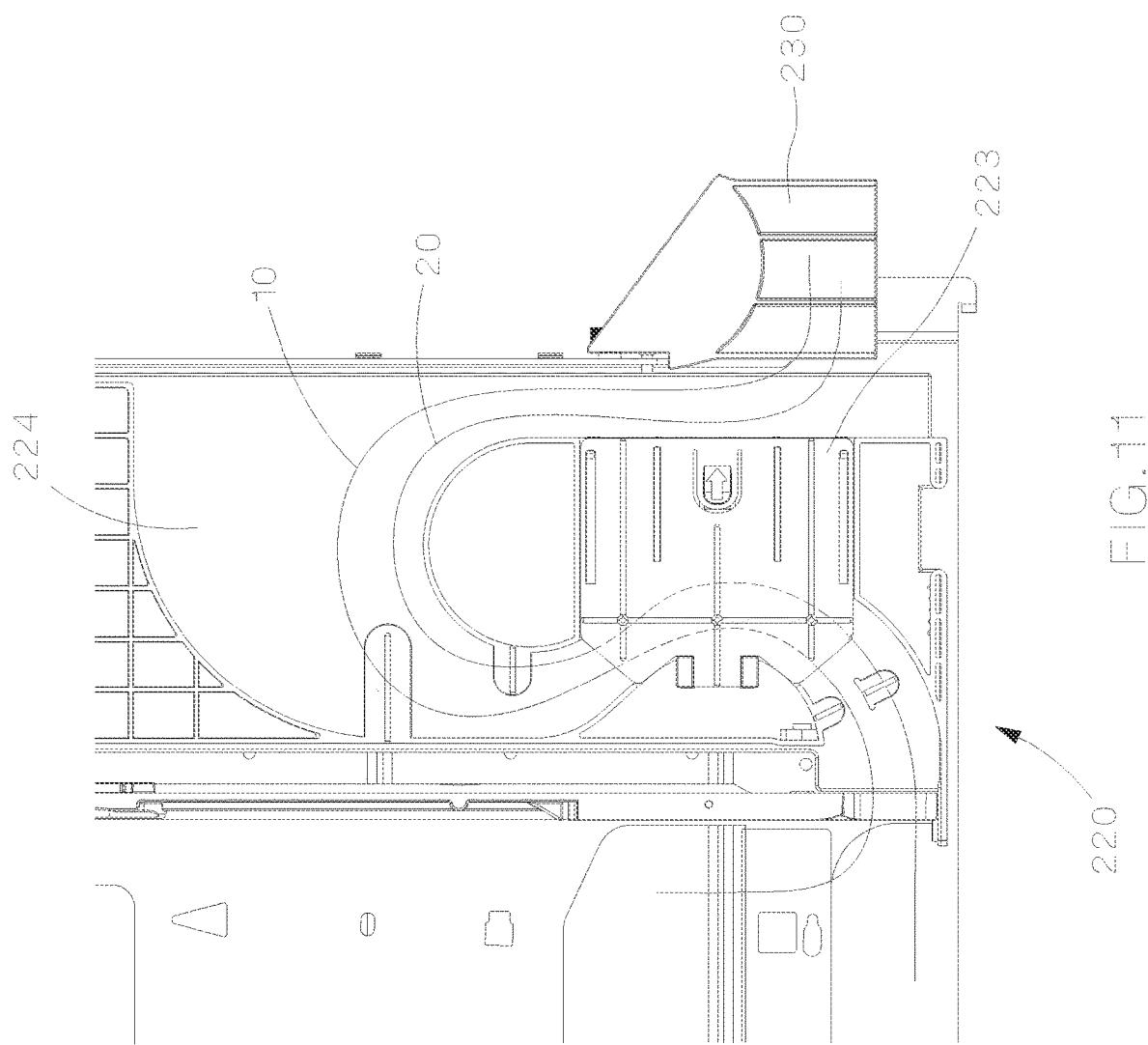
FIG. 11 is a top-down partial view of the cable slack manager in a closed position.

FIG. 11 shows the cable slack manager 220 in a closed position where it has been slid back fully into the enclosure 200. The cable slack manager 220 allows the cables 10, 20 to stay aligned, stress-free, and static with respect to their respective mated cassette during all times when a user is accessing the fibers. In other words, the bend radius features 221, 222 work to maintain the cable bend radii and reduce the motion/stress on the fiber connector adapters on the cassettes that would otherwise occur if the cables 10, 20 were to move while the cassette tray 210 slides without the aid of the cable slack manager 220. For example, when the cable slack manager 220 transitions from the open position to the closed position, the only movement of the cables 10, 20 occurs past the bend radius feature 222 in the middle portion of the tunnel pathway. Then the cables 10, 20 exiting out the exit opening 237 only have approximately 2" to 3" of movement compared to the 6" relative movement of the cable slack manager 220. This greatly reduces the tension on the cables 10, 20 at the point where they exit the enclosure 200 and enter into the cable slack manager 220 at the enter opening 236, as well as at their respective adapters.

Figure 12:
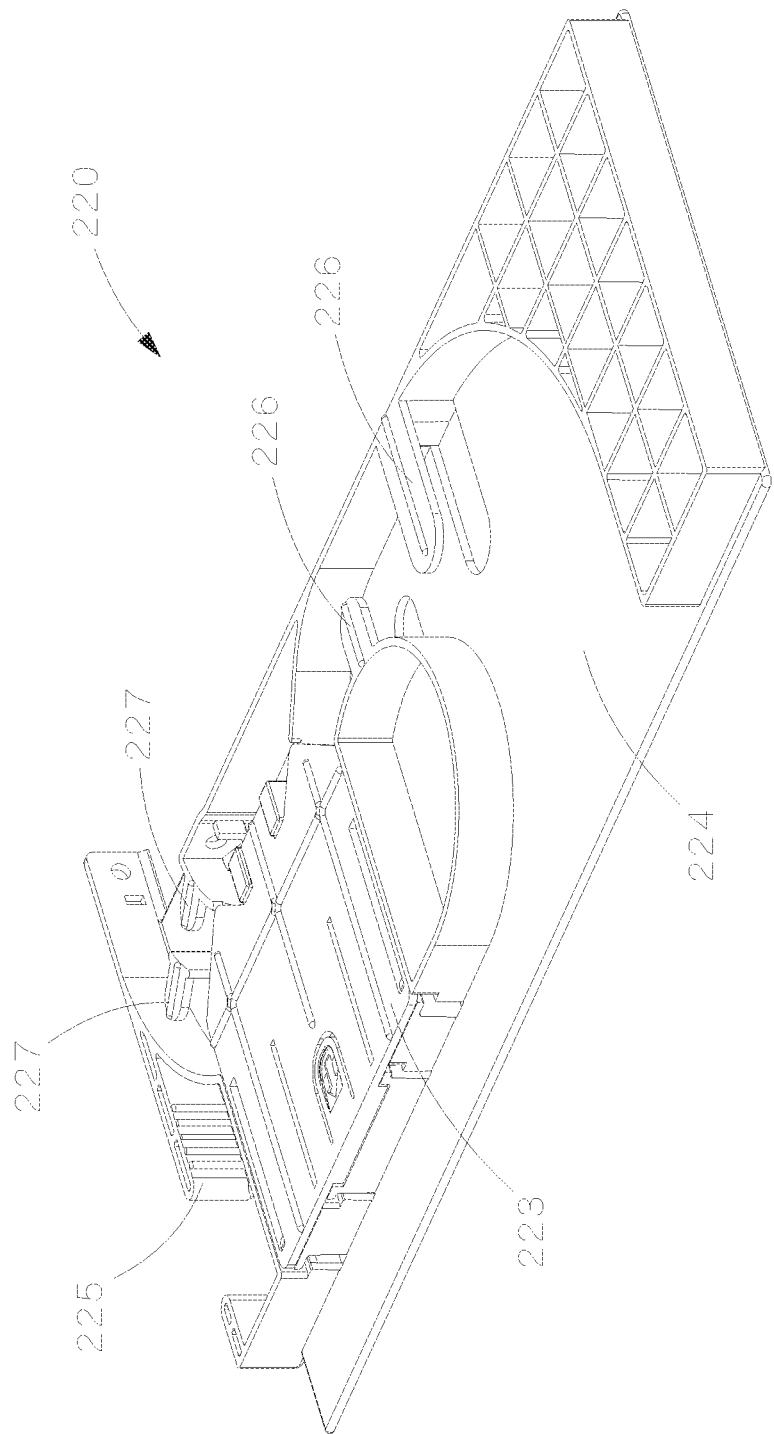
FIG. 12 is perspective view of the cable slack manager.

FIG. 12 provides a view of a finger grab portion 225 at the front of the cable slack manager 220. The finger grab portion 225 includes features (e.g., protrusion and grooves) for enabling a user to pull the cable slack manager 220 between the open position and the closed position. The pathway tunnel is shown to include two ceiling fingers 227 near the enter opening 236, and two ceiling fingers 226 at other positions (e.g., midway) within the tunnel pathway. Different variations in the number and placement of the ceiling fingers 226, 227 are considered within the scope of the cable slack manager 220 in other alternative embodiments.

Figure 14:
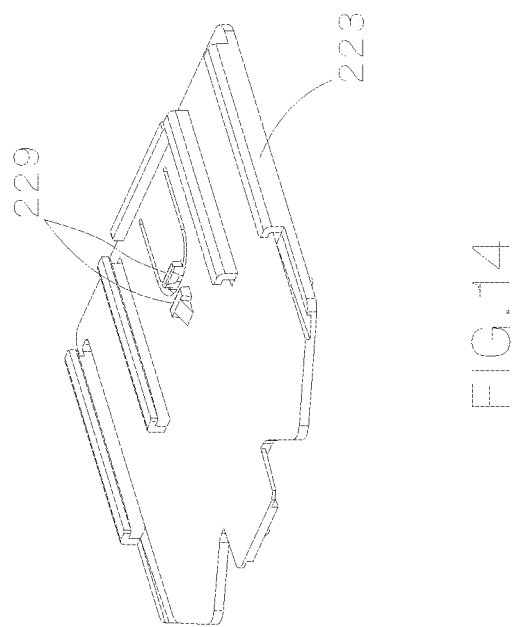
FIG. 14 is a perspective view of a bottom side to the top cover included in the cable slack manager.
Figure 13:
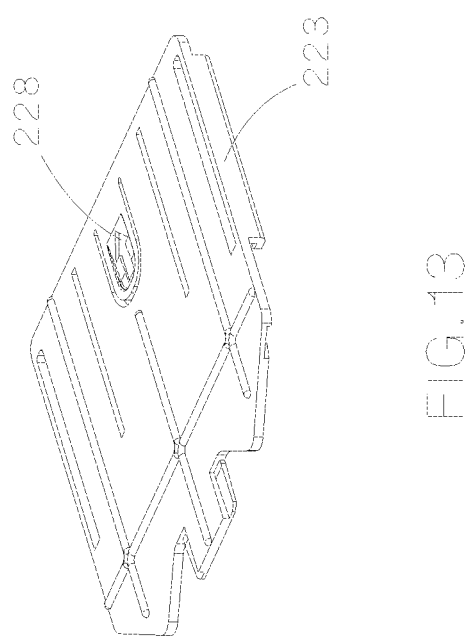
FIG. 13 is a perspective view of a top side to a top cover included in the cable slack manager.

FIG. 13 shows a top side of the slidable cover 223 that includes a button latch 228. The button latch 228 is configured to provide a locking mechanism that engages a locking latch portion on the cable slack manager 220 when the slidable cover 223 is in the closed position to lock the slidable cover in place. Then when the button latch 228 is pushed down, the locking mechanism is disabled by the button latch 228 disengaging from the locking latch portion on the cable slack manager 220 which allows the slidable cover 223 to slide open into the open position. FIG. 14 is a perspective view showing a bottom side of the slidable cover 223 that includes latching features for engaging the locking latch portion on the cable slack manager 220.

Figure 16:
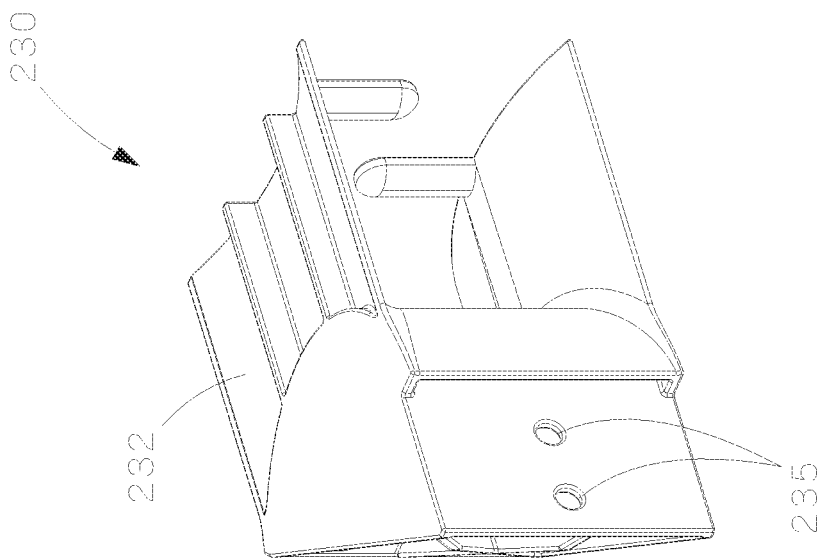
FIG. 16 is a perspective view showing a back side of the second type of outer cable manager secured to the enclosure.
Figure 15:
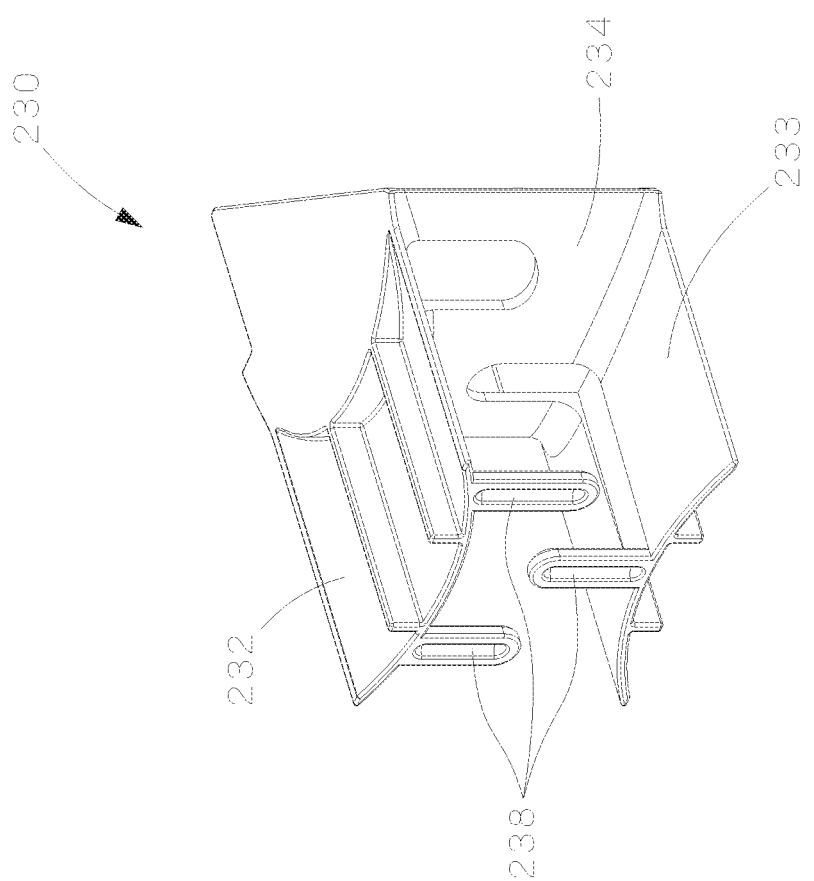
FIG. 15 is a perspective view of a second type of outer cable manager secured to the enclosure.

FIG. 15 shows the second type of outer cable manager 230 configured to be secured directly to a side wall 23 of the enclosure 200. The outer cable manager 230 includes a side wall 234, a bottom floor 233, and a top ceiling 232. On an opposite side to the side wall 234 is a partially opened wall covered by a plurality of wall fingers 2381. There are three wall fingers 238 shown in FIG. 15; however different numbers of wall fingers 238 may be provided according to alternative embodiments of the outer cable manager 230. FIG. 16 shows a back side to the outer cable manager 230 where fastener openings 235 are shown. The fastener openings 235 are used to insert fasteners for securing the outer cable manager 230 to the enclosure 200.

Figure 17:
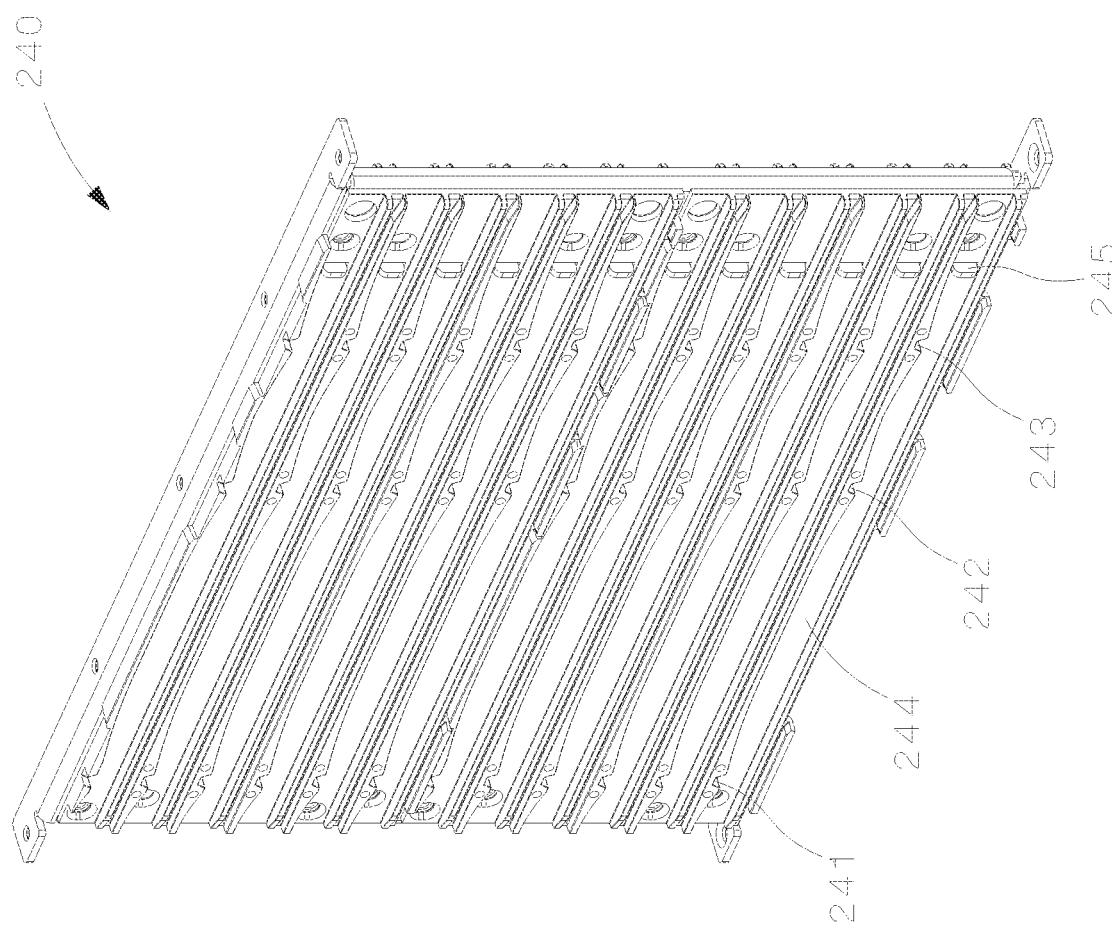
FIG. 17 is a first perspective view of a dividing wall including rail guides on both a first side and an opposite second side.
Figure 18:
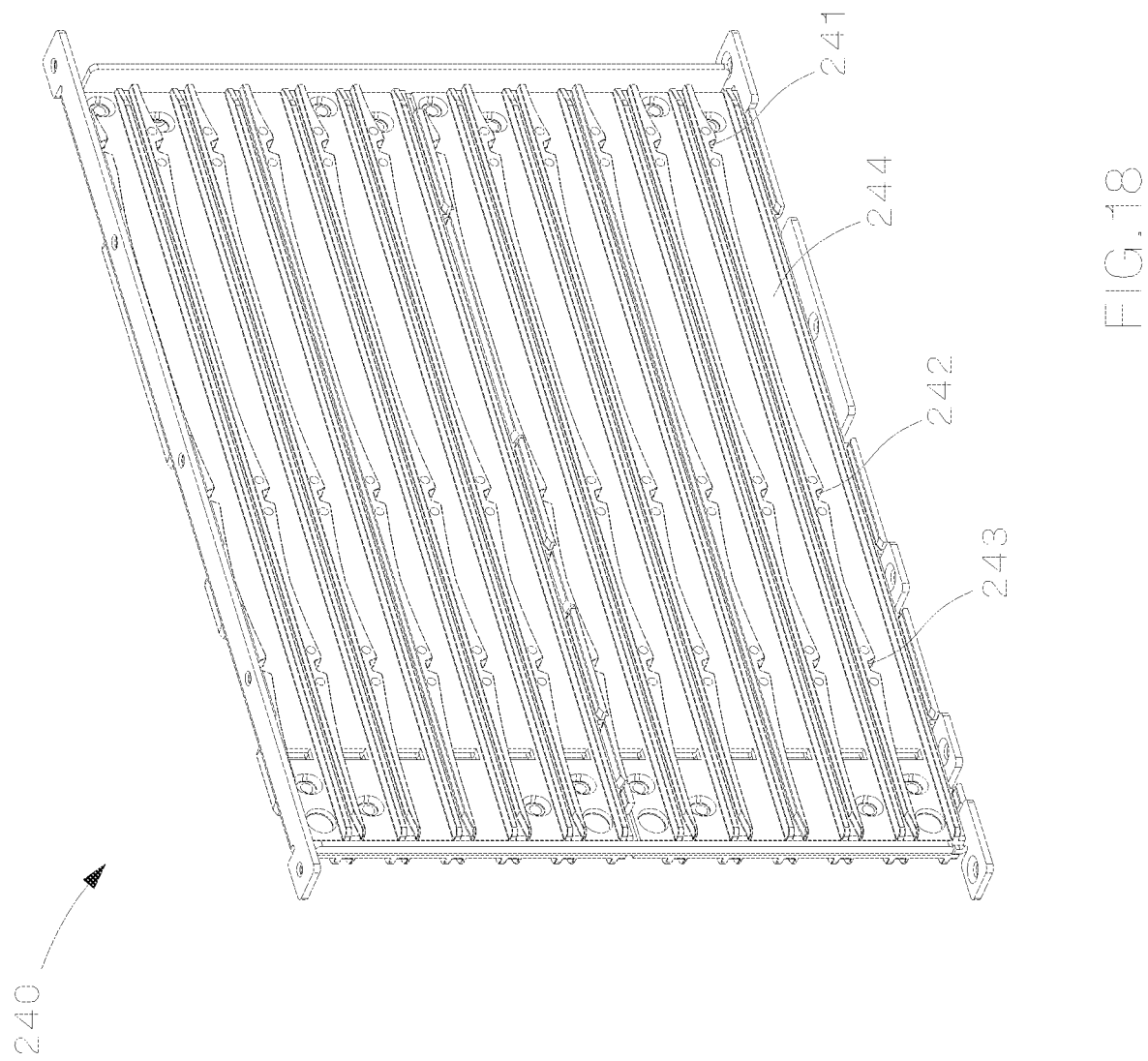
FIG. 18 is a second perspective view of a dividing wall including rail guides on both a first side and an opposite second side.

FIG. 17 shows the dividing wall 240 that divides the dynamic cable slack manager portion 201 and the fiber cassette holding portion 202. FIG. 18 shows an opposite side of the dividing wall 240 from the view shown in FIG. 17. One side of the divider wall 240 is configured to slidably hold the cassette trays 210, while the other side of the divider wall 240 is configured to slidably hold the cable slack manager 220. The divider wall 240 includes rail guides 244 on both sides, where each rail guide 244 includes a number of detents that correspond to stop positions for the cassette trays 210 and cable slack managers 220. For example, the divider wall 240 shown in FIGS. 17-18 include three detents corresponding to three stop positions: a first detent 241 corresponding to a fully inserted position, a second detent 242 corresponding to an intermediate position, and a third detent 243 corresponding to a fully extended position (e.g., an access/install position). The divider wall 240 also includes a final stop member 245 that may be included which provides a final stopping member to abut against the rails of the cassette tray 210 or cable slack manager 220 to prevent them from being fully removed from the enclosure 200.

Figure 19:
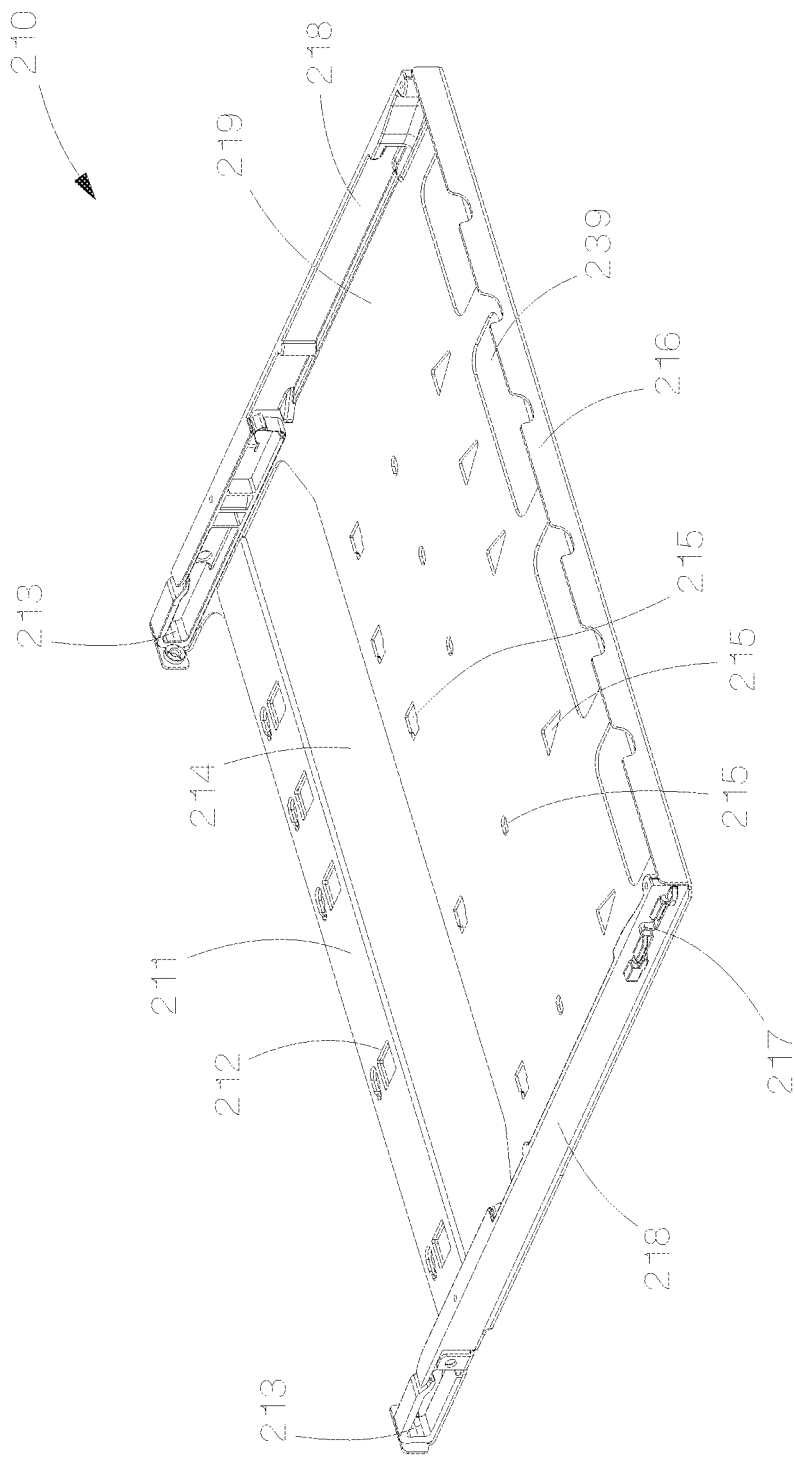
FIG. 19 is a perspective view of the tray installed into the enclosure shown in FIG. 4.

FIG. 19 shows the cassette tray 210 to include two side rails 218 at opposite sides, a bottom floor 219, a back wall 216, and a front strip 211. At a front end of the side rails 218 are front loops 213, where the front loops 213 include a 'D' ring design having a disconnected portion to allow cables to be inserted and removed from within the ring defined by the front loops 213. Towards a back end of the side rails 218 are a stop protrusion 217. The stop protrusion 217 is configured to be releasably inserted into the detents 241, 242, 243 to define the different stop positions. The stop protrusion 217 may be made from a flexible material, such as a spring metal, so that the stop protrusion 217 may flex into one of the detents 241, 242, 243 when the stop protrusion 217 is aligned with one of the detents 241, 242, 243, and also flex out of the detents 241, 242, 243 when a sliding push or pull force is asserted to the cassette tray 210 to disengage from the detents 241, 242, 243.

Figure 29:
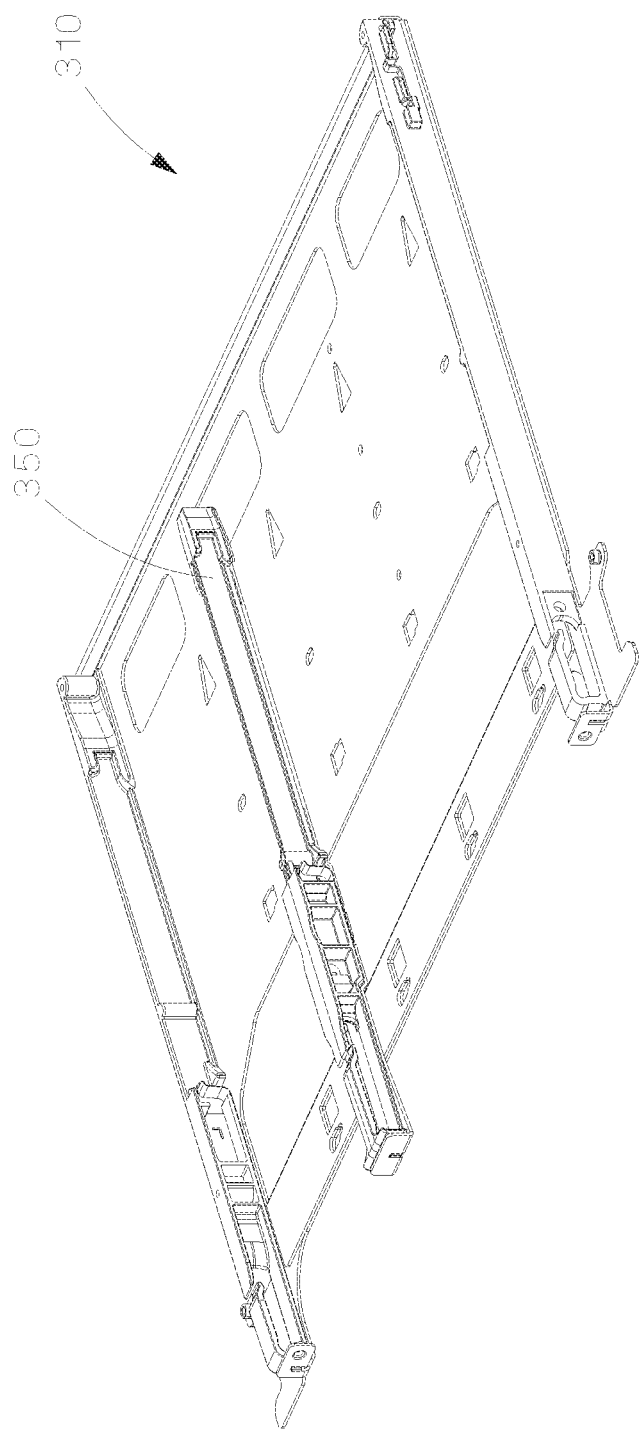
FIG. 29 is a perspective view of the tray including a removable rail installed, according to some embodiments.

As shown in FIG. 19, the front strip 211 includes minor openings 212 for receiving attachment features of a divider rail (e.g., divider rail 350 as shown in FIG. 29) for attaching the divider rail onto the cassette tray 210. The front strip 211 also defines a major opening 214 that also allows fingers or other tools to access the connector adapters (e.g., plug and/or unplug) during maintenance procedures, as well as to push up in an effort to remove cassettes that are installed on to the cassette tray 210. The back wall 216 defines a lip that serves as a stop member to prevent installed cassettes from falling through the rear of the cassette tray 210. The back openings 239 provide clearance for cassettes and/or divider rails that are installed by rotating them into place onto the bottom floor 219 of the tray 210. Although rear install/removal is not enabled for the enclosure 200, according to other embodiments the back openings 239 may further allow a finger or other tool to push up in an effort to remove cassettes that are installed on to the cassette tray 210. The floor openings 215 may come in different shapes to accommodate different removable divider rails to enable different sized cassettes being installed onto the same sized cassette tray 210, as will be described in more detail later in this disclosure (e.g., divider rail 350 as shown in FIG. 29).

Figure 20:
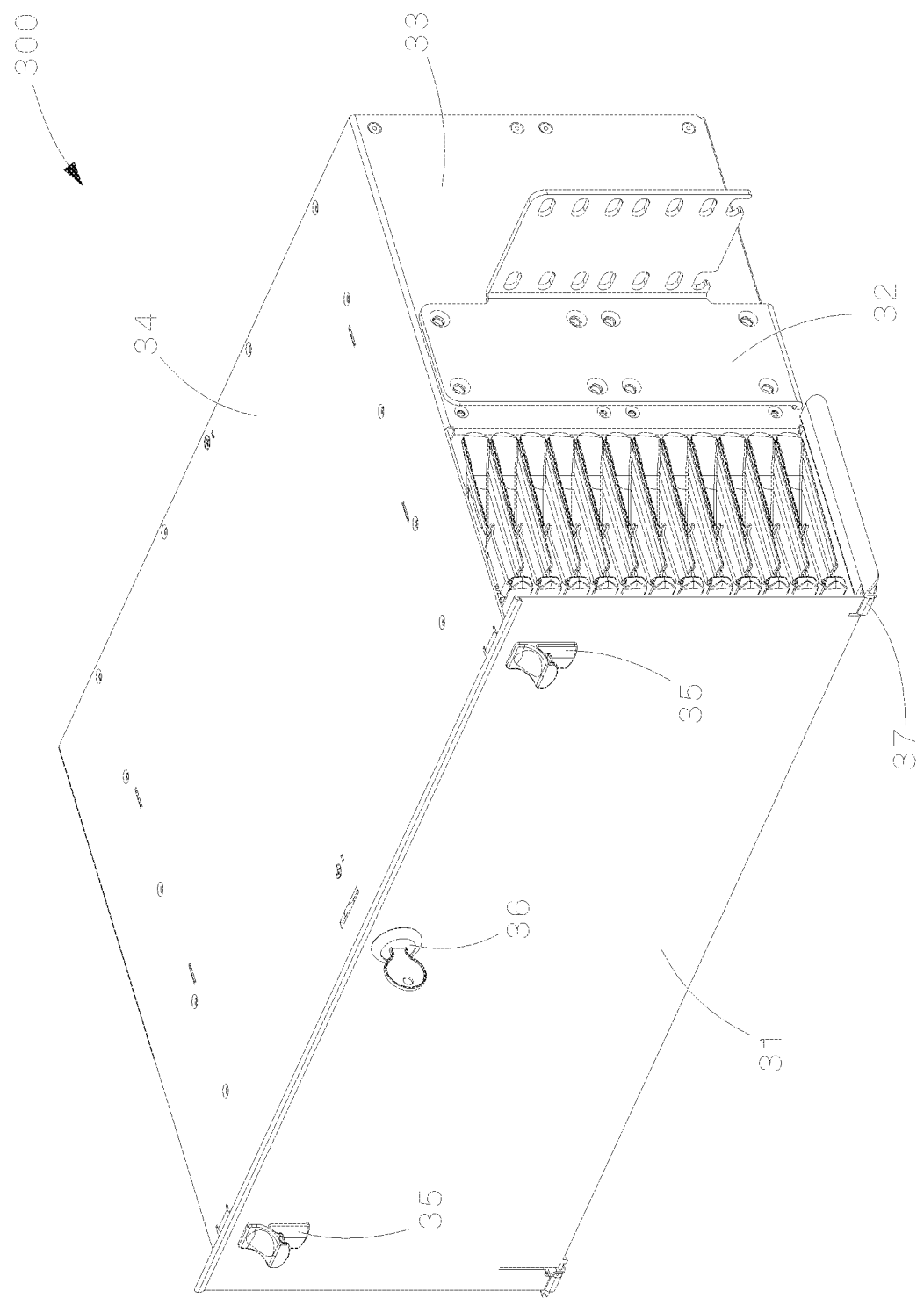
FIG. 20 is a front perspective view of a second exemplary enclosure that may be installed into the cable management system, according to some embodiments.

FIG. 20 shows a second exemplary enclosure 300 that may be installed into the enclosure rack system 120 of the cable management system 100. The enclosure 300 is a 4 RU sized enclosure, although the enclosure 300 may be modified into other rack sized dimensions (e.g., 1 RU, 2 RU, 3 RU) by reducing a number of cassette tray rows according to other embodiments.

The enclosure 300 includes a front access door 31 located at a front side, where the front access door 31 rotates about a hinge 37 to open and closed positions. In the open position the front access door 31 rotates down to enable access into the enclosure 300, and in the closed position the front access door 31 rotates up to close off access into the enclosure 300. The front access door 31 includes two latches 35 located at opposite sides of the front access door 31, as well as a turning key 36 acting as a locking mechanism and located at a center top of the front access door 21.

Figure 21:
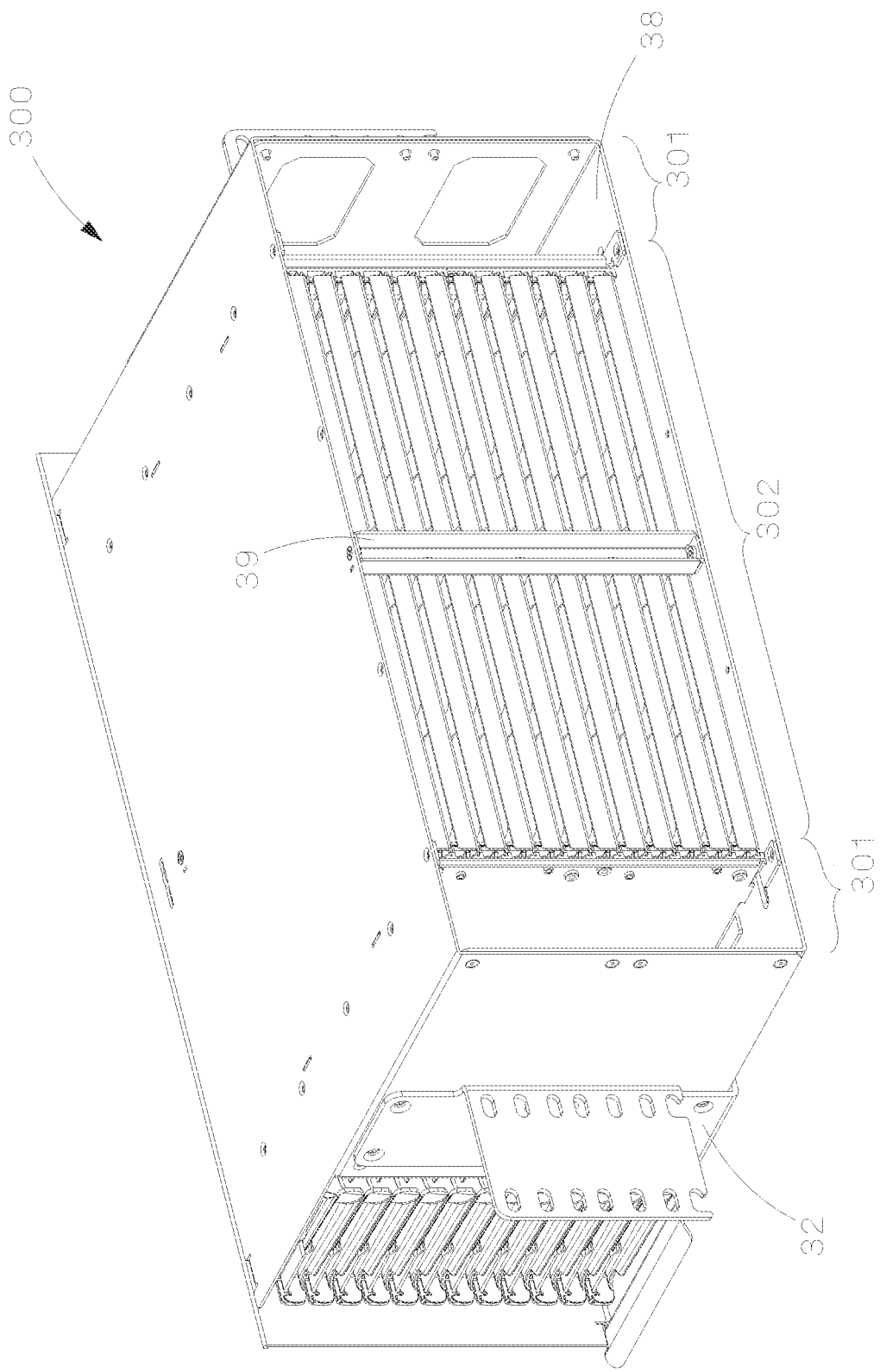
FIG. 21 is a rear perspective view of the enclosure shown in FIG. 20.
Figure 22:
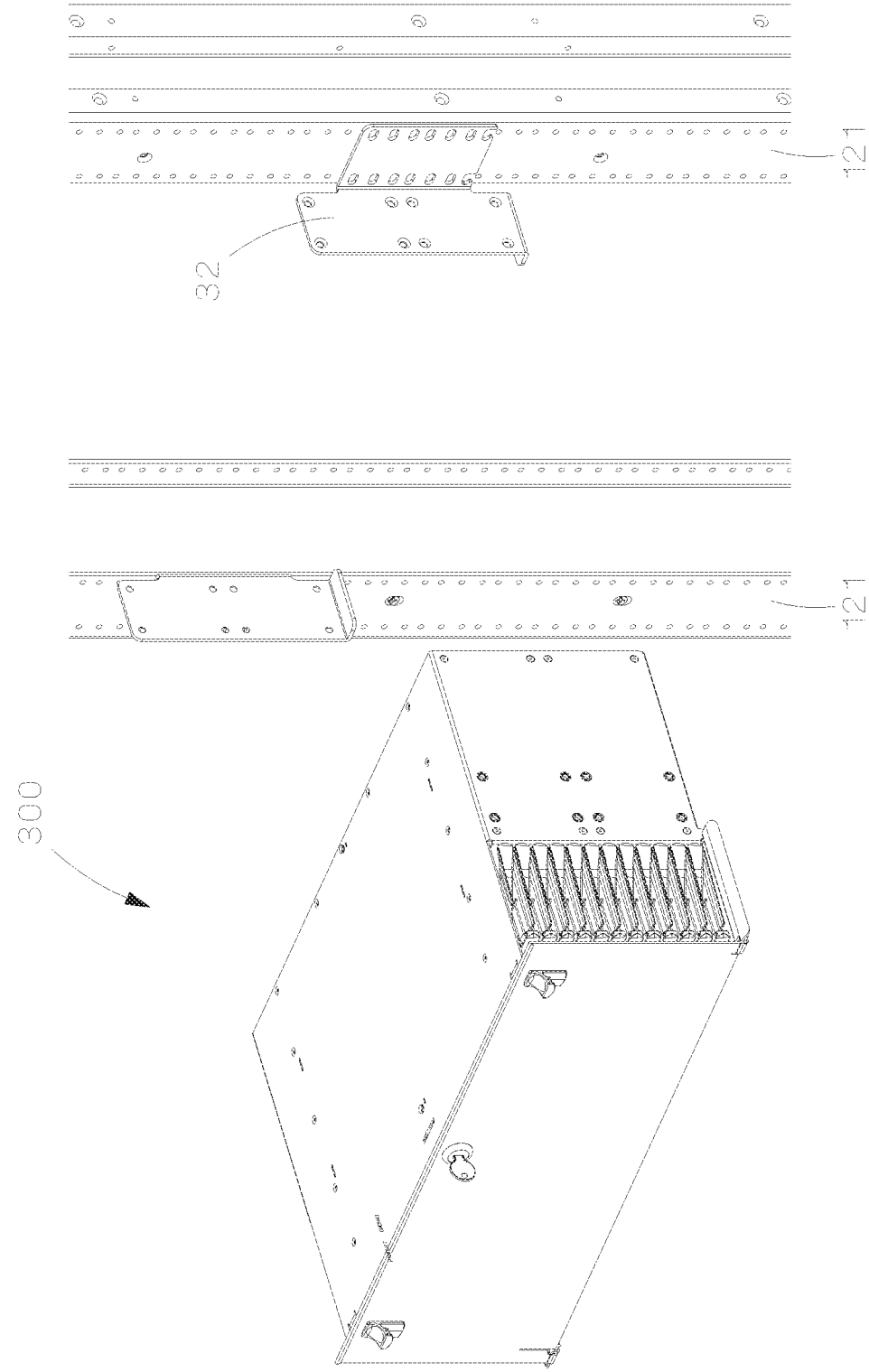
FIG. 22 is a perspective partial view of the enclosure shown in FIG. 20 being installed into an enclosure rack.
Figure 23:
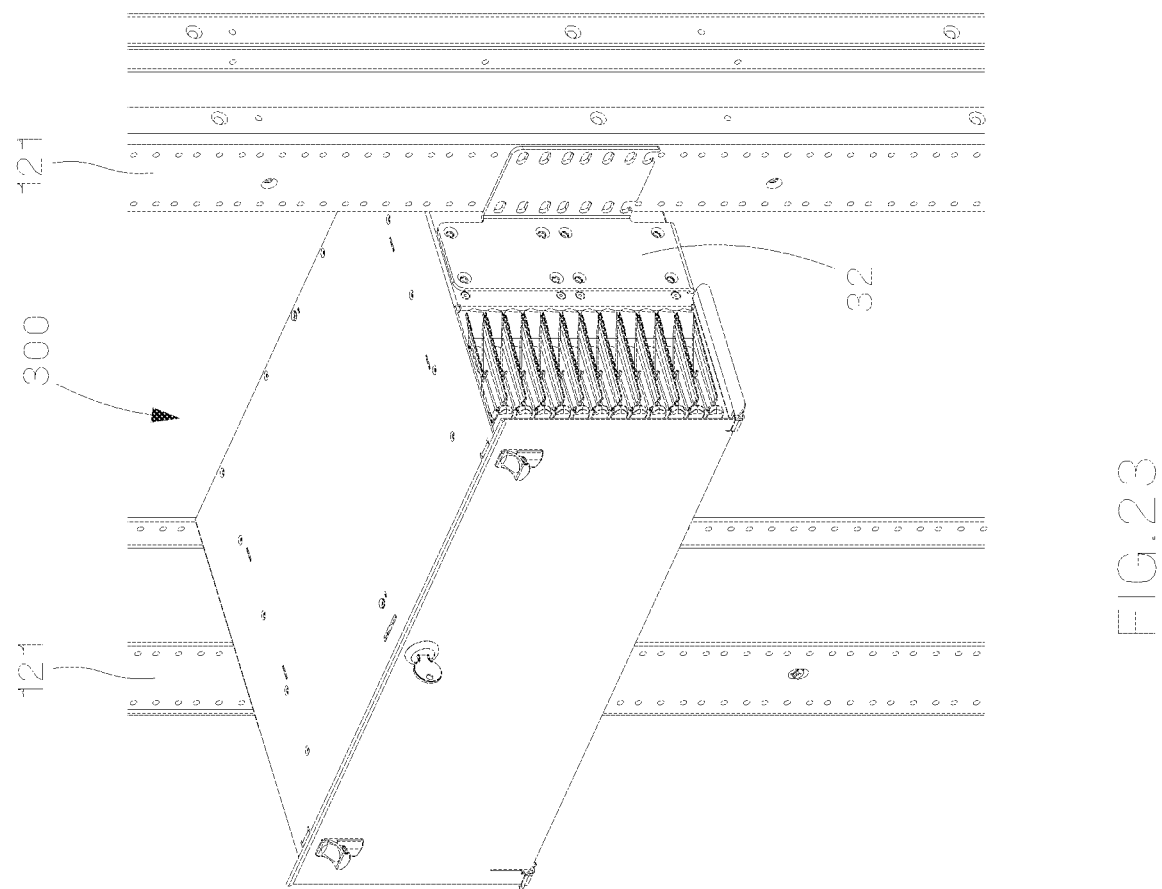
FIG. 23 is a perspective partial view of the enclosure shown in FIG. 20 installed into the enclosure rack.

The enclosure 300 also includes a housing comprised of two side walls 33 positioned at opposite ends to each other, a top cover 34 connecting the two side walls 33 at a top portion, and a bottom floor 38 (shown in FIG. 21). Mounting brackets 32 are secured to each side wall 33 and then used to secure the enclosure 300 to rack posts 121 included in the enclosure rack system 120. As shown in FIG. 22, the mounting brackets 32 include a lower lip for the enclosure 300 to rest on top of, thus providing a more secure installation onto the rack posts 121. The mounting brackets 32 may be pre-installed to the rack posts 121, and then the enclosure 300 may be slid on top of the lip surface for final installation as shown in FIG. 23. The enclosure 300 also includes outer cable managers 330, 340 that mirror each other on opposite sides of the enclosure 300.

FIG. 21 shows a rear side of the enclosure 300 to be open other than a stop brace 39 for preventing trays 310 from falling out the rear of the enclosure 300. According to some embodiments, the stop brace 39 may be removed from the enclosure 300. As shown more clearly from the rear view of the enclosure 300, the enclosure 300 is partitioned into a fiber cassette holding portion 302, and an open space 301 on either side of the fiber cassette holding portion 302. As the overall width of the enclosure 300 is 1 RU width, the width of the fiber cassette holding portion 302 is approximately ¾ RU width, while the remaining open space 301 both combine to be approximately ¼ RU width. Within the fiber cassette holding portion 302 are stored cassette trays 310 for holding cassettes. The cassette trays 310 are configured to hold a single triple wide cassette as described herein, three single wide cassettes, or a combination of single wide and double wide cassettes, as will be described in more detail herein.

Figure 24:
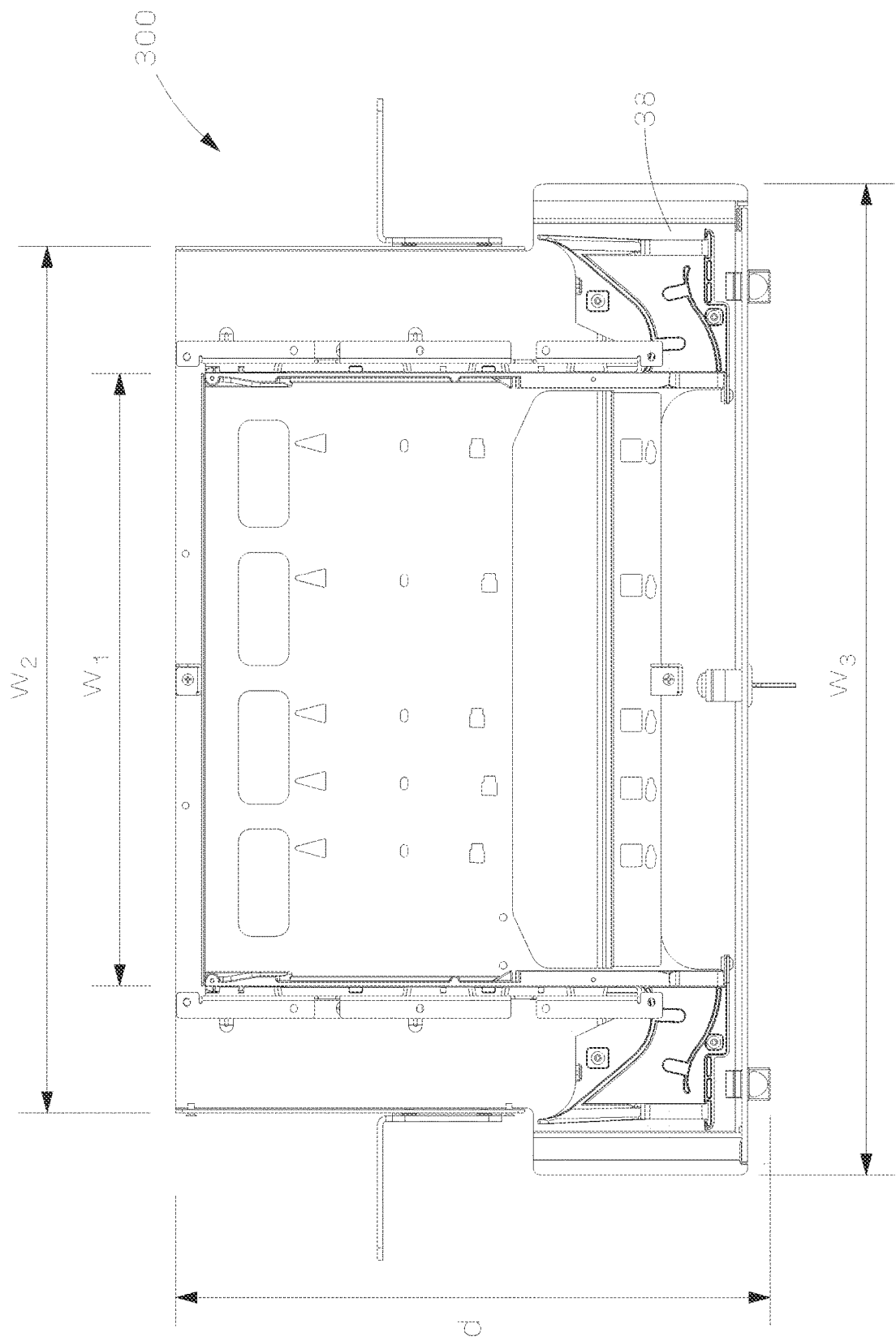
FIG. 24 is a top-down view of the enclosure shown in FIG. 20.

As shown in FIG. 24, a first width $w_1$ measured as a width of the cassette tray 310 is approximately 11-12 inches (e.g., 11.98 inches/304.42 mm), a second width $w_2$ measured from the edges of the outer cable managers 330, 340 is approximately 17-18 inches (e.g., 17.35 inches/440.59 mm), and a third width $w_3$ measured from end to end of the bottom floor 38 is approximately 19-20 inches (e.g., 19.68 inches/500.07 mm). The enclosures 200, 300 has a depth d of approximately 11-12 inches (e.g., 11.79 inches/300 mm).

Figure 25:
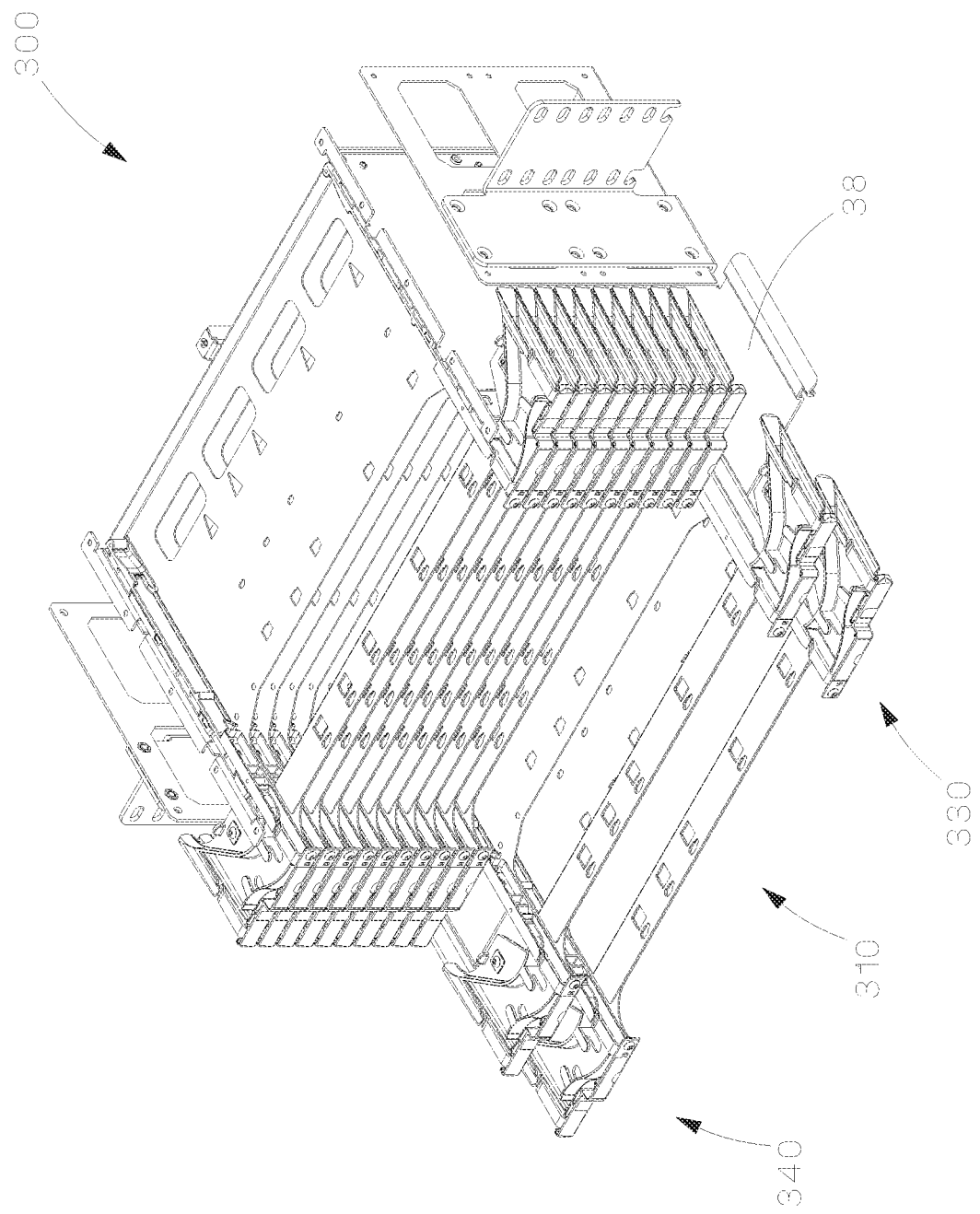
FIG. 25 is a perspective view of the enclosure shown in FIG. 20 with a top cover removed to view internal components of the enclosure.
Figure 26:
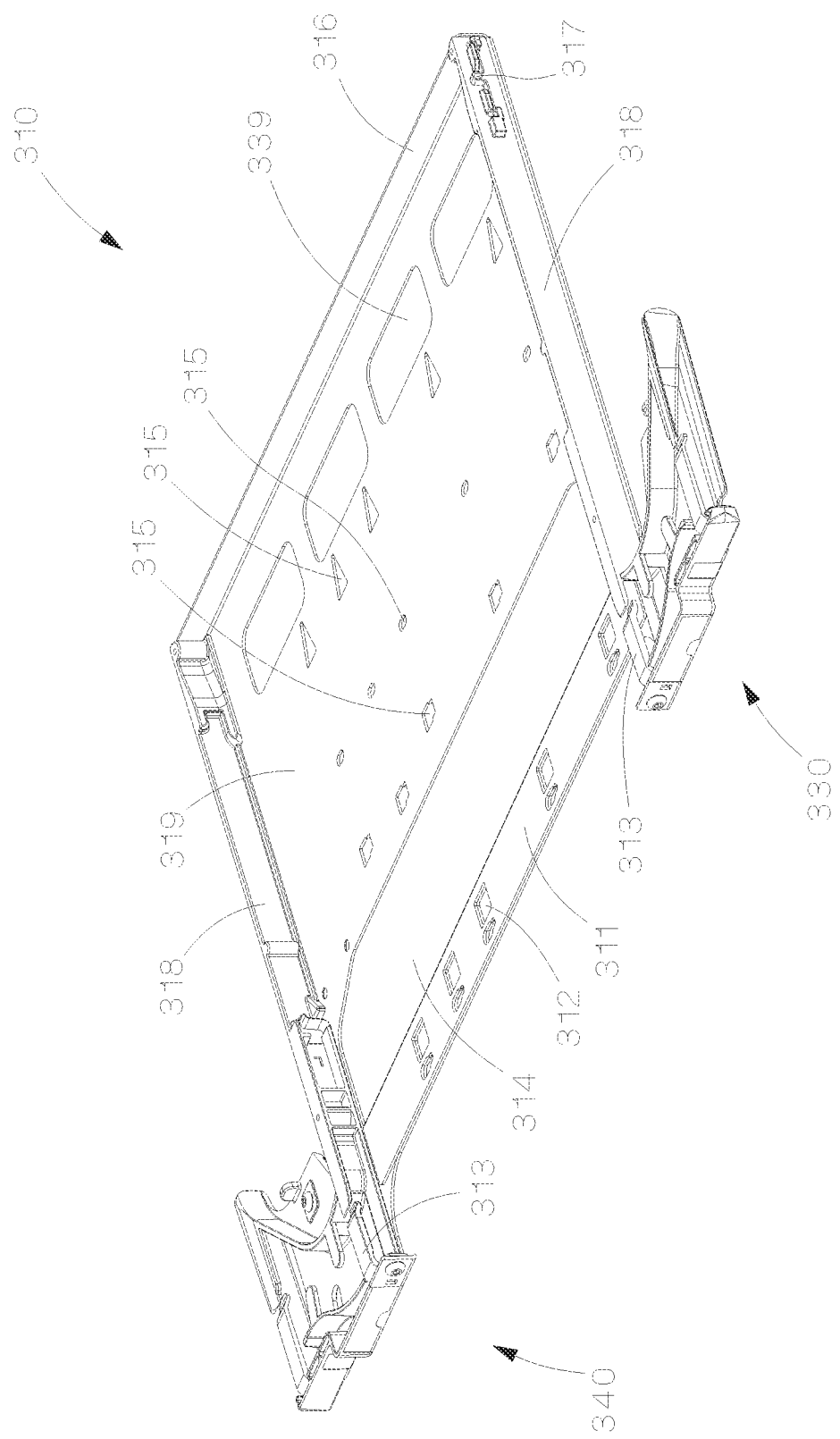
FIG. 26 is a perspective view of an individual tray that may be installed into the enclosure shown in FIG. 20, according to some embodiments.

FIG. 25 shows the enclosure 300 having the bottom two rows of cassette trays 310 extended to different degrees. FIG. 26 is a perspective view of the cassette tray 310, which is the same or substantially the same as the cassette tray 210. The cassette tray 310 includes two side rails 318 at opposite sides, a bottom floor 319, a back wall 316, and a front strip 311. At a front end of the side rails 318 are front loops 313, where the front loops 313 include a disconnected portion to allow cables to be inserted and removed from within the ring of the front loops 313. Towards a back end of the side rails 318 are a stop protrusion 317. The stop protrusion 317 is configured to be releasably inserted into detents found on rail guides that the side rails 318 are configured to travel on, where the detents define the different stop positions. The stop protrusion 317 may be made from a flexible material, such as a spring metal.

As shown in FIG. 26, the front strip 311 includes a plurality of minor openings 312, and also defines a major opening 314 that is larger than any one of the minor openings 312. The back wall 316 defines a lip that acts as a stop member to prevent installed cassettes from falling through the rear of the cassette tray 310. Back openings 339 are also included at a rear portion of the bottom floor 319. The floor openings 315 may come in different shapes to accommodate different floor divider rails, as will be described in more detail later in this disclosure (see e.g., FIG. 29). The floor divider rails may be installed at different locations on the bottom floor to enable different sized cassettes being installed onto the same sized cassette tray 310.

Figure 27:
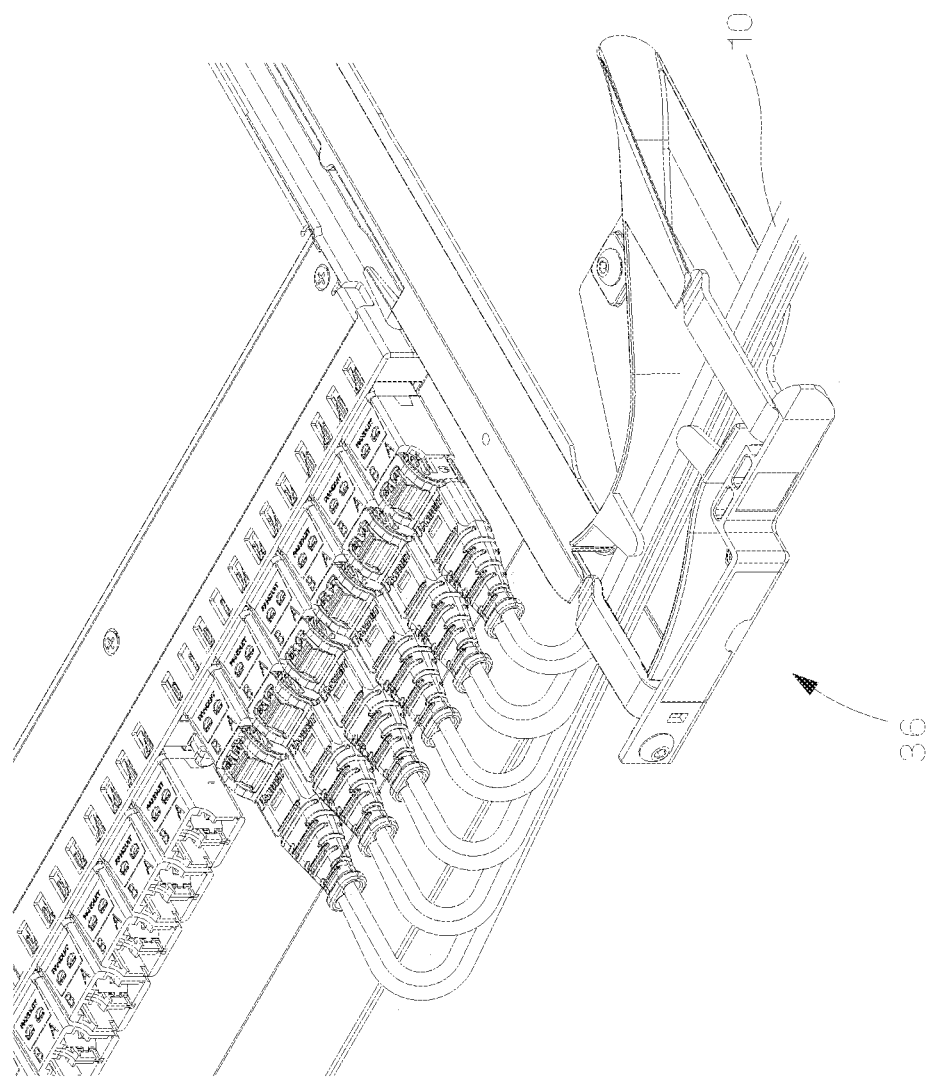
FIG. 27 is a close-up partial view of a cable manager.
Figure 28:
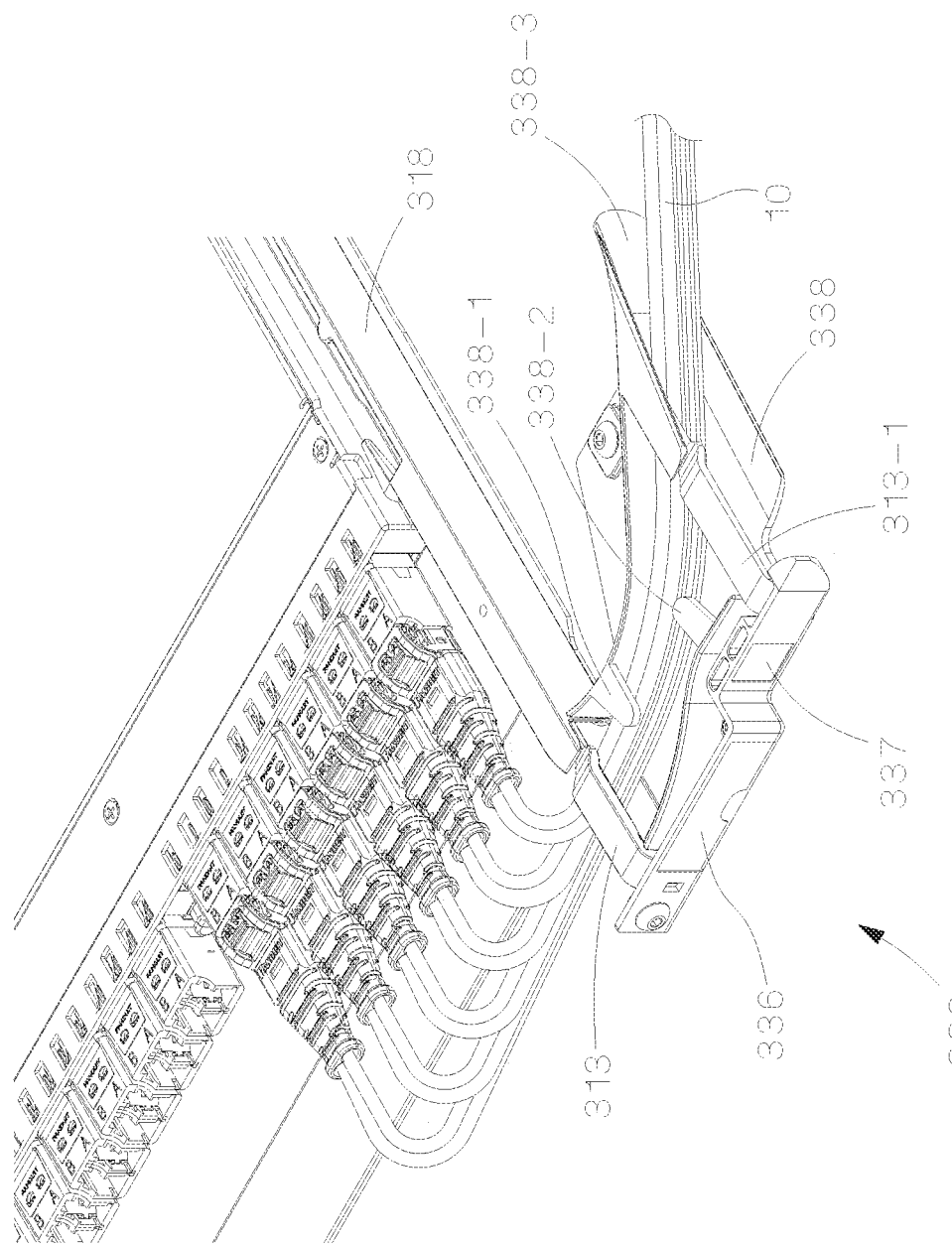
FIG. 28 is a close-up partial view of the cable manager shown in FIG. 27 in a maintenance position.

In FIG. 27 the cassette tray 310 is in a fully inserted position within the enclosure 300, while FIG. 28 shows the cassette tray 310 in a fully extend out position. FIG. 27 shows a close-up view of how the outer cable manager 330 is secured to the front loop 313, and has a flared out shape such that a flared exit 335 is larger than the input opening at the front loop 313. The outer cable manager 330 includes a bottom surface 338 on which the cables 10 are routed on top of, as well as a plurality of fingers 338-1, 338-2 for partially closing a top roof of the outer cable manager 330. The flared exit 338-3 is also defined by exit loop 313-1 having a flexible opening, similar to the front loop 313, that prevents cables 10 from accidentally being removed from the outer cable manager 330, but also provides the capability to intentionally remove the cables 10 when desired. The outer cable manager 330 also includes a front face having a first label surface 336 and a second label surface 337 for placing adhesive backed labels.

In the fully extended out position shown in FIG. 28, the cables 10 are shown to have traversed within the outer cable manager 330 to rest against the curved walls provided by the flared exit 335. By allowing the cables 10 to traverse within the outer cable manager 330, and in particular within the flared exit 335, cable movement at the cassette location where the adapters are installed is nearly eliminated. Therefore, this greatly reduces unwanted tugging (i.e., stress forces) on the cables at their adapter locations within the cassettes which could lead to degraded optical performance of the cables 10 due to physical disconnections/deformities in the fiber cables 10 as the trays are moved to different positions.

Figure 30:
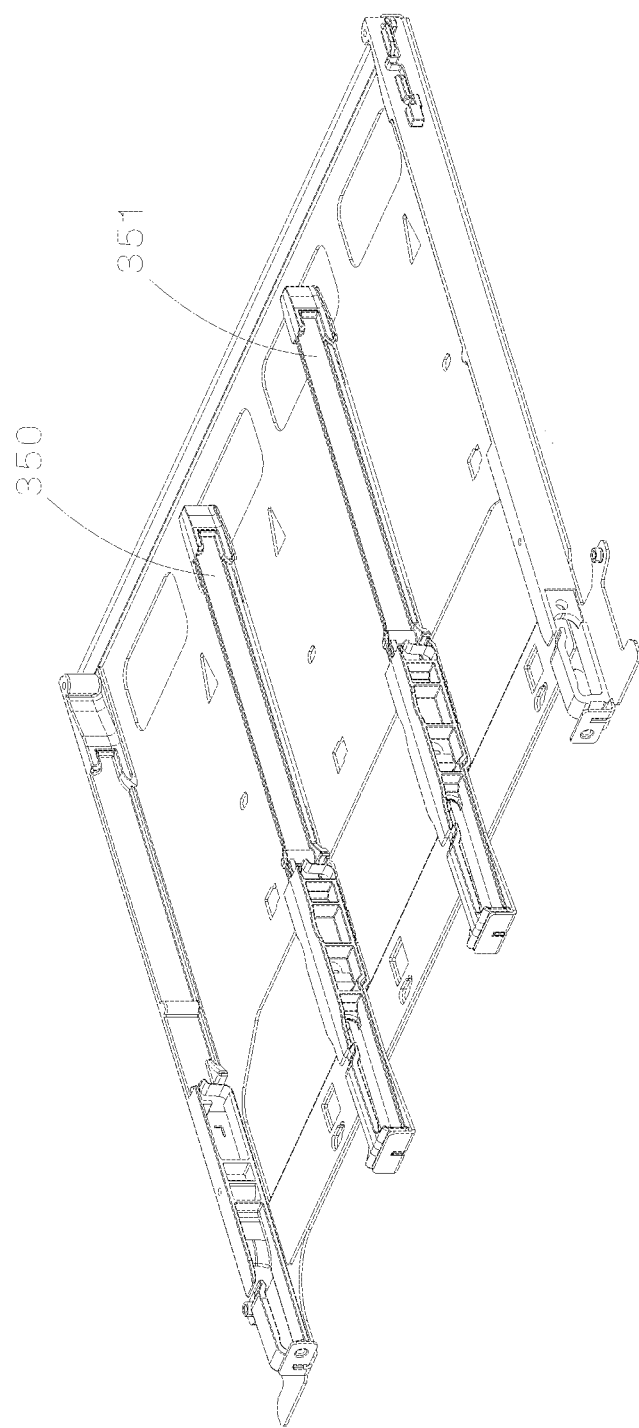
FIG. 30 is a perspective view of the tray including two removable rails installed, according to some embodiments.

FIG. 29 is a front perspective view of the cassette tray 310 (or cassette tray 210), showing the divider rail 350 installed. Although the cassette trays 210, 310 are illustrated to fit triple wide cassettes, the divider rail 350 may be installed to enable installation of different sized cassettes onto the cassette trays 210, 310. For example, the installation location for the divider rail 350 in FIG. 29 enables installation of a single wide cassette and a double wide cassette onto the cassette tray 310. In the exemplary embodiment illustrated in FIG. 30, the installation locations for the two divider rails 350, 351 enable installation of three individual single wide cassettes.

Figure 31:
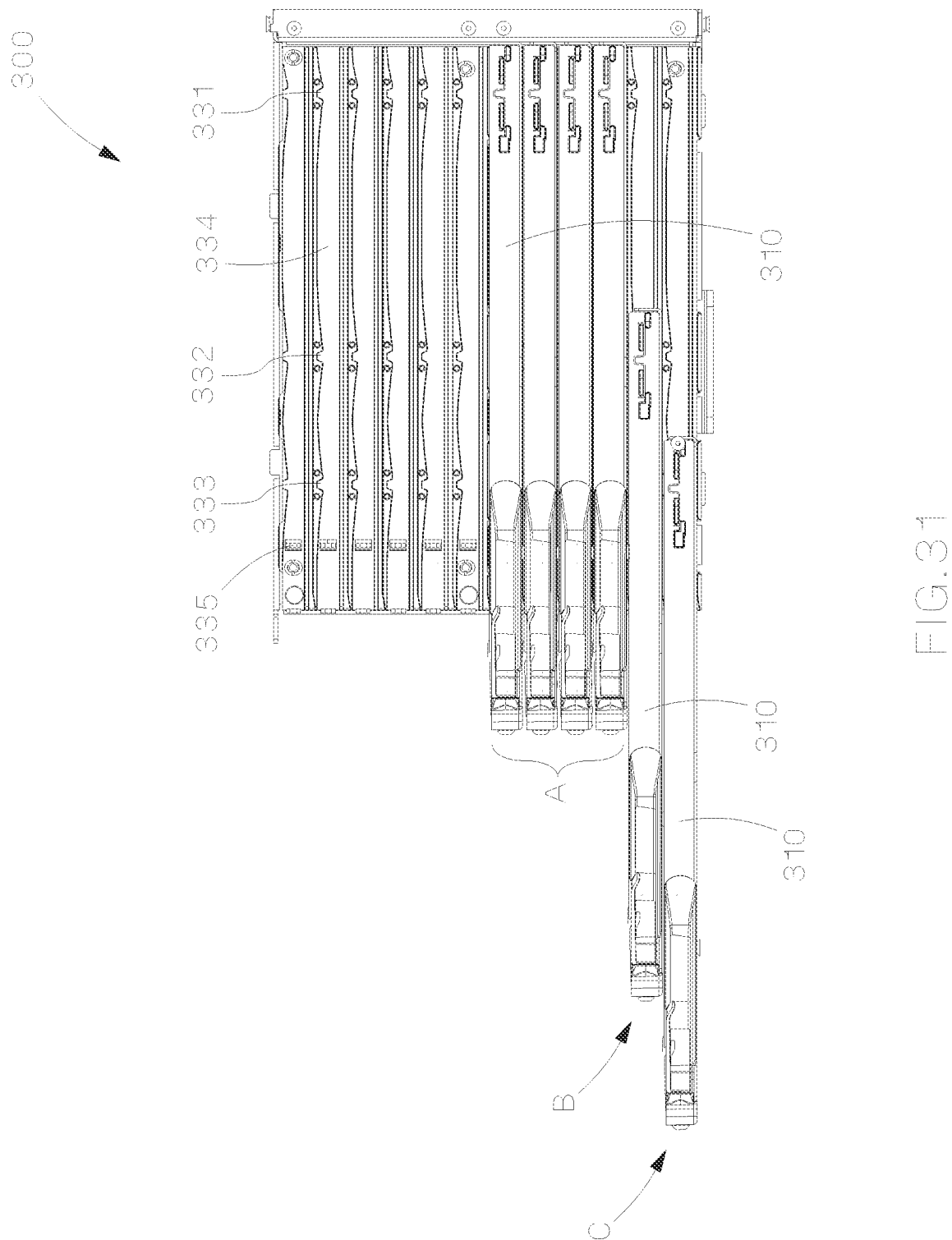
FIG. 31 is a side partial view of the enclosure shown in FIG. 20 having a side wall removed to reveal trays installed and positioned at various predetermined positions, according to some embodiments.
Figure 32:
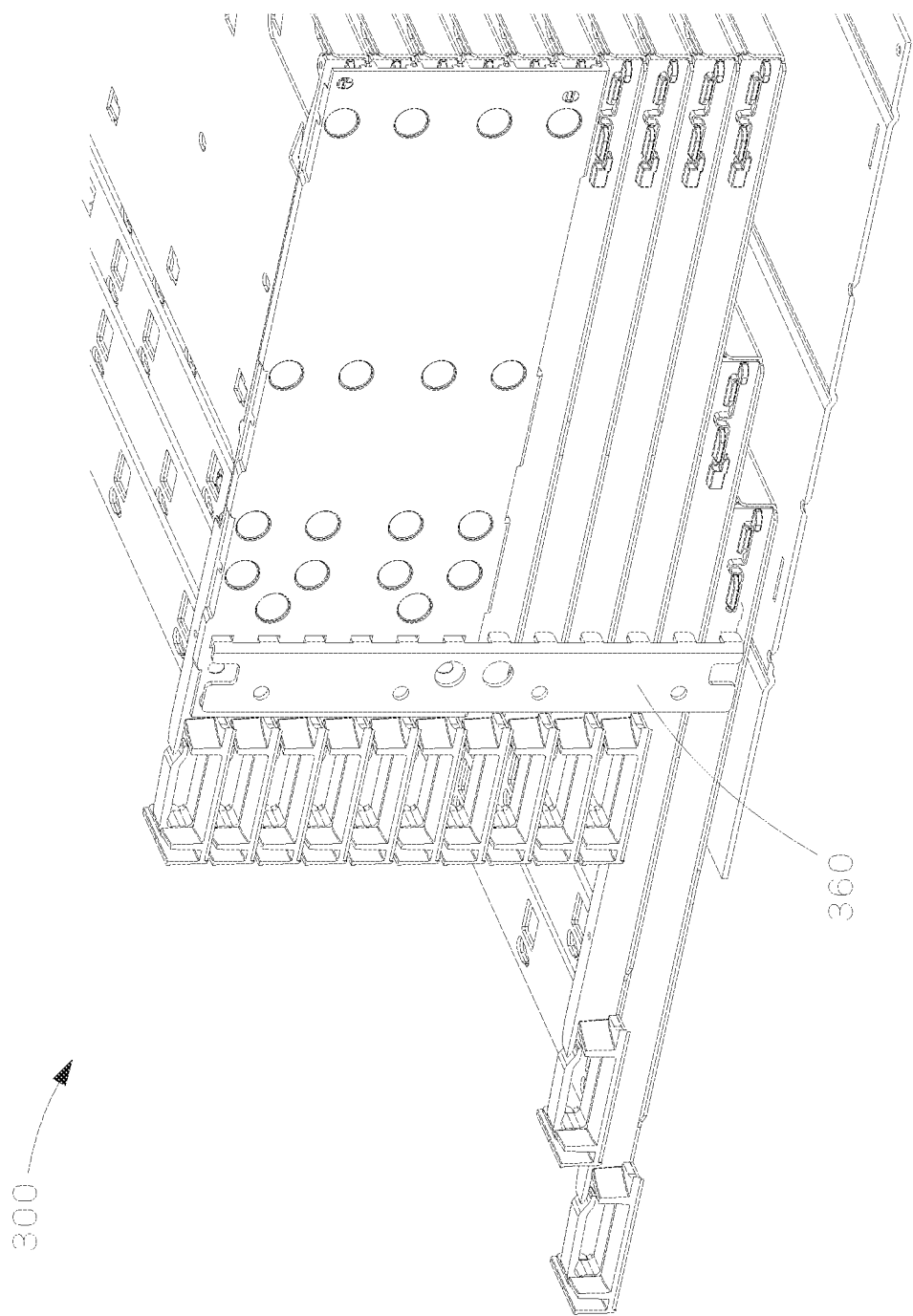
FIG. 32 is a perspective partial view of the enclosure shown in FIG. 20 having a side wall removed to reveal internal components including a final stop bracket, according to some embodiments.

FIG. 31 is a side view of the enclosure 300 having side wall 33 removed to show the internal components that enable the sliding mechanisms of the cassette tray 310. The enclosure 300 is equipped with rail guides 334 having a number of detents 331, 332, 333 for accepting the stop protrusion 317 to create a same number of stop positions. The rail guides 334 include a first detent 331 (fully inserted stop position), a second detent 332 (intermediate stop position), and a third detent 333 (fully extended stop position). For exemplary purposes, cassettes in group A are positioned in the fully inserted stop position, cassette B is positioned in the intermediate stop position, and cassette C is positioned in the fully extended stop position. Based on the unique dimensions of the enclosure that includes the open spaces 301 at the outer side edges of the enclosure 300, a final stop bracket 360 is provided (as seen in FIG. 32) for providing the final stop member 345 positioned beyond the third detent 333 and configured to prevent the cassette tray 310 from falling out the enclosure 300. This sliding mechanism is the same, or substantially the same for the sliding of the cassette tray 210 within the enclosure 200.

Figure 33:
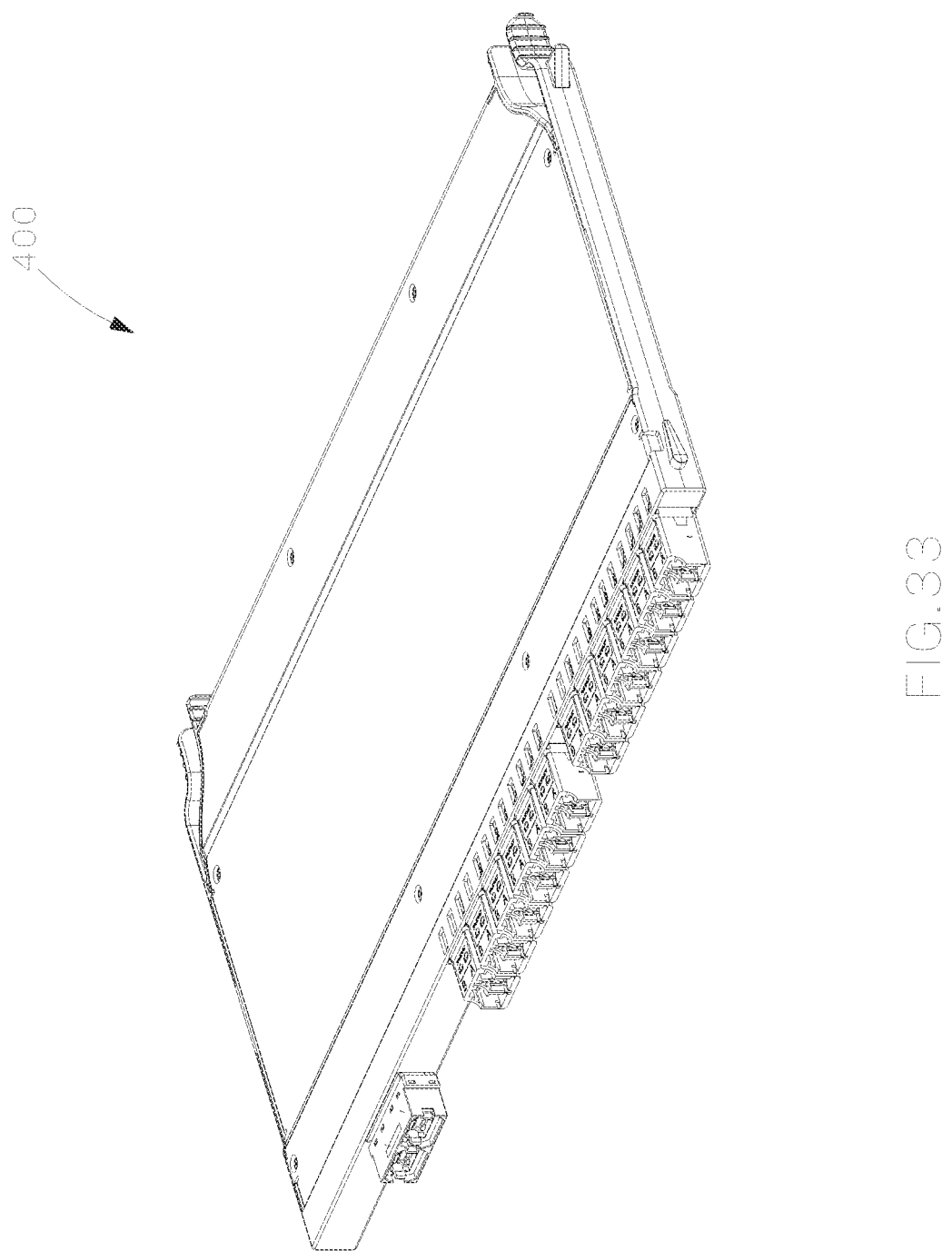
FIG. 33 is a perspective view of a first exemplary cassette for use in the cable management system, according to some embodiment.
Figure 34:
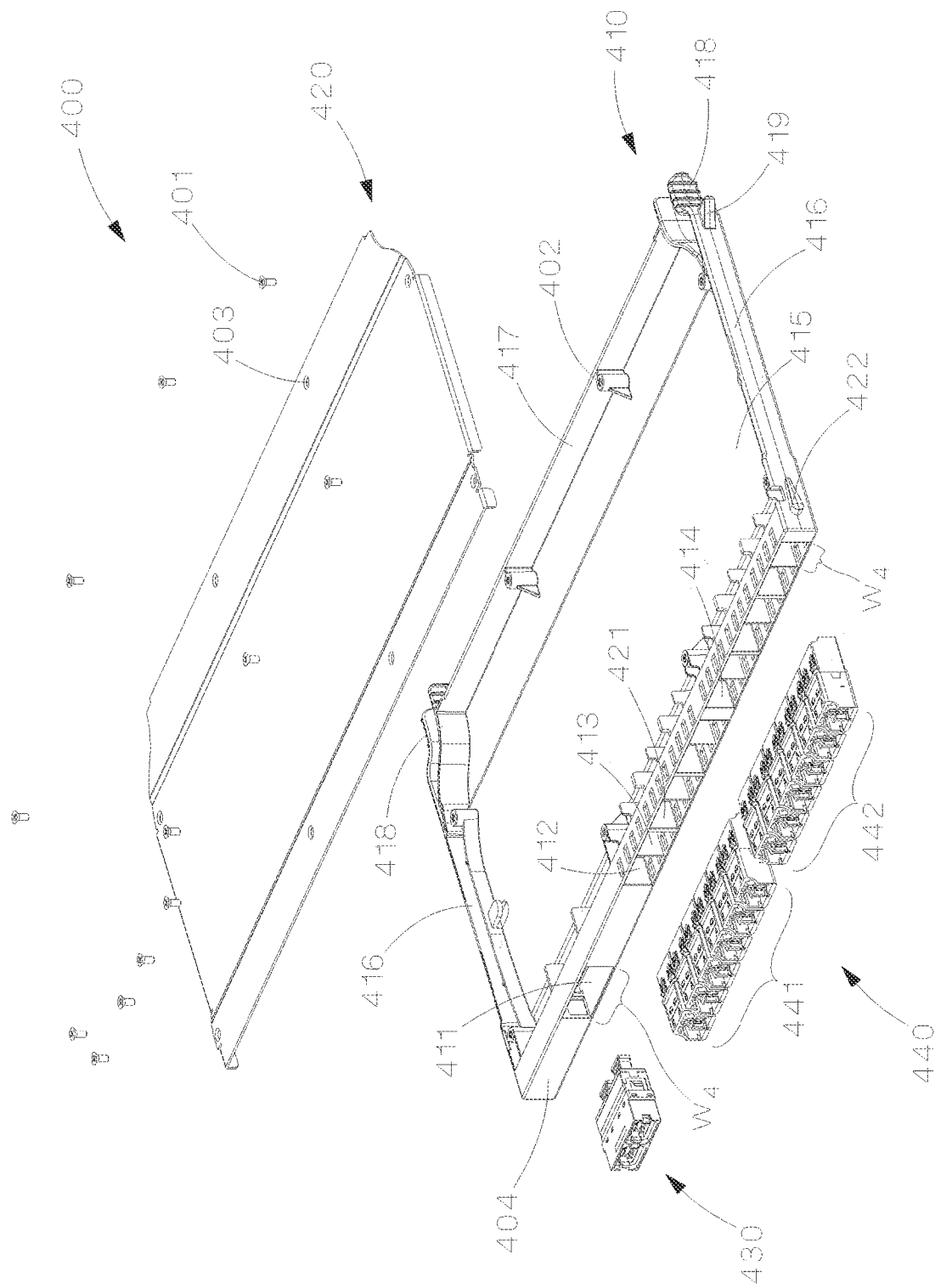
FIG. 34 is an perspective exploded view of the first exemplary cassette shown in FIG. 33.

FIG. 33 shows a first exemplary cassette 400, and FIG. 34 shows a perspective exploded view of the cassette 400. The cassette 400 includes a top cover 420 and housing body 410, where the top cover 420 is secured to the housing body 410 using a plurality of fasteners 401 that fit through fastener openings 403 in the top cover 420 and screwed into fastener openings 402 in the housing body 410. The top cover 420 may be made from aluminum to increase rigidity while reducing overall weight of the cassette 400. The housing body 410 may be made from a molded plastic material.

The housing body 410 includes a front face 404 that includes a first opening 411 for installing a first adapter 430, and a plurality of second openings 412 for installing a group of second adapters 440. The first adapter 430 may be a duplex MPO adapter, and the second adapter 440 may be a duplex LC adapter. According to other embodiments, the first adapter 430 may be a group of two simplex MPO adapters, with the corresponding first openings 411. As shown in FIG. 34, the first opening 411 has a width $w_3$ and each of the second openings 412 have a width $w_4$ for receiving their respective adapters. Second openings 412 may be separated by a first dividing wall 413 having a first thickness/width, where the first dividing wall 413 is slightly recessed in from the front face 404. Every second of the second openings 412 may be separated by a second dividing wall 421 having a second thickness/width that is slightly larger than the first thickness/width. The second adapters 440 and their respective second openings 412 are grouped into two groups, a first group 441 including six of the second adapters 440 and a second group 442 including six of the second adapters 440. The second openings 412 corresponding to the first group 441 and the second openings 412 corresponding to the second group 442 are separated by a third dividing wall 414 that is thicker/wider than the first dividing wall 413 and the second dividing wall 421. The cassette 400 allows for up to 24 fiber connections using the 12 LC duplex adapters. An area of the front face 404 including either a front opening 411 or second opening 412 is greater than an area that does not include such openings.

The housing body 410 further includes side walls 416 at opposing sides, a back wall 417. On the side walls 416 are included a front post 422, a rear post 419, and a release latch 418.

Figure 35:
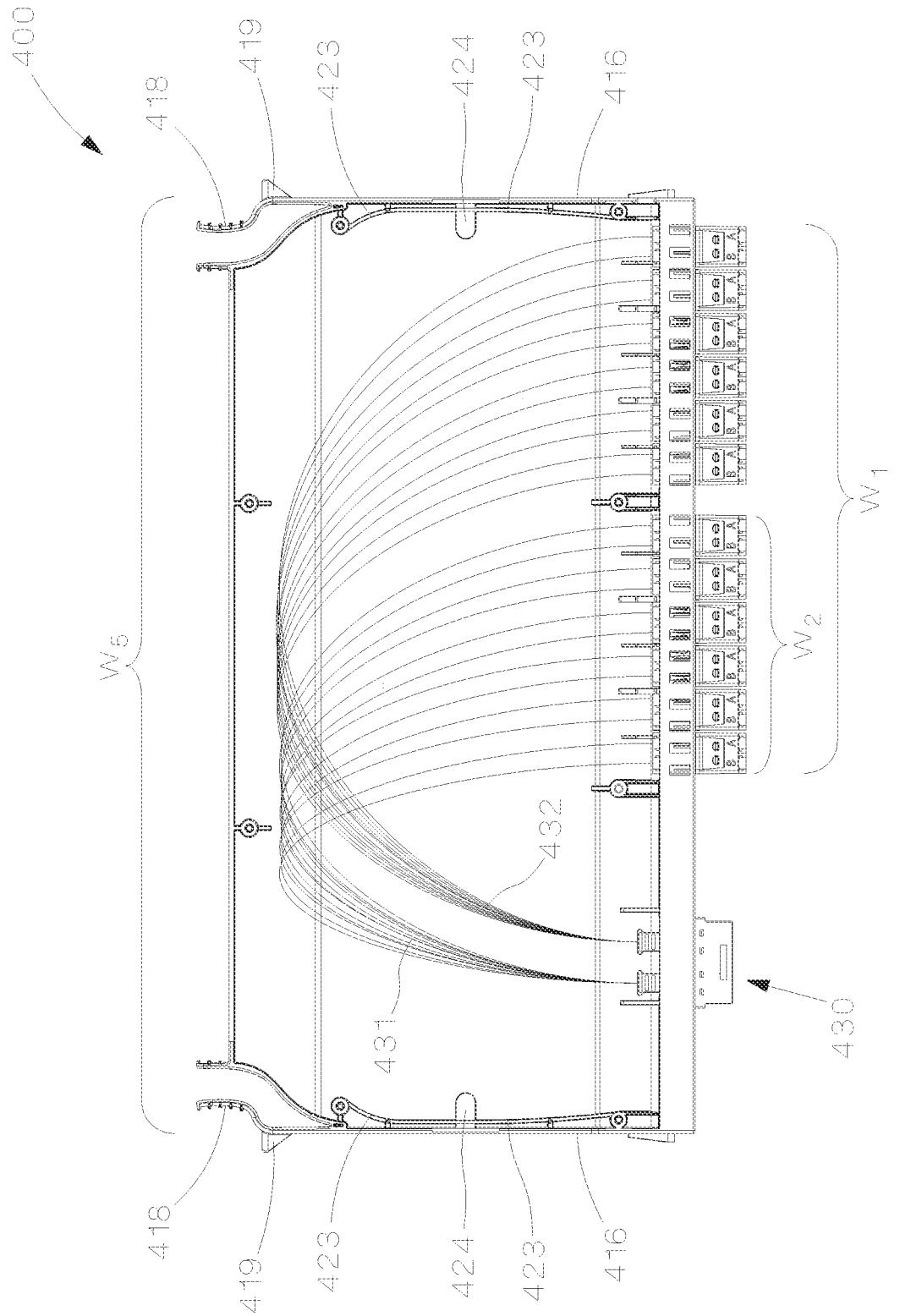
FIG. 35 is a top-down partial view of the first exemplary cassette with a top cover removed to reveal internal components.

FIG. 35 shows the inner workings of the housing body 410 where a first fan out of fibers 431 from the first adapter 430 (first MPO) is configured to be routed to the second set of adapters 440 in the first group 441, and a second fan out of fibers 432 from the first adapter 430 (second MPO) is configured to be routed to the second set of adapters 440 in the second group 442. A width $w_1$ for the area covering the second adapters 440 is approximately 175.5 mm, while a width $w_2$ for the first group 441, or second group 442, of second adapters 440 is approximately 84.9 mm. A width $w_5$ for the cassette 400 measured between the side walls 416 is approximately 292.61 mm (11.52 inches). In this configuration, the cassette 400 enables up to 24 fiber connections, and up to 72 fiber connections per RU space. FIG. 35 also shows fiber wall protectors 423 on both the side walls 416, where the fiber wall protectors 423 prevent the individual fibers 431, 432 within the housing body 410 from moving to the side walls 416 where they might be pinched by the top cover 420 during assembly. The fiber wall protectors 423 include a rounded end portion that curves in towards the inside of the cassette 400. The rounded ends assist in contouring the fibers 431, 432 as they travel from their fanouts from the first adapters 430 to the second adapters 440. Protruding tabs 424 on either side further help prevent the fibers 431, 432 from moving over the tops of the side walls 416 where they are at risk of being pinched during assembly when the top cover 420 is brought down onto the housing body 410.

Figure 36:
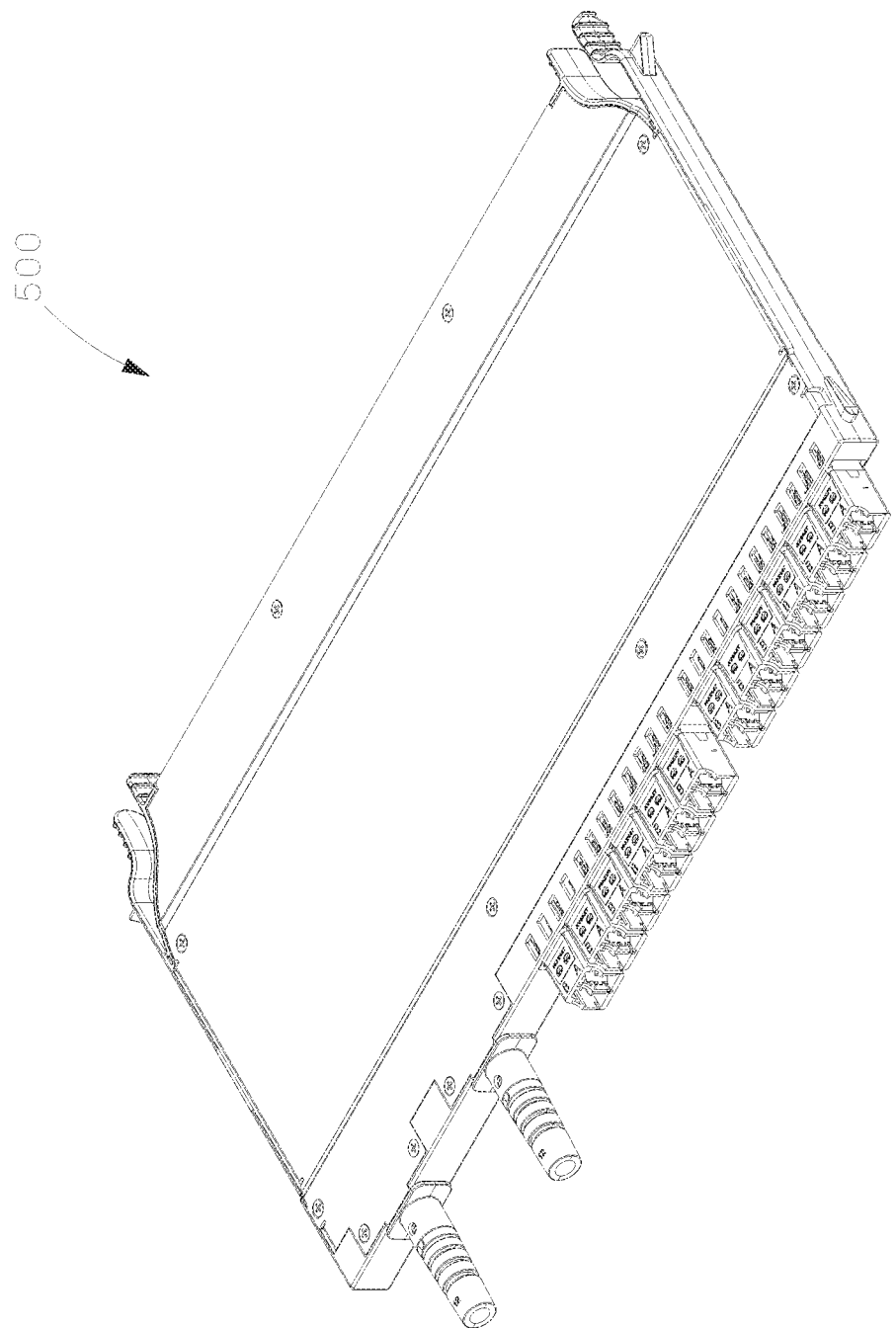
FIG. 36 is a perspective view of a second exemplary cassette for use in the cable management system, according to some embodiment.
Figure 37:
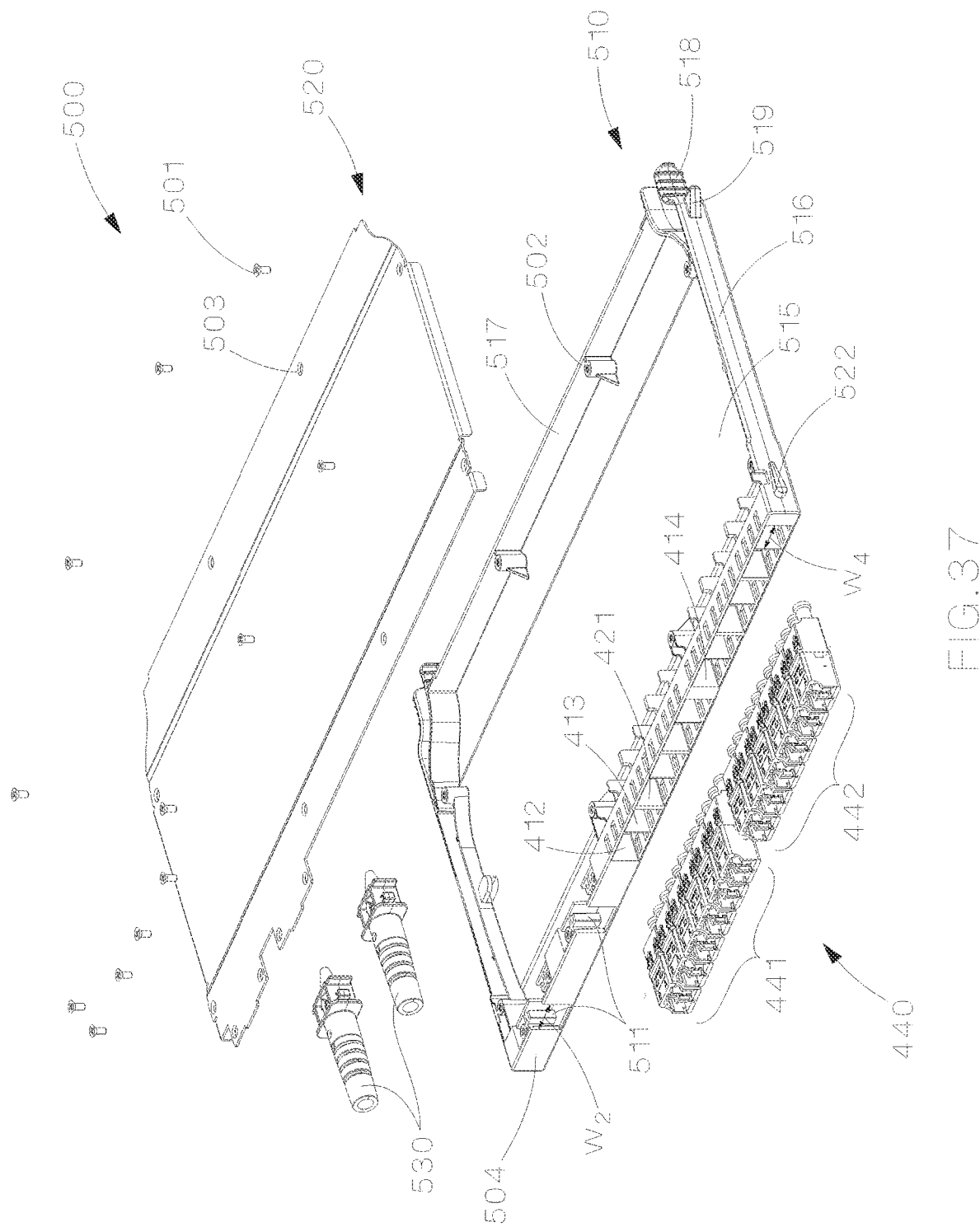
FIG. 37 is a perspective exploded view of the second exemplary cassette shown in FIG. 36.

FIG. 36 shows another exemplary cassette 500, and FIG. 37 shows a perspective exploded view of the cassette 500. The components comprising the cassette 500 are substantially the same as the cassette 400. The main difference is that a front face 504 of the housing body 510 includes a different type of first adapters 530 and subsequently, different sized front openings 511 for the first adapters 530 compared to the first adapter 430 in cassette 400. The top cover 520 may also be modified to account for the shape and dimensions of the first adapters 530 that are different from the first adapter 430. The number and layout of the group of second adapters 440 and corresponding second openings 412 in the cassette 500 are the same as in cassette 400.

The top cover 520 is secured to the housing body 510 using a plurality of fasteners 501 that fit through fastener openings 503 in the top cover 520 and screwed into fastener openings 502 in the housing body 510. The top cover 520 may be made from aluminum to increase rigidity while reducing overall weight of the cassette 500. The housing body 510 may be made from a molded plastic material. The housing body 510 further includes side walls 516 at opposing sides, and a back wall 517. On the side walls 516 are included a front post 522, a rear post 519, and a release latch 518.

The housing body 510 includes the front face 504 having first openings 511 for installing the first adapters 530, and a plurality of second openings 412 for installing the second adapter 440. The first adapter 530 may be two separate epoxy cable transition adapters, and the second adapter 540 may be the duplex LC adapters also installed into the cassette 400. The epoxy cable transition adapters are described, for example, in more detail in U.S. patent app. Ser. No. 16/245,441 (filed Jan. 11, 2019), now U.S. Pat. No. 10,656,360 (issued May 19, 2020), the entirety of which is hereby incorporated by reference herein. Each of the first openings 511 have a width $w_3$ to accommodate the epoxy cable transition adapters, and each of the second openings have a width $w_4$ for receiving their respective adapters same as in cassette 400. The cassette 500 includes the same number of second adapters 440 as the cassette 500, thus also allowing for up to 24 fiber connections. An area of the front face 504 including either a front opening 511 or second opening 412 is greater than an area that does not include such openings.

Figure 38:
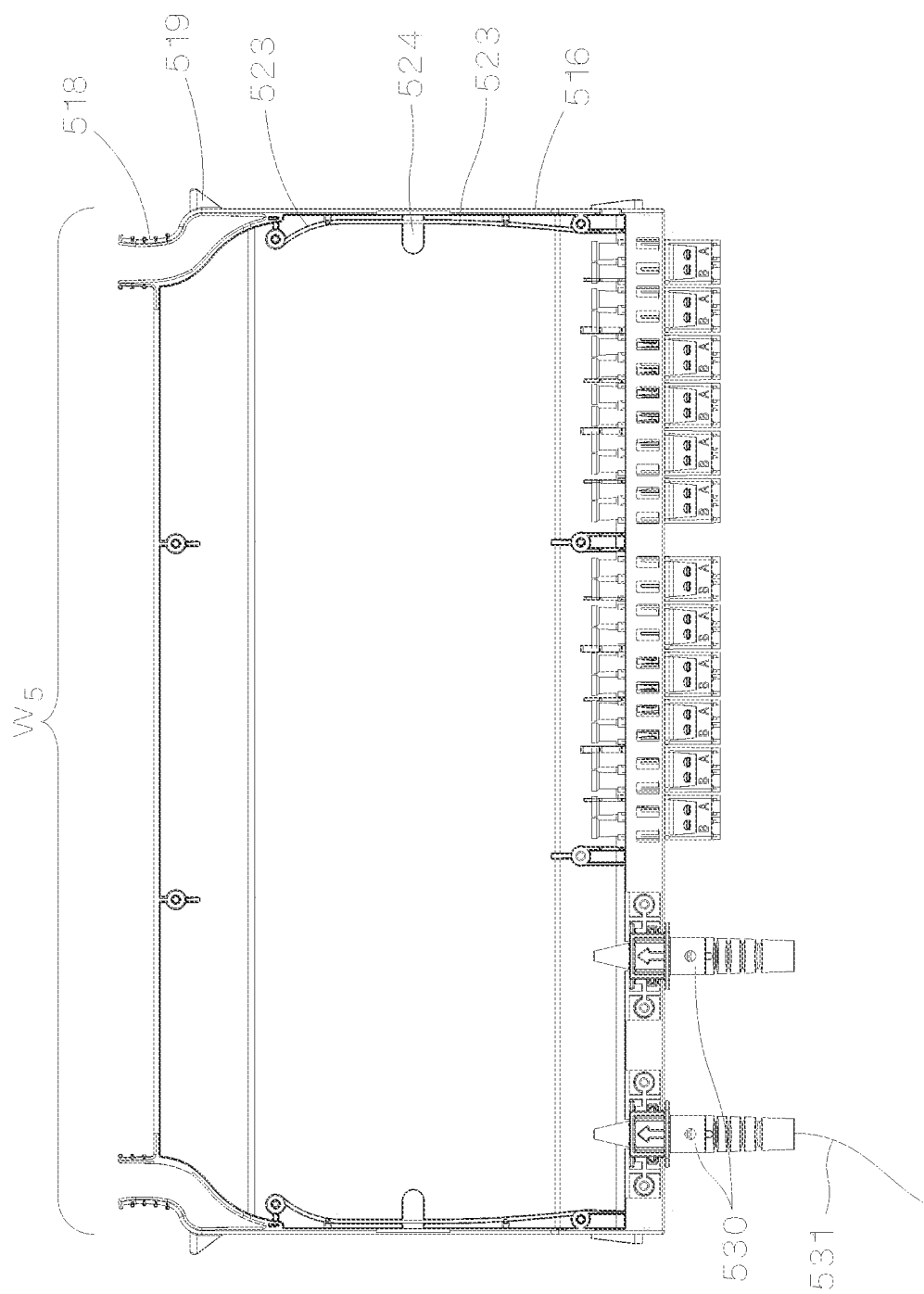
FIG. 38 is a top-down partial view of the second exemplary cassette with a top wall removed to reveal internal components.

FIG. 38 shows the inner workings of the housing body 510 where a first fiber cable 531 coming into a first adapter 530 will fan out to the second adapters 440 in the first group 441, and a second fiber cable 532 coming into a first adapter 530 will fan out to the second adapters 440 in the second group 442. In this configuration, the cassette 500 enables up to 24 fiber connections, and up to 72 fiber connections per RU space. The widths ($w_1$, $w_2$, $w_4$) corresponding to the second adapter 440 and the overall cassette width $w_5$ are the same as provided in the cassette 400. FIG. 38 also shows fiber wall protectors 523 along both the side walls 516, where the fiber wall protectors 523 prevent the individual fibers from the cables 531, 532 within the housing body 510 from moving to the side walls 516 where they might be pinched by the top cover 520 during assembly. The fiber wall protectors 523 include a rounded end portion that curves in towards the inside of the cassette 500. The rounded ends assist in contouring the fibers from the cables 531, 532 as they travel from their fanouts from the first adapters 530 to the second adapters 540. Protruding tabs 524 on either side further help prevent the fibers from the cables 531, 532 from moving over the tops of the side walls 516 where they are at risk of being pinched during assembly when the top cover 520 is brought down onto the housing body 510. Although two epoxy transition type of first adapters 530 each supporting up to 12 fiber connections are shown, according to other embodiments a single epoxy transition type of first adapter and corresponding single first opening may be used instead that supports up to 24 fiber connections.

Figure 39:
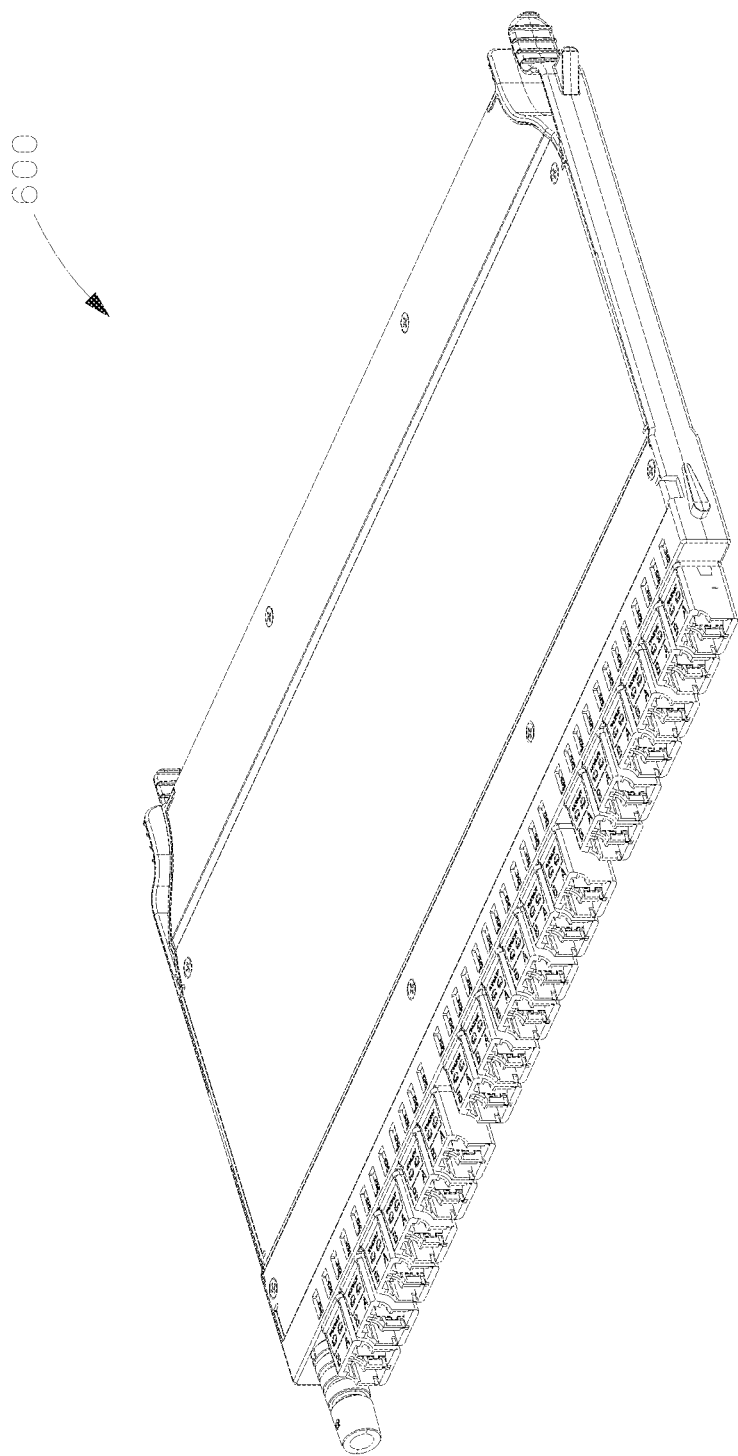
FIG. 39 is a perspective view of a third exemplary cassette for use in the cable management system, according to some embodiment.
Figure 40:
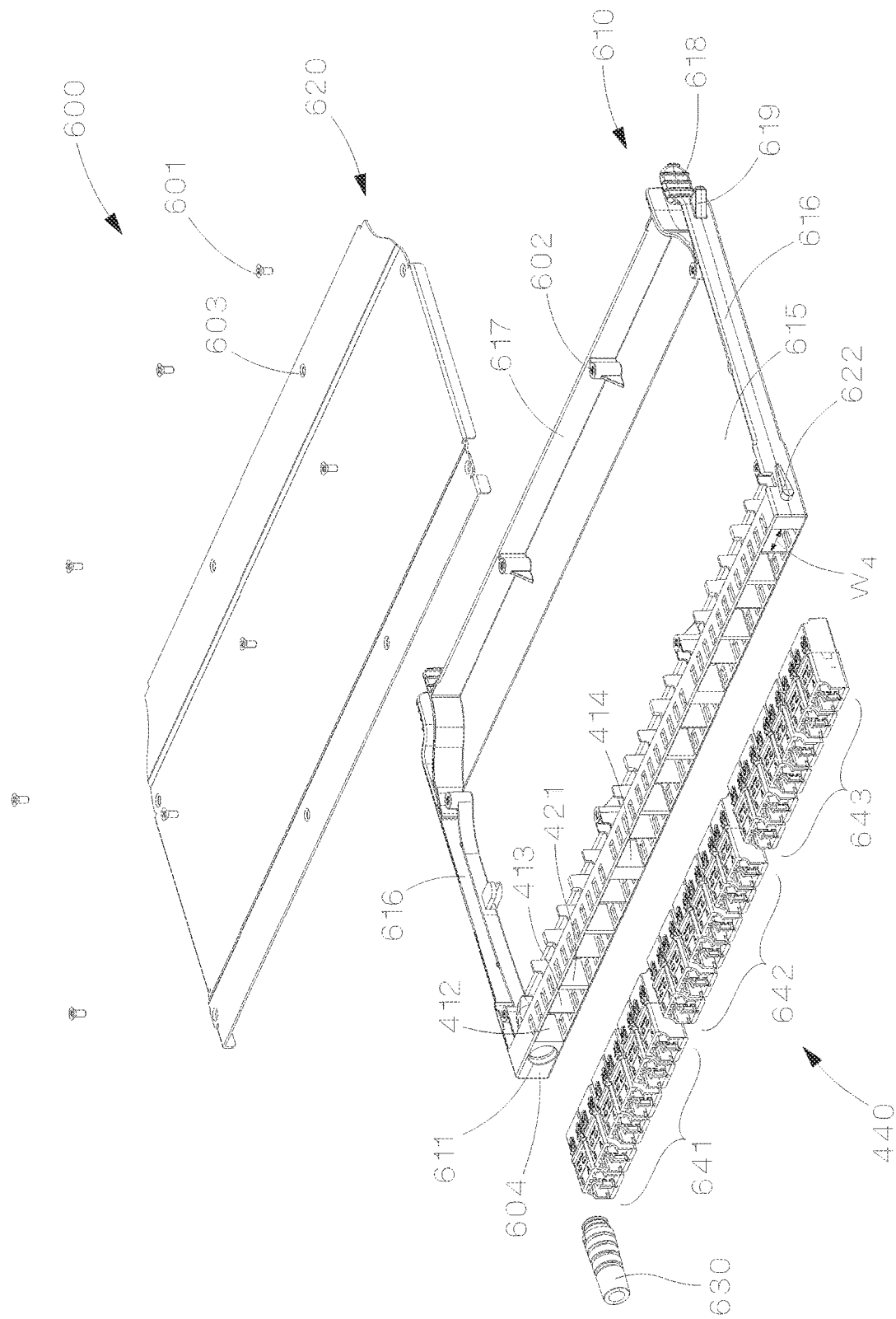
FIG. 40 is a perspective exploded view of the third exemplary cassette shown in FIG. 39.

FIG. 39 shows another exemplary cassette 600, and FIG. 40 shows a perspective exploded view of the cassette 600. The components comprising the cassette 600 are substantially the same as the cassette 400. The main difference is that a front face 604 of the housing body 610 includes a different type of integrated first adapter 630 and subsequently, different sized front opening 611 for the integrated first adapter 630 compared to the first adapter 430 included in the cassette 400. The top cover 620 may also be modified to account for the shape and dimensions of the first adapter 630 that are different from the first adapter 430. The number of the second adapters 440 and corresponding second openings 412 in the cassette 600 are increased from the cassette 400 to now include 18 duplex LC adapters enabling up to 36 fiber connections in the cassette 600.

The top cover 620 is secured to the housing body 610 using a plurality of fasteners 601 that fit through fastener openings 603 in the top cover 620 and screwed into fastener openings 602 in the housing body 610. The top cover 620 may be made from aluminum to increase rigidity while reducing overall weight of the cassette 600. The housing body 610 may be made from a molded plastic material. The housing body 610 further includes side walls 616 at opposing sides, and a back wall 617. On the side walls 616 are included a front post 622, a rear post 619, and a release latch 618.

Figure 66:
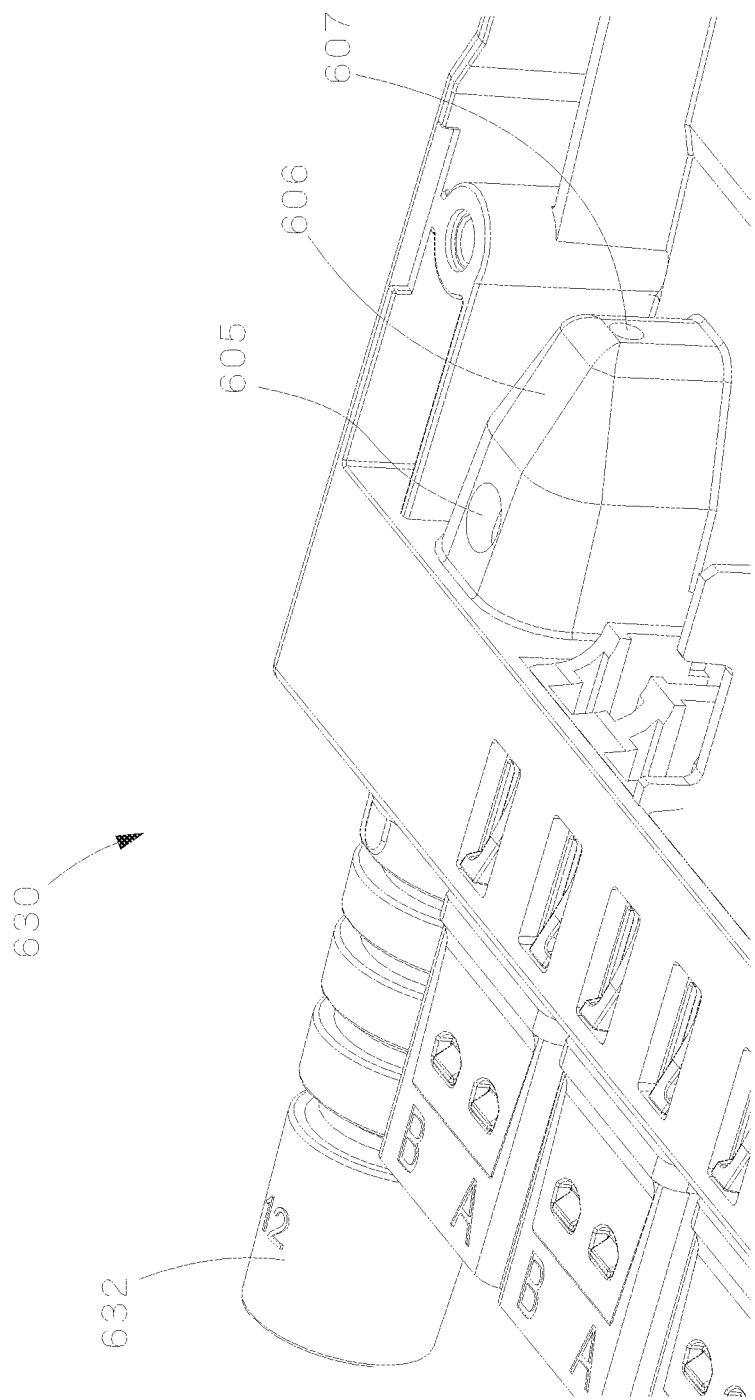
FIG. 66 is a perspective view of a portion to the third exemplary cassette shown in FIG. 39.

The housing body 610 includes the front face 604 that includes first opening 611 for installing the integrated first adapter 630, and a plurality of second openings 412 for installing the groups of second adapters 440. The integrated first adapter 630 is actually provided in two parts. As shown in FIG. 66, the first part to the integrated first adapter 630 comprises a flexible boot 632, and the second part comprises an integrated epoxy transition 606. The integrated epoxy transition 606 is integrated as part of the housing body 610 that defines the first opening 611. The integrated epoxy transition 606 includes an epoxy fill hole 605 on a top roof, an exit hole 607, and a tapered cable tunnel 608 that defines an inner housing formed into the housing body 610. By integrating the epoxy transition elements into the housing body 610 directly, the need for a separate epoxy transition component (e.g., as used in cassette 500) is obviated. This reduces the overall footprint of the epoxy transition features in the cassette 600, which enables additional space on the front face 604 to include the high-density number of second openings 412 for installing the groups of second adapters 440 (e.g., duplex LC adapters).

Figure 67:
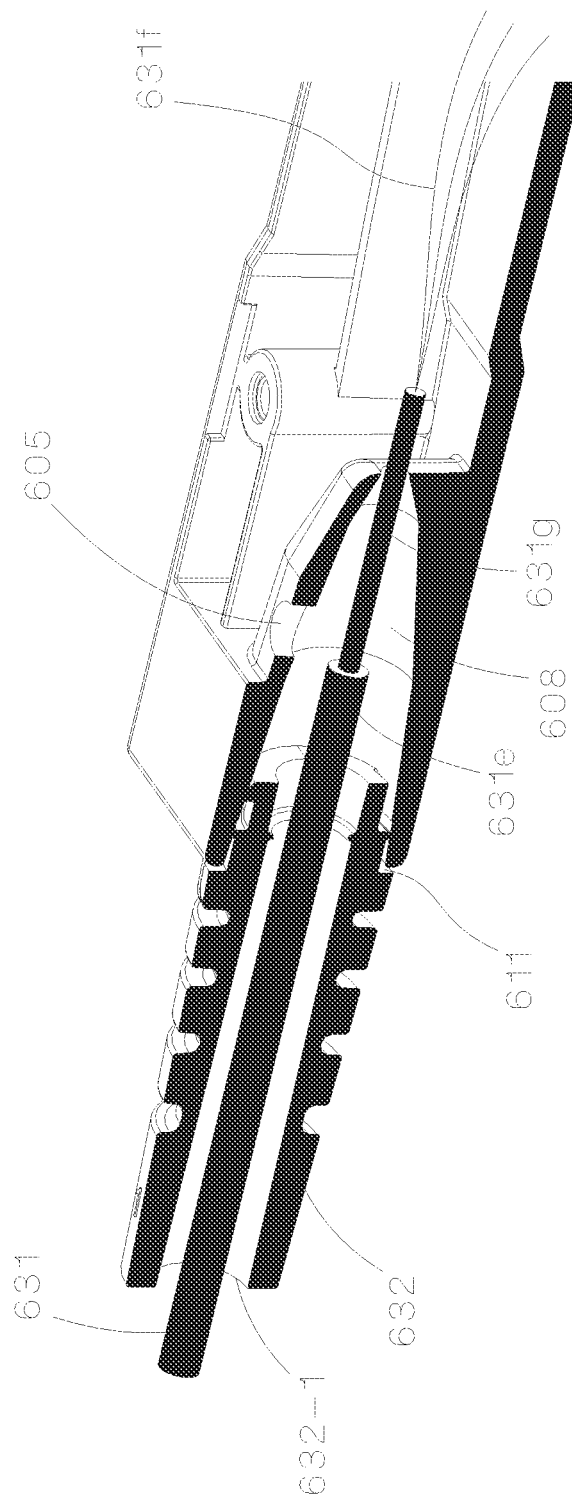
FIG. 67 is a sectional view along the line 67-67 for an adapter included FIG. 66.

As shown in FIG. 67, the first opening 611 is configured to receive the flexible boot 632 that is installed to hold the cable 631. The first opening 611 is the beginning to the tapered cable tunnel 608, where the flexible boot 632 is installed into the first opening 611. The cable 631 may be installed through a boot opening 632-1 and into the tapered cable tunnel 608. Inside the tapered cable tunnel 608, the outer jacket 631e to the cable 631 may be stripped to expose a coated bundle of fibers 631g (e.g., Acrylate coated bundle). Epoxy may then be injected via the epoxy fill hole 605 into the tapered cable tunnel 608 to hold the exposed fibers and/or bundled fibers in place. The individual fibers 631f are then fanned out from the exit hole 607 and routed to their respective second adapters 440.

Each of the second openings have a width $w_4$ for receiving their respective adapters same as in cassette 400. The cassette 600 is a higher density cassette that includes 18 of the second adapters 440 (e.g., duplex LC adapters), for a total of up to 36 fiber connections, which translates to up to 108 fiber connections per RU space. An area of the front face 604 including either a front opening 611 or second opening 612 is greater than an area that does not include such openings.

Figure 41:
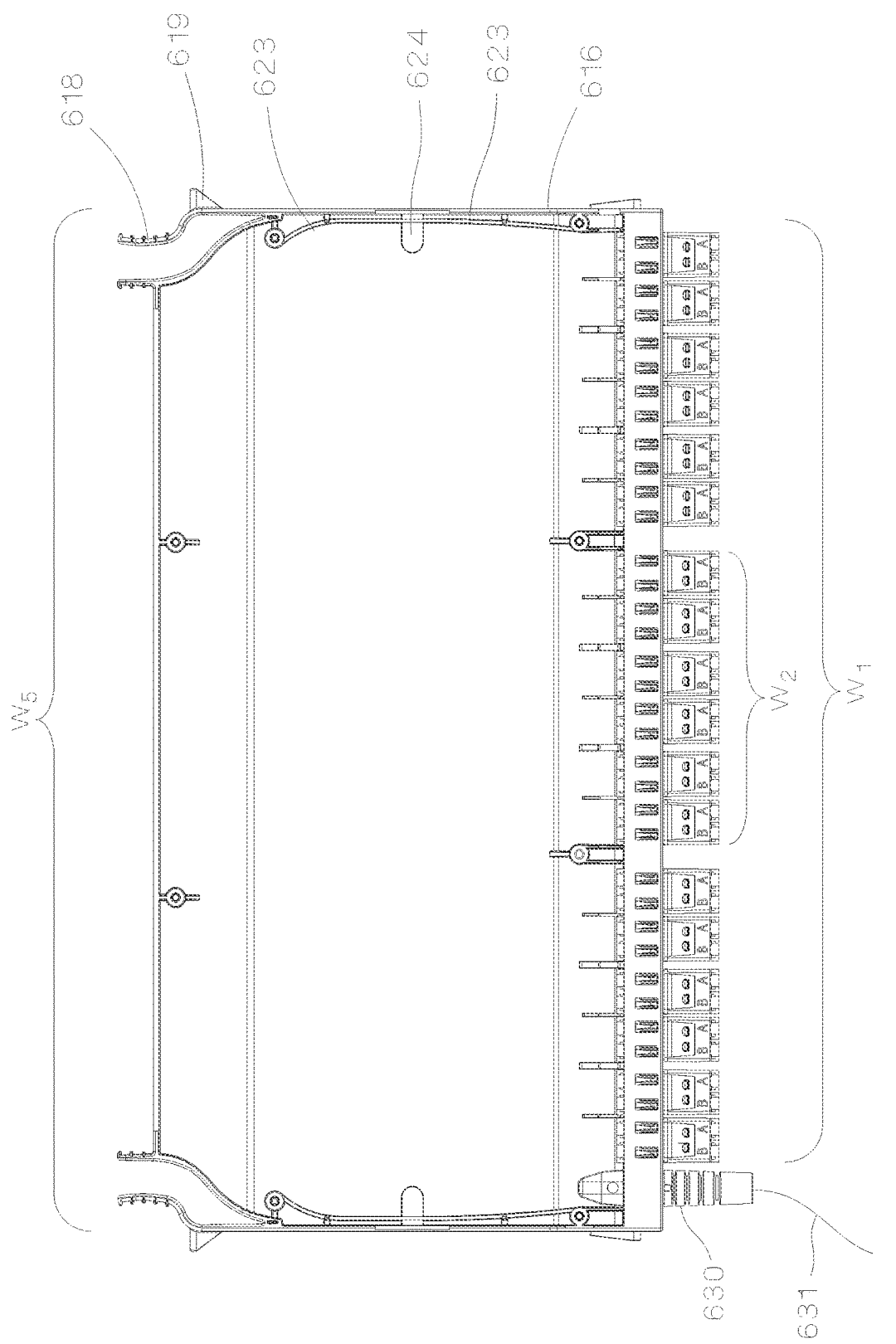
FIG. 41 is a top-down partial view of the third exemplary cassette with a top cover removed to reveal internal components.

FIG. 41 shows the inner workings of the housing body 610. An incoming fiber cable 631 is coupled to the first adapter 630, and fibers from the cable 631 are configured to fan out into a plurality of fibers inside the housing body 610 to connect to each of the second adapters 440. The second adapters 440 are arranged in three distinct groups: a first group 641, a second group 642, and a third group 643. Each of the first group 641, the second group 642, and the third group 643 have a uniform layout similar to the groups in cassette 400, where each group 641, 642, 643 have a width of $w_2$ that is approximately 3.33 inches along the front face 604.

FIG. 41 further shows where a fiber cable 631 coming into a first adapter 530 will fan out to the second adapters 440 in the first group 641, the second group 642, and the third group 643. In this configuration, the cassette 600 enables up to 36 fiber connections, which translates to up to 108 fiber connections per RU space. The widths ($w_2$, $w_4$) corresponding to the second adapter 440 and the overall cassette width $w_5$ are the same as provided in the cassette 400. FIG. 38 also shows fiber wall protectors 623 along both the side walls 616, where the fiber wall protectors 623 prevent the individual fibers from the cables 631 within the housing body 610 from moving to the side walls 616 where they might be pinched by the top cover 620 during assembly. The fiber wall protectors 623 include a rounded end portion that curves in towards the inside of the cassette 600. The rounded ends assist in contouring the fibers from the cables 631 as they travel from their fanouts from the first adapter 630 to the second adapters 540. Protruding tabs 624 on either side further help prevent the fibers from the cable 631 from moving over the tops of the side walls 616 where they are at risk of being pinched during assembly when the top cover 620 is brought down onto the housing body 610.

Figure 42:
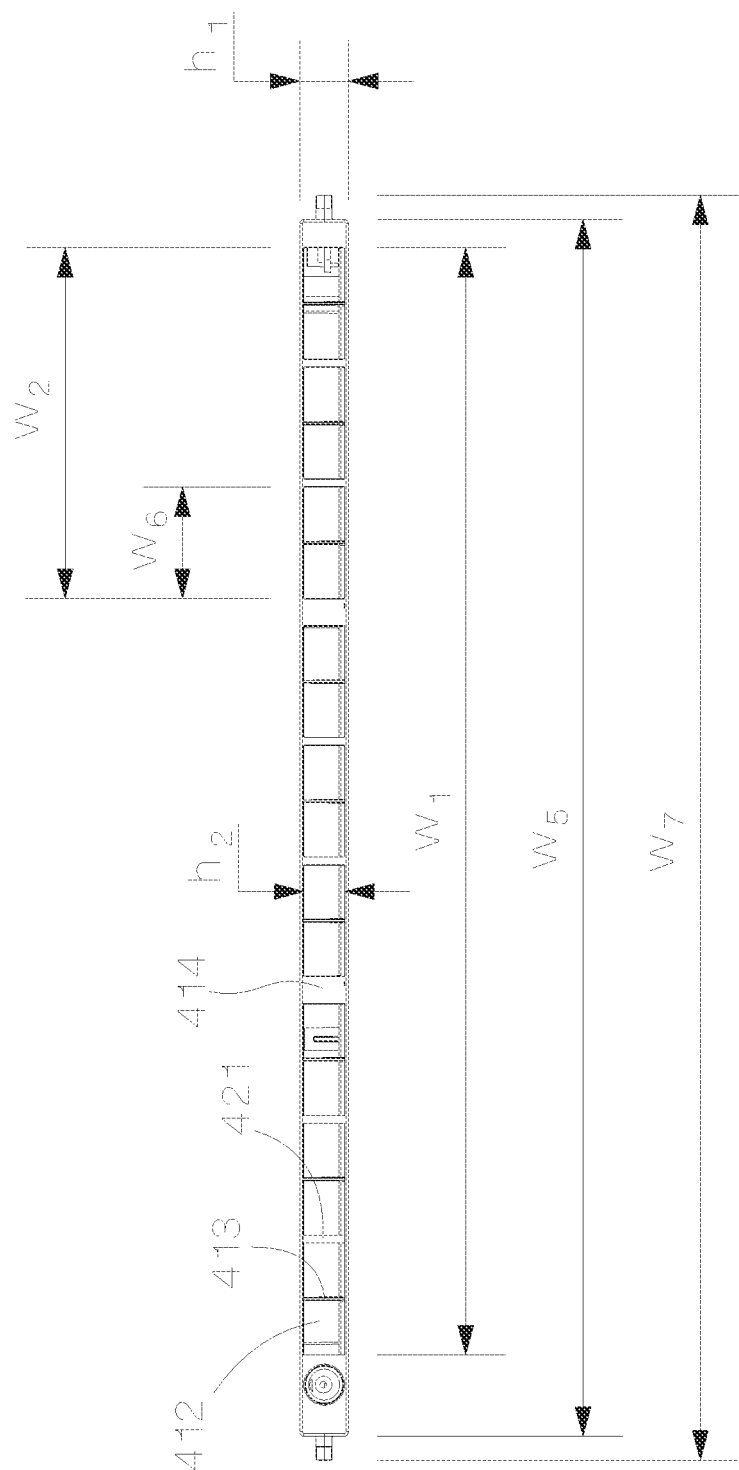
FIG. 42 is a front view of the third exemplary cassette showing openings for receiving fiber optic adapters.

As shown in FIG. 42, a width $w_1$ of the area occupied by the second adapters 440 is approximately 10.49 inches, while a width $w_5$ of the overall cassette 600 is approximately 11.52 inches. A width $w_7$ of the cassette 600 including the front posts 422 is approximately 11.98 inches. A height $h_2$ of the cassette is approximately 0.46 inches. A height hi for the second opening 412 is approximately 0.39 inches, while a width $w_6$ of two second openings 412 adjacent to each other is approximately 1.06 inches. Each set of two second openings 412 may be separated by the second dividing wall 421 that is thicker than the first dividing wall 413, where the second divider wall 421 is thinner than the third dividing wall 414. The individual dimensions relating to the second opening 412 and dividing walls 413, 414, 421 may be the same for other cassettes 400, 500.

Figure 43:
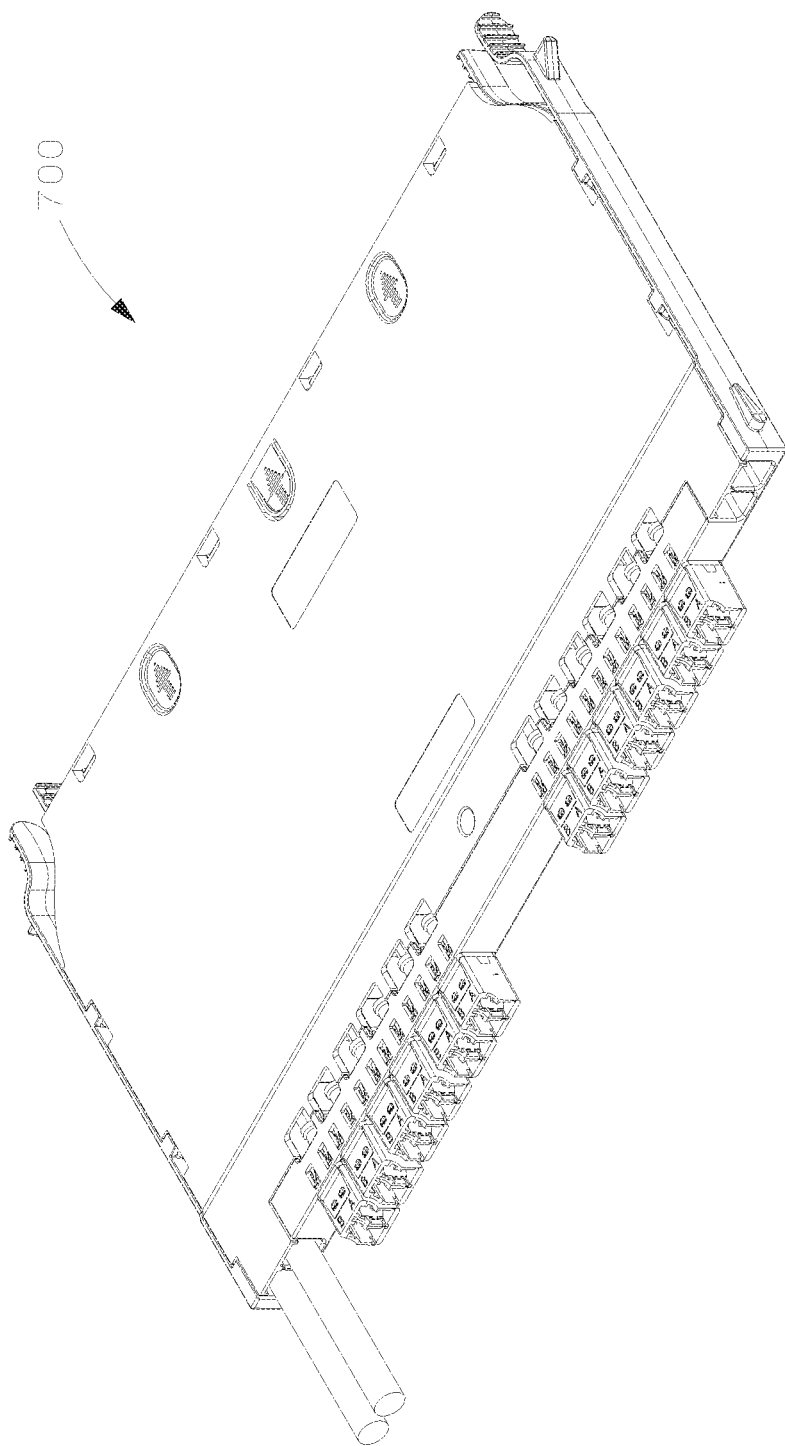
FIG. 43 is a perspective view of a fourth exemplary cassette for use in the cable management system, according to some embodiment.
Figure 44:
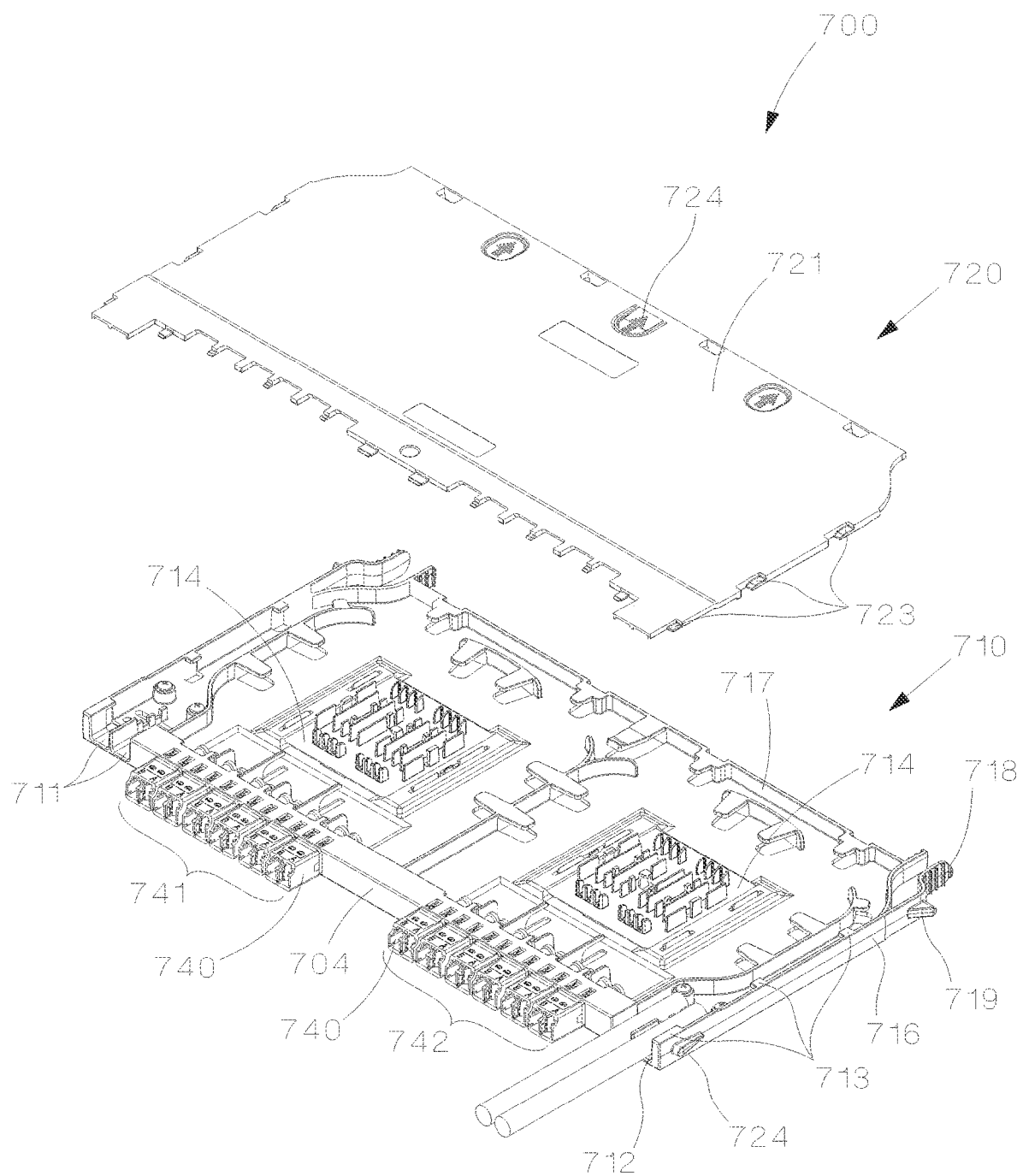
FIG. 44 is a perspective exploded view of the fourth exemplary cassette.

FIG. 43 shows another exemplary cassette 700, the cassette 700 allowing for ambidextrous input cable insertion. FIG. 44 shows the cassette 700 includes a top cover 720 and housing body 710. The top cover 720 includes a top surface 721 and a thumb latch 724 for assisting in sliding the top cover 720. The top cover 720 also includes sliding retention features (e.g., hooks) 723 for engaging corresponding sliding retention features 713 (e.g., latches) on the housing body 710. The system of sliding retention features 713, 723 engage together to secure the top cover 720 to the housing body 710, as well as to disengage to allow the top cover 720 to be removed from the housing body 710.

The housing body 710 includes a front face 704 that includes first openings 711, 712 on opposite sides to enable cables 701, 702 to be installed on either side, or even both sides, of the housing body 710. Second adapters 740 may be installed into second openings 745 that are also included on the front face 704, where the second openings 745 may be the same dimensions as the second openings 412 discussed herein. A first set 741 of the second adapters 740 may be separate from a second set 742 of the second adapters 740. The second adapters 740 may be duplex LC adapters, so that the cassette 700 includes 12 duplex LC adapters for up to 24 fiber connections, and up to 72 fiber connections per RU space.

Figure 45:
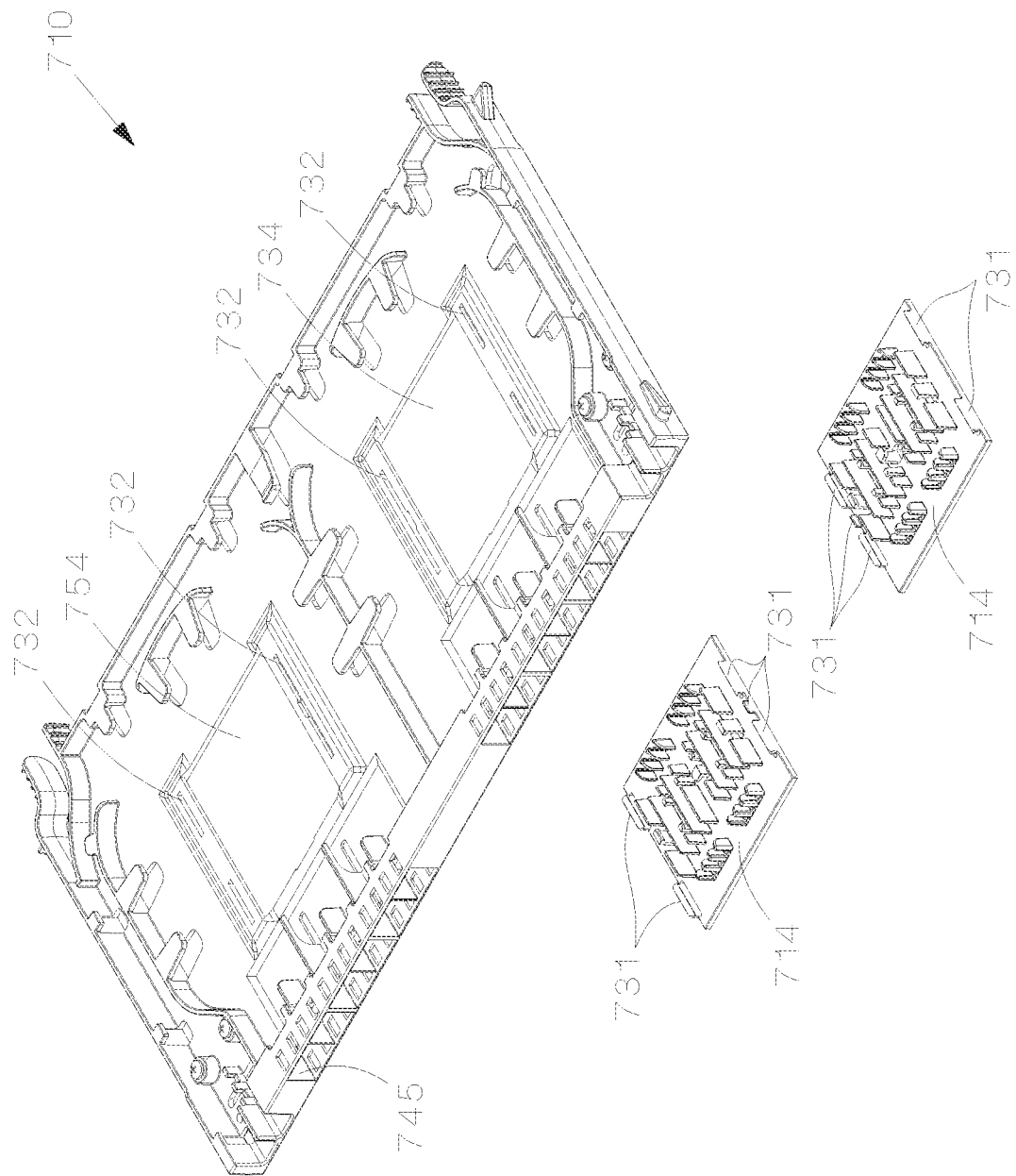
FIG. 45 is a perspective partial view of the fourth exemplary cassette showing an installation of a splice tray into a bottom floor of the fourth exemplary cassette.

The housing body 710 includes side walls 716 at opposing sides, a back wall 717, and a bottom floor 715. A front post 722, a rear post 719, and release latch 718 are included in the side walls 716. The bottom floor 715 includes a removable splice protector insert 714. As shown in FIG. 45 the splice protector inserts 714 are installed from the bottom into tray openings 734 in the bottom floor 715.

Figure 46:
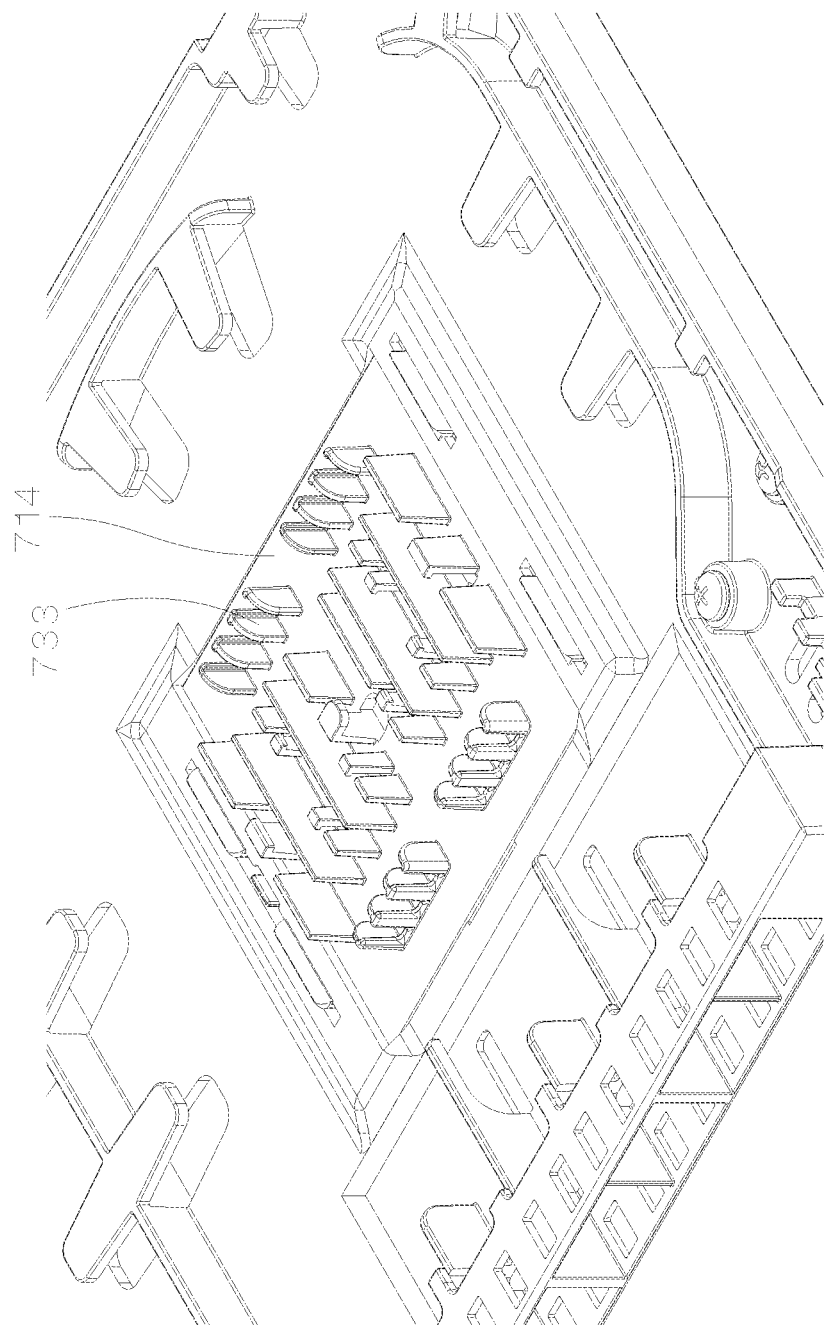
FIG. 46 is a partial perspective view of the fourth exemplary cassette showing the splice tray installed into the bottom floor.

FIG. 46 shows the splice protector insert 714 as it is installed onto the bottom floor 715. Snap latches 731 of the splice protector insert 714 are configured to insert and snap into corresponding latch openings 732 in the bottom floor 715 for securing the splice protector insert 714 to the bottom floor 715. The splice protector insert 714 includes various protection features 733 for holding and protecting fiber splice components.

Figure 47:
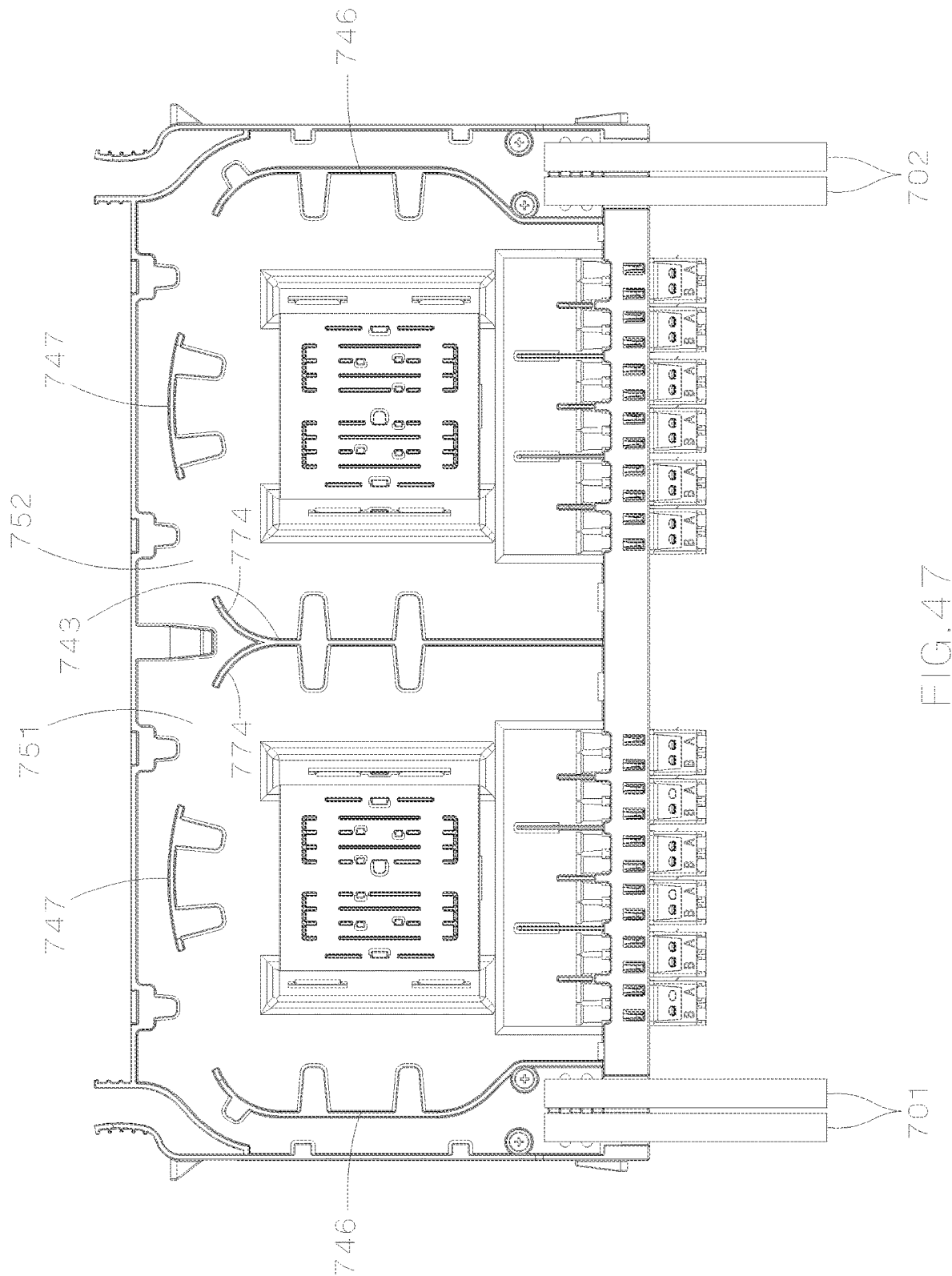
FIG. 47 is a top-down partial view of the fourth exemplary cassette with a top cover removed to reveal internal components.

FIG. 47 illustrates fiber routing features inside the housing body 710 of the cassette 700. On the inside of the housing body 710, each side includes a routing wall 746 configured to define a routing path for including cables on one side. The routing walls 746 have a rounded bend for routing internal fibers towards the splice protector insert 714 located more in the center of the bottom floor 715, as well as top fingers to prevent fibers from reaching up and touching the top cover 720. The inside of the housing body 710 also includes rear routing walls 747 having a rounded bend and top fingers. The inside of the housing body 710 also includes a center wall 743 having rounded ends 744 and top fingers. As shown in FIG. 47, the incoming cables 701, 702 can fit into either the left side first openings 711 or the right side front openings 712 to offer enhanced installation flexibility options for an installer. The cables may be inserted into the openings 711, 712 and secured using a cable tie, with the optional to use a screw to further secure the cable's strength member to the openings 711, 712. According to some embodiments, cables 701, 702 may be installed into both the left side first openings 711 and the right side front openings 712. One or more of the left side first openings 711 or the right side front openings 712 may be plugged closed when not in use to receive the cables 701, 702.

Figure 48:
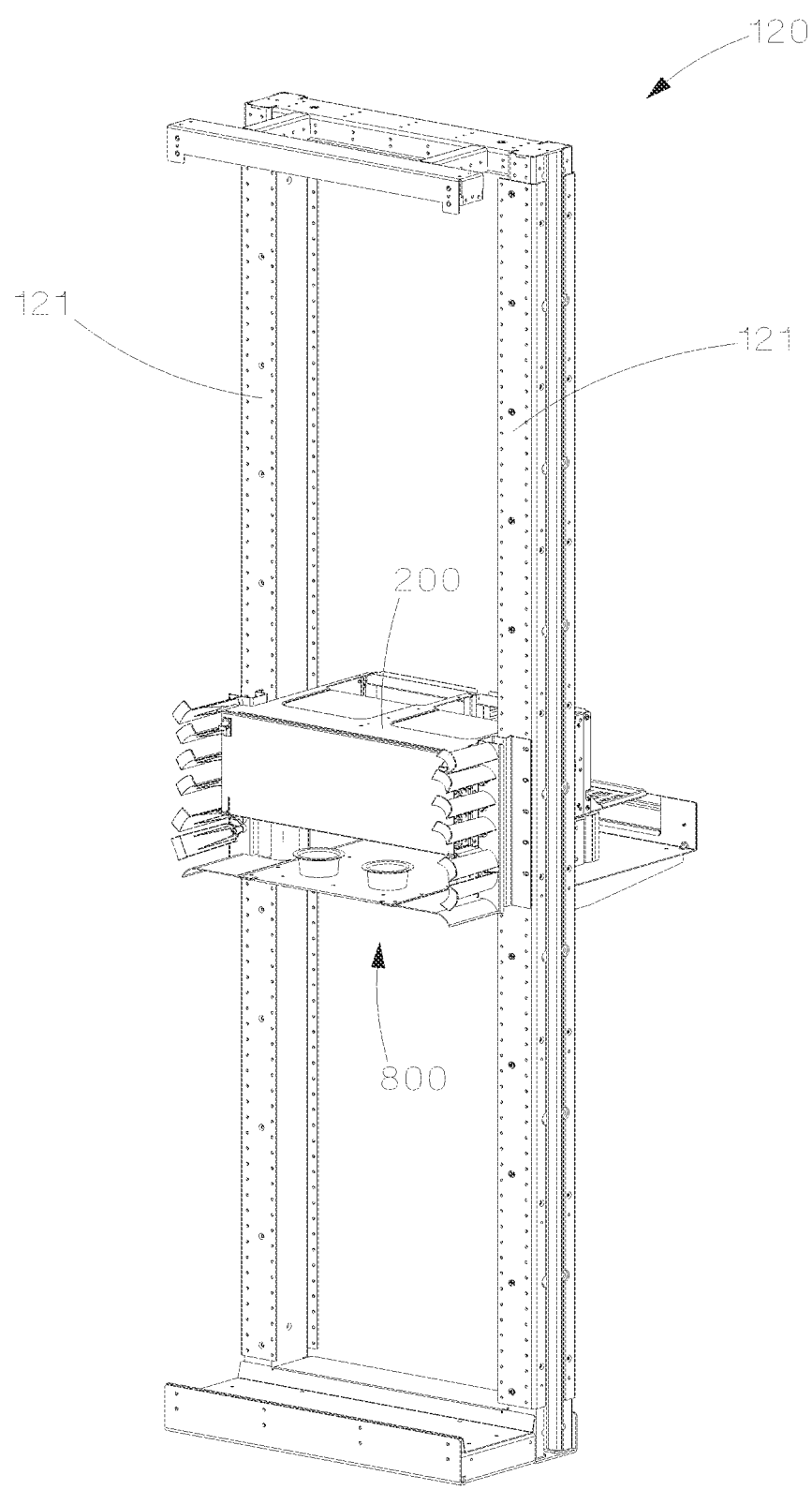
FIG. 48 is a perspective view of an enclosure rack including both an exemplary enclosure and pass-through cable manager installed, according to some embodiments.

FIG. 48 shows an exemplary pass-through cable manager 800 of the enclosure rack system 120, where the pass-through manager 800 is configured to be installed under an enclosure (e.g., enclosure 200, 300) to provide additional cable management features for routing cables interfacing the enclosure 200.

Figure 49:
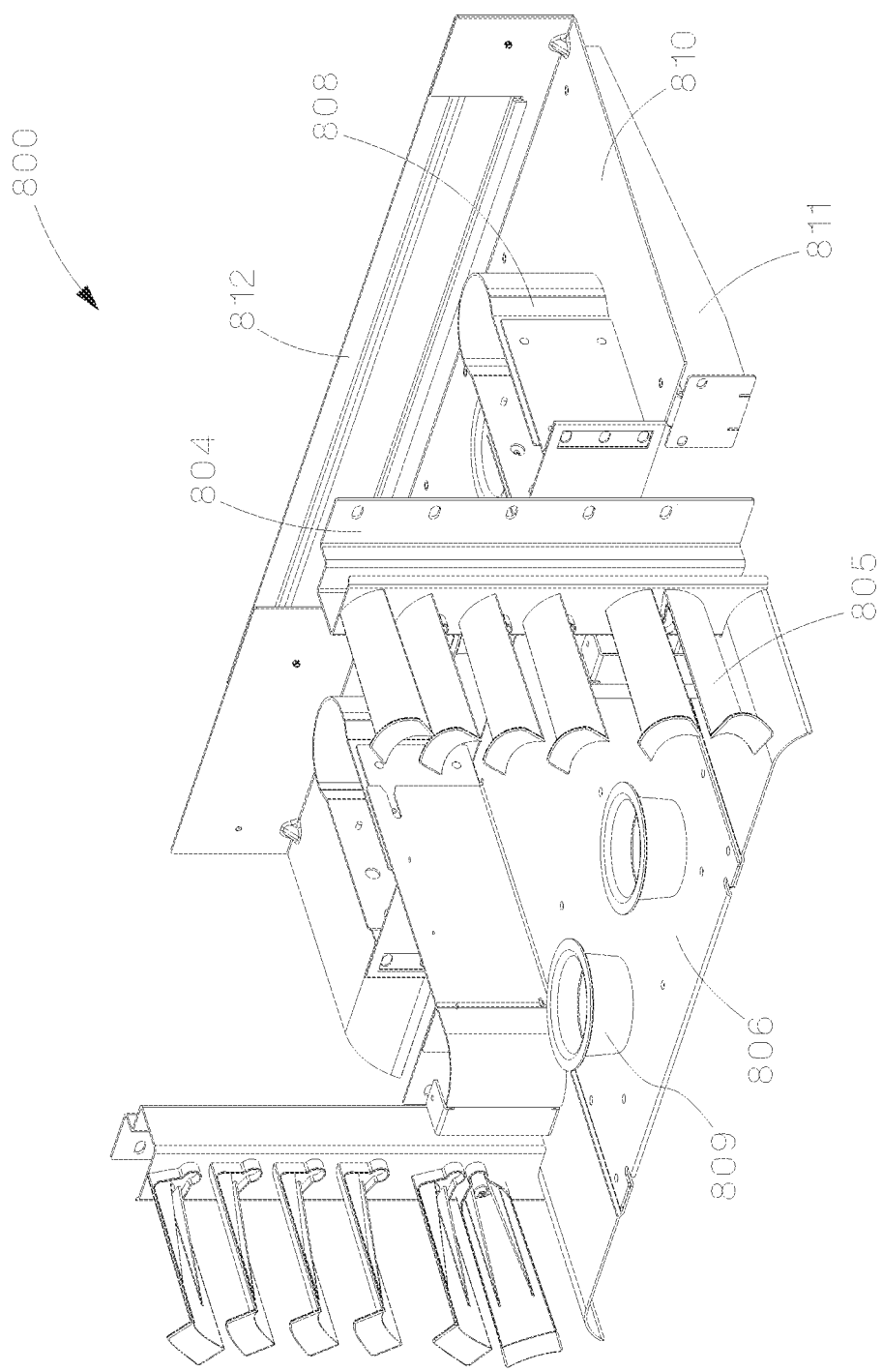
FIG. 49 is a perspective view of the pass-through cable manager.
Figure 50:
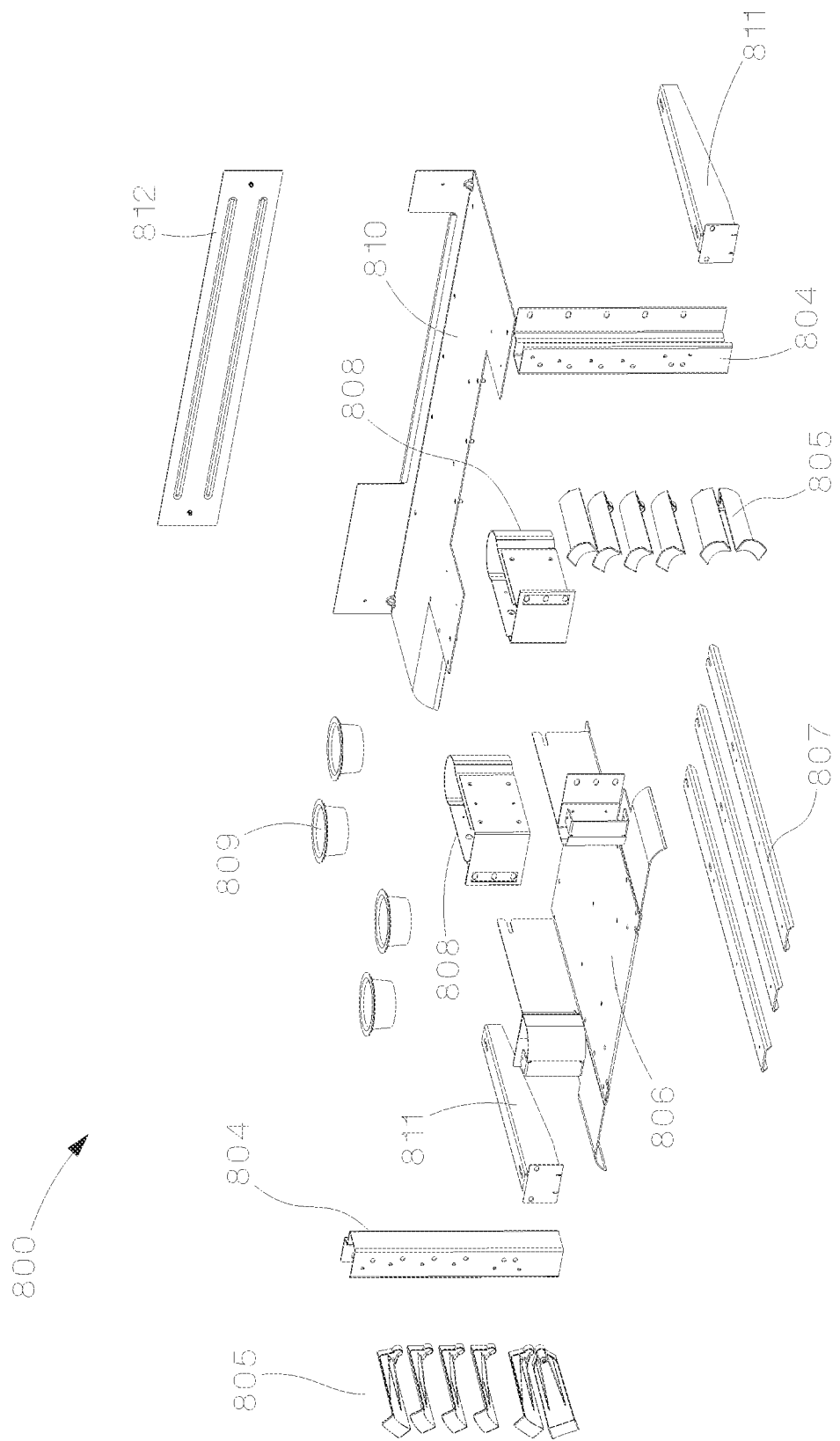
FIG. 50 is a perspective exploded view of the pass-through cable manager.

FIG. 49 shows the pass-through cable manager 800 including a pass-through shelf 806, spools 809 that are installed onto the pass-through shelf 806, a rear trough 810, a rear trough cover, rear trough supports 811 for holding up the rear trough 810, brackets 804, jumper manager fingers 805 configured to attach to the brackets 804 to provide cable routing, and rear bend radius supports 808 for routing cables on the rear trough 810. FIG. 50 is a perspective exploded view of the pass-through cable manager 800, that additionally provides a view of pass through supports 807 that are attached to an under-side of the pass-through shelf 806.

Figure 51:
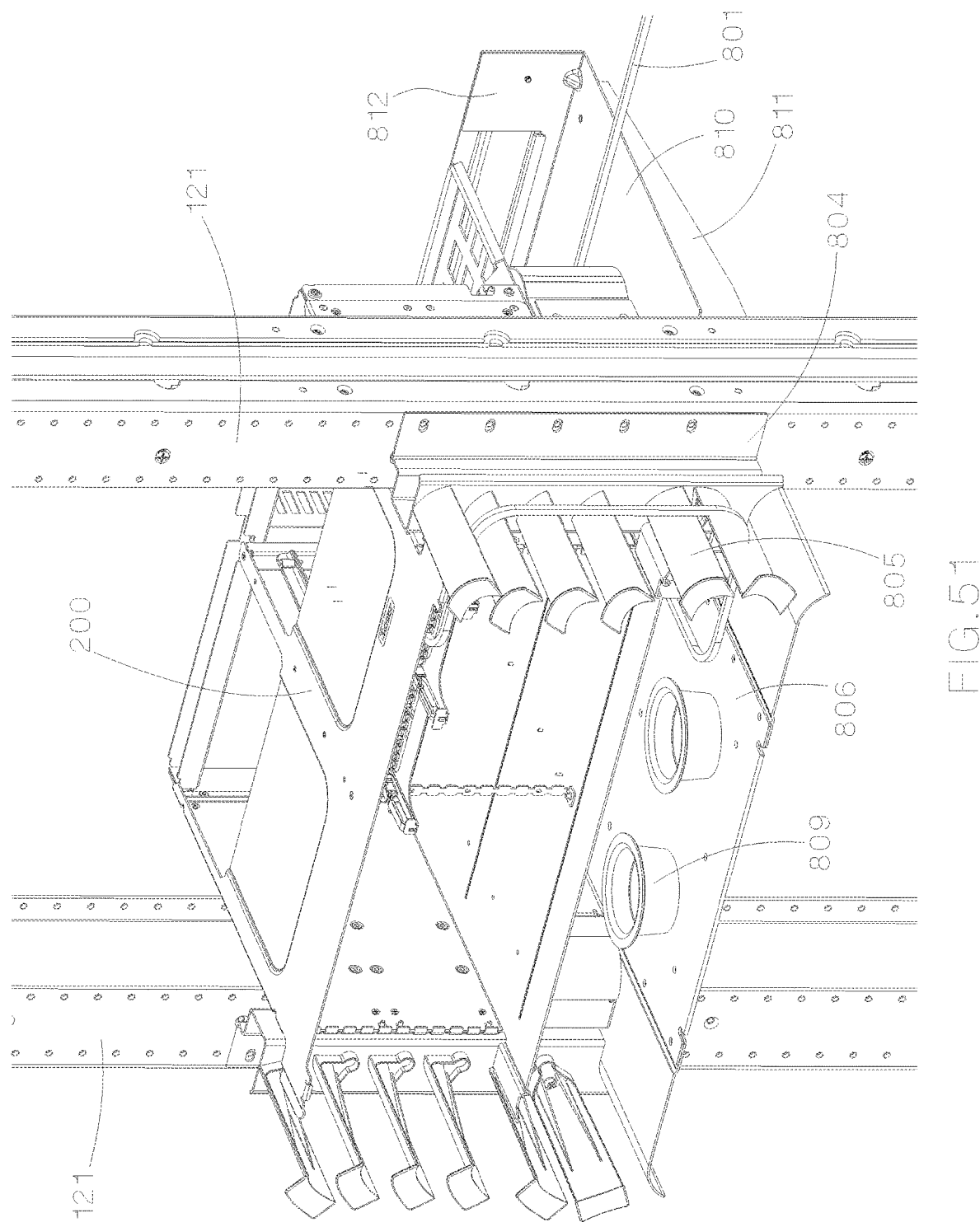
FIG. 51 is a close-up view of the pass-through cable manager installed onto the enclosure shown in FIG. 48.

FIG. 50 is a perspective close-up view of the pass-through cable manager 800 as it is installed under the enclosure 200. The pass-through cable manager 800 is secured to the rack posts 121 using the brackets 804. In this view, the cable 801 can been seen coming down from the enclosure 200, routed using the jumper manager fingers 805, down onto the pass-through shelf 806, and back to a rear side where the cables 801 are further routed away on the rear trough 810. As shown, the different jumper manager fingers 805 may be secured to the bracket 804 to be at different spaced locations and/or different relative angles to each other. Although not illustrated in FIG. 51 specifically, according to other embodiments the cables 801 may be further routed around the spools 809 that are installed on the pass-through shelf 806.

Figure 52:
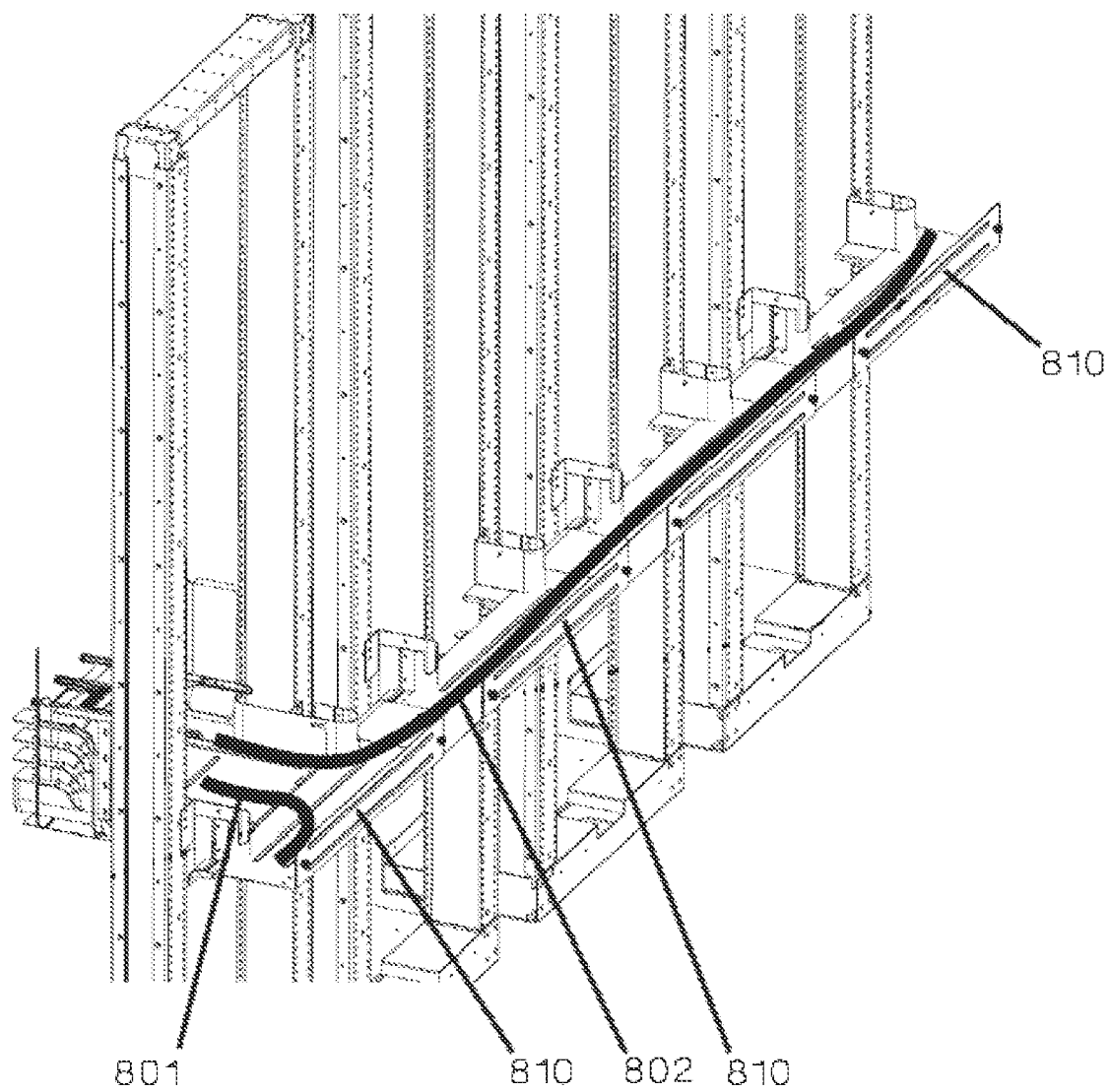
FIG. 52 is a perspective rear view of the pass-through cable manager installed onto the enclosure and the rear-side trunk passage formed by the pass-through cable manager.

FIG. 52 shows rear side view of three pass-through cable managers 800 installed adjacent to each other, to better show how a rear-side trunk passage can be created by the rear tough 810 for routing cable from the enclosure 200. When multiple pass-through cable managers 800 are installed adjacent to each other, the rear-side trunk passage that is formed can route cables 801, 802 in either direction within the overall cable management system 100.

Figure 53:
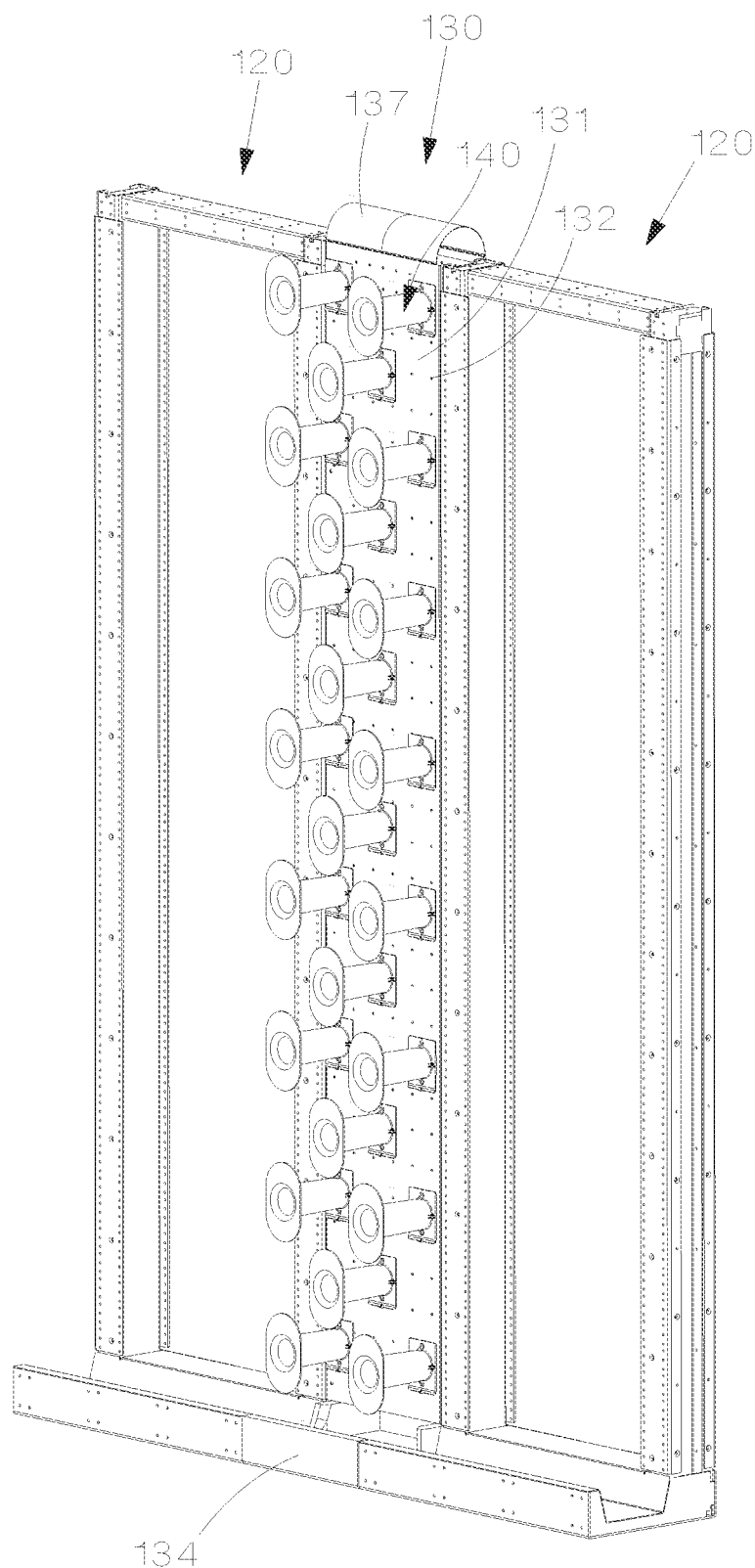
FIG. 53 is a perspective view of an exemplary vertical cable manager installed between two enclosure racks, according to some embodiments.

FIG. 53 shows the vertical cable manager system 130 having an enclosure rack system 120 attached to both sides. The vertical cable manager system 130 includes a vertical panel 131, a waterfall attachment 133 for bending cables over a top of the vertical panel 131, and a bottom base 136. The vertical panel 131 includes a plurality of holes 132 arranged in a predetermined pattern for securing one or more spools 140. Cables that are connected to either enclosure rack system 120 may be routed via the spools 140 on the vertical cable manager system 130. The spools 140 may be installed onto the vertical panel 131 in a predetermined pattern to enable organized routing of cables from the enclosure rack system 120 on the first side to the enclosure rack system 120 on the second side. For example, FIG. 63 shows the spools 140 positioned into unique cascading patterns on each of the vertical cable manager systems 130, so that there is minimal, or no, vertical and/or horizontal overlap.

Figure 54:
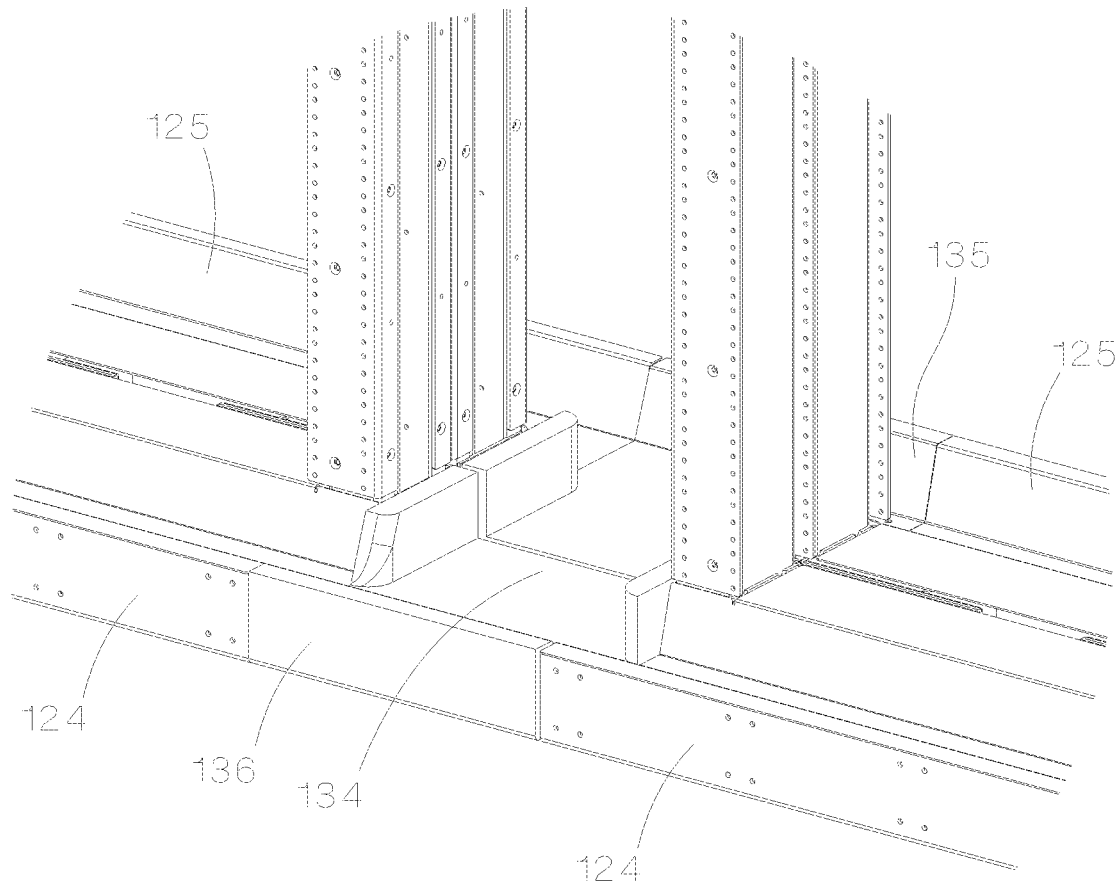
FIG. 54 is a close-up perspective view of a bottom trunk passage formed by the vertical cable manager and the enclosure racks shown in FIG. 53.

As shown in FIG. 54, when connecting the vertical cable manager system 130 to the enclosure rack system 120, the bottom base 136 form a trunk passage comprising a front trough pathway 124 and a pass-through 134 provided by the bottom base 136. The pass-through 134 provided by the bottom base 136 further offers a passage that connects the front trough pathway 124 to a rear trough pathway 125, 135.

Figure 55:
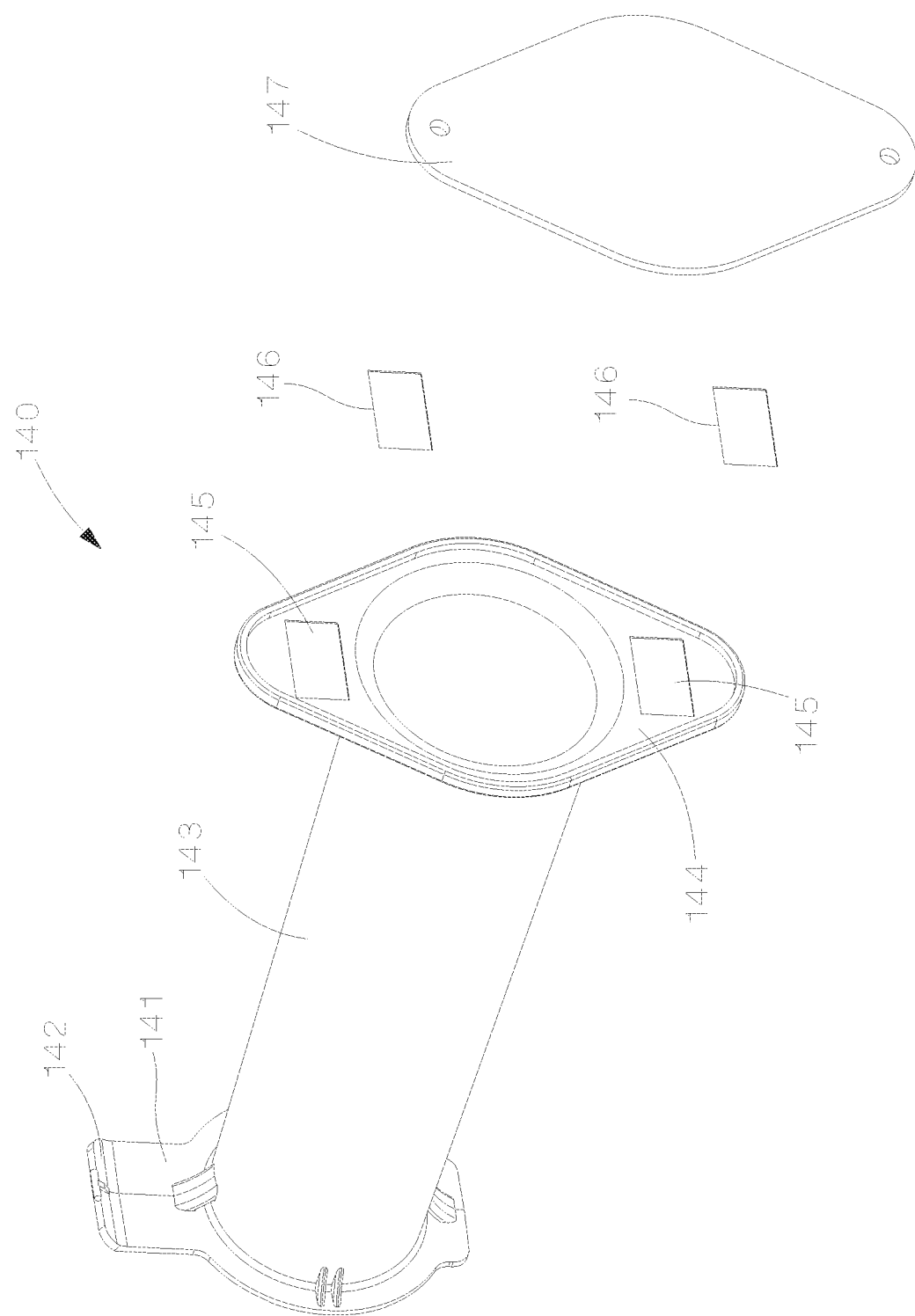
FIG. 55 is a perspective view of an exemplary spool for installing onto the vertical cable manager shown in FIG. 53, according to some embodiments.

FIG. 55 shows an exemplary spool 140 that includes a mounting plate 141 that includes a tab 142, a cylindrical body 143, and a front face 144 formed in a diamond shape. The front face 144 includes two recessed pockets 145 for attaching labels 146, and may further include a face plate 103 that covers the front face 144. FIG. 56 shows a rear side of the mounting plate 141 to further illustrate mounting features used to secure the spool 140 to the vertical panel 131 via one or more holes 132. The mounting features include a protrusion 148 for fitting into a hole 132, and two hooks 149 for latching into respective holes 132. FIG. 57 shows a side view of the spool 140 to better provide dimensional measurements. For example, a height hi of the front face 144 is approximately 5.7 inches, and a height $h_2$ from the cylindrical body 143 to a top of the front face 144 is approximately 1.5 inches. Cables are intended to rest on the cylindrical body 143, and the front face 144 is used to prevent the cables from falling off the front of the spools 140.

Figure 58:
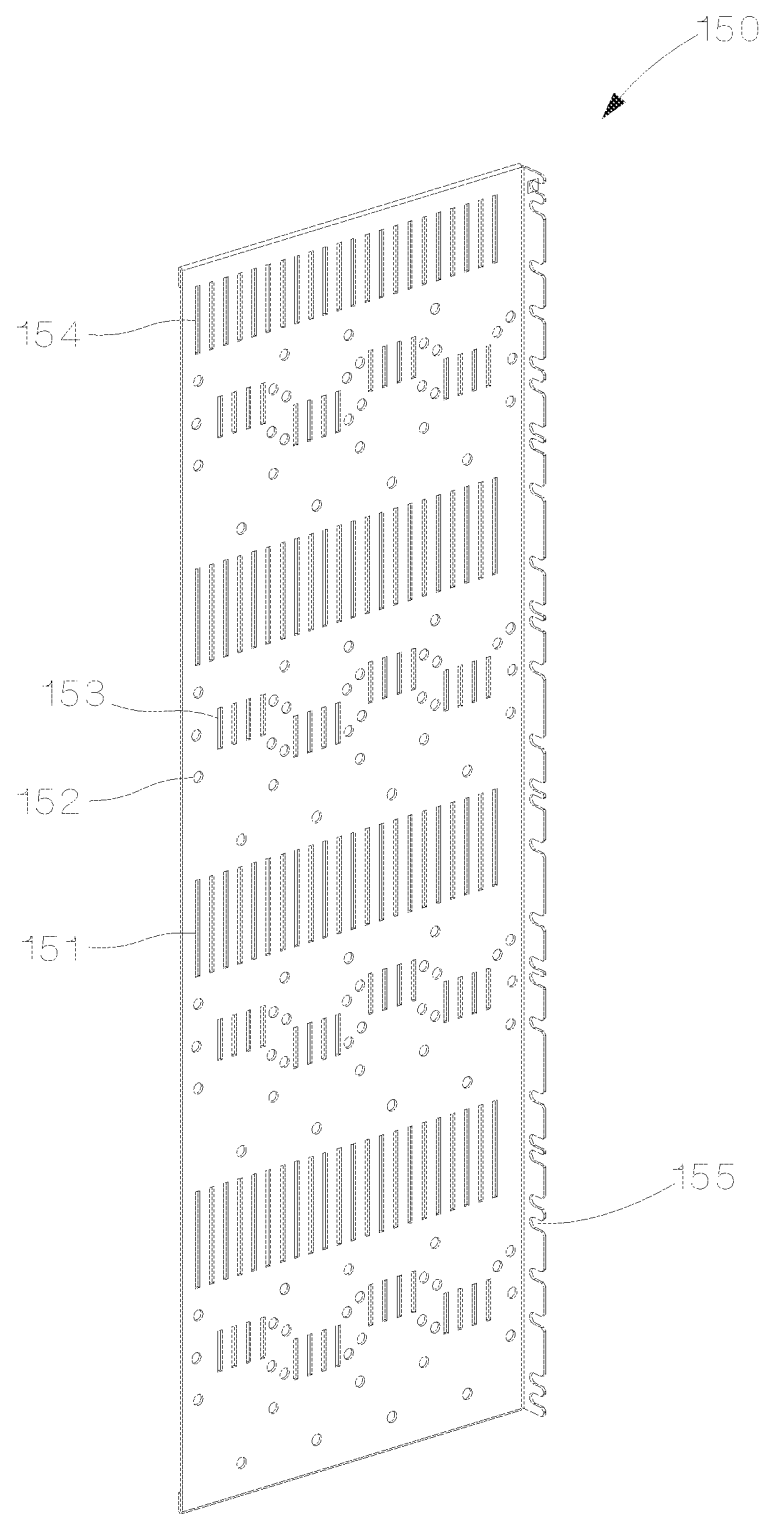
FIG. 58 is a perspective view of a cable plate for securing onto the incoming cable management system shown in FIG. 3, according to some embodiments.

FIG. 58 shows the cable plate 150 that may be installed onto the vertical panel 111 at fixed locations, via the holes 112, of the incoming cable management system 110. The cable plate 150 includes a plurality of different openings for securing different cable management accessories for managing incoming trunk cables such as anchor kits 16, tubing brackets 18, and transition holders 62. The openings include different sized slits (e.g., large slits 151, medium slits 154, small slits 153), and holes 152 that may be arranged into predetermined patterns. The cable plate 150 also includes mounting slots 155 for attaching fasteners used to secure the cable plate 150 to the holes 112 in the vertical panel 111.

Figure 59:
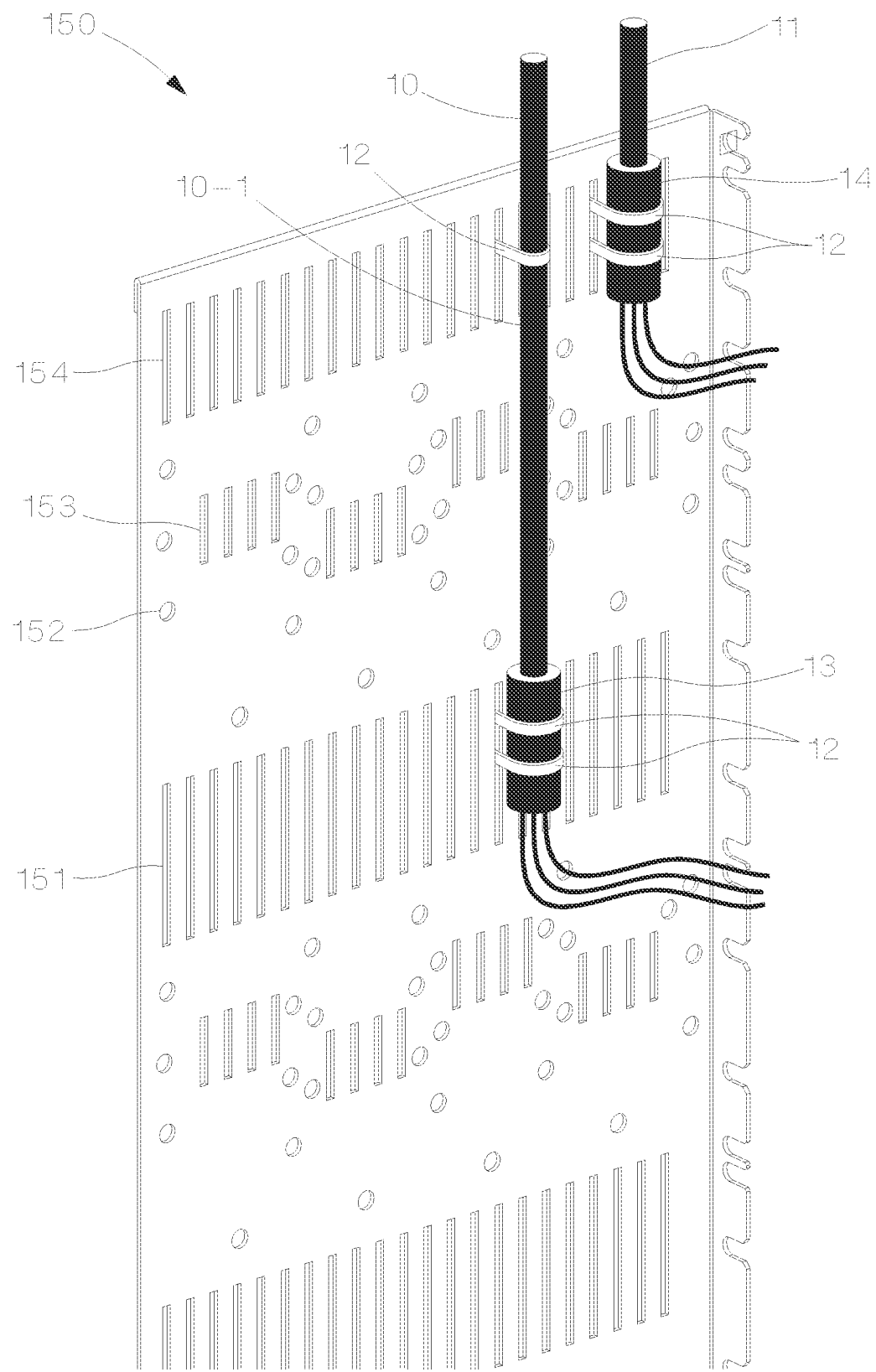
FIG. 59 is a perspective partial view of the cable plate having cables secured via exemplary cable securing components, according to some embodiments.

FIG. 59 shows an exemplary embodiment where cables 10, 11 (e.g., trunk cables) and components are secured to the cable plate 150. An outer jacket 10-1 of the cable 10 may be secured to the cable plate 150 via the medium slits 154 using a cable tie 12. A transition point 13 to the cable 10 is an end piece to the cable 10 that is secured to the cable plate 150 via the large slit 151 using a plurality of cable ties 12. Another cable 11 is shown to have a corresponding transition point 14 secured to the cable plate 150 via the medium slit 154 using a plurality of cable ties 12. The transition points 13, 14 are representative of and end piece to a trunk cable coming into the cable management system 100 where the outer jacket of the trunk cable is terminated and secured into place using epoxy or other similar material for securing internal cables in place. Then the multi-fiber cables that are included in the trunk cables are fanned out into their own individual furcation tubes as they exit the transition point, where each furcation tube is their own fiber optic cable having a predetermined number of fibers (e.g., 12 fibers) for being routed to the enclosures and cassettes in the enclosure rack systems 120.

Figure 60:
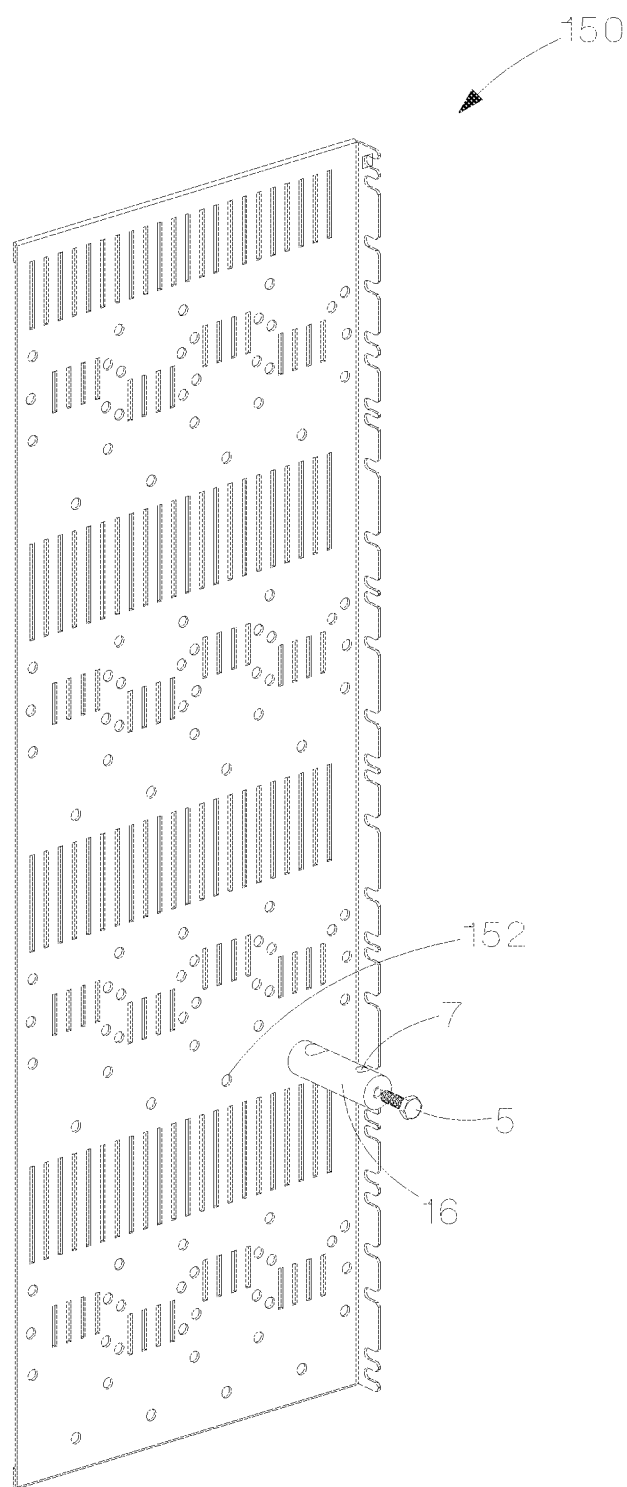
FIG. 60 is a perspective view of the cable plate including an exemplary cable securing component secured, according to some embodiments.

FIG. 60 shows an exemplary anchor kit 16 that secures onto the cable plate 150 via a hole 152, where the anchor kit 16 is configured to receive and stabilize a central strength member 15 from a cable (see e.g., FIG. 60). The central strength member 15 may be a fiberglass rod located in the center of the fiber optic cable 10, which provides rigidity and robustness to the overall cable construction.

Figure 61:
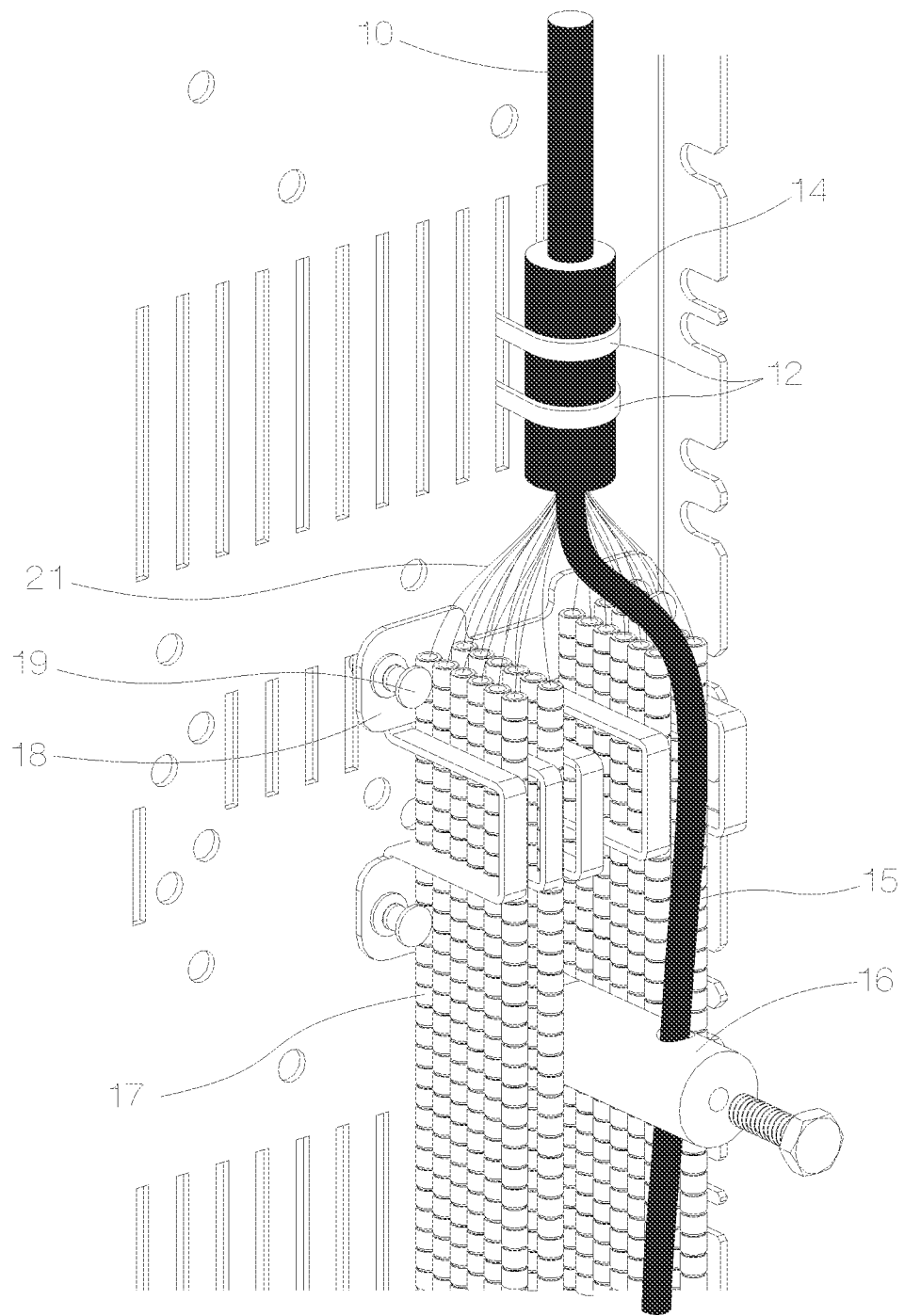
FIG. 61 is a perspective partial view of the cable plate including exemplary cable securing components secured, according to some embodiments.

FIG. 61 shows an exemplary fiber breakout assembly coming from the cable 10 and when using the cable plate 150. The outer jacket 10-1 of the cable 10 is directly secured to the cable plate 150 using cable ties 12 and the large slits 151 at the transition point 14. At this transition point, the cable 10 is transitioned to partition the individual multi-fiber cables into the breakout fan assembly before being inserted into breakout tubing 17, where the breakout tubing is held into a tubing bracket 18 that is secured to the cable plate 150 using plungers/grommets 19 inserted into the small slits 153 and holes 152. From the transition point 14 also comes out the central strength member 15 from the cable 10, where the central strength member 15 is inserted through an opening 7 in the anchor kit 16. A screw 5 is then tightened to secure the central strength member 15 to the anchor kit 16, which provides stability and limits movement of the central strength member 15 after installation.

Figure 62:
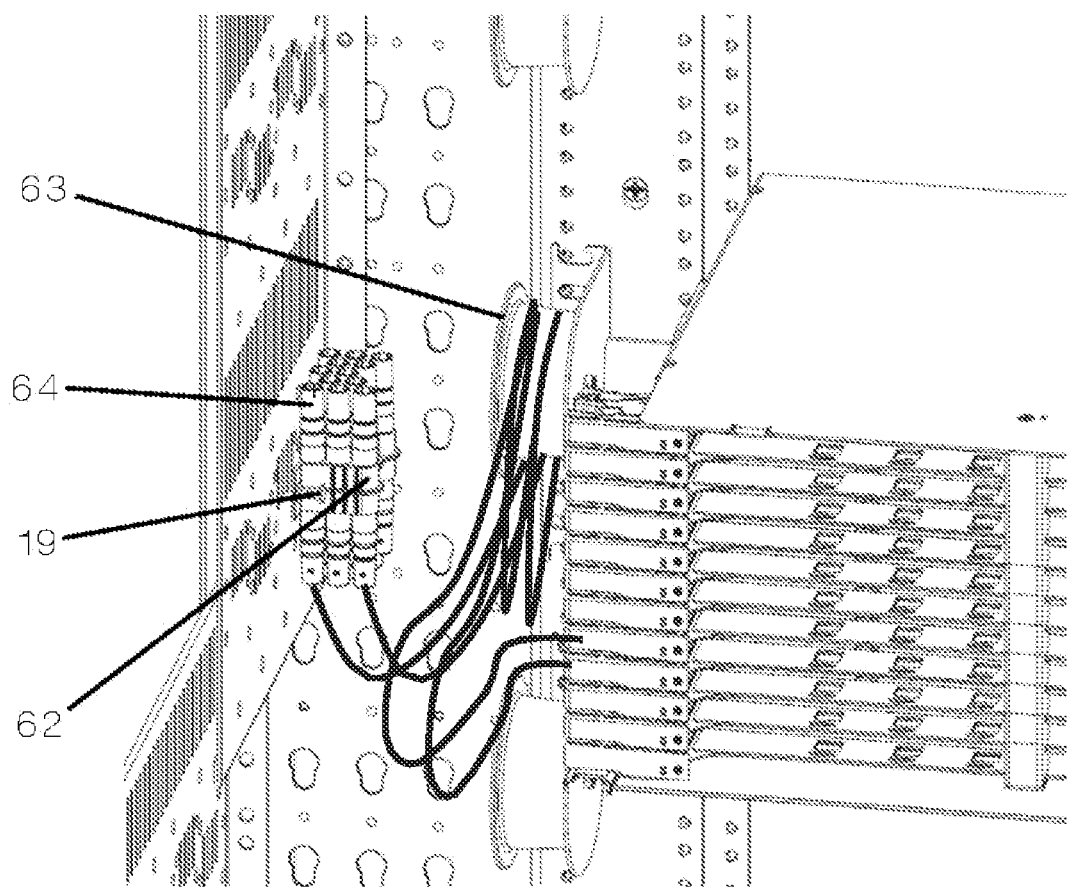
FIG. 62 is a perspective partial view of the cable plate secured to an enclosure rack as shown in FIG. 1, according to some embodiments.

FIG. 62 shows another exemplary arrangement where a transition holder 62 (e.g., Panduit's HD Flex transition) is secured to the cable plate 150 by inserting the plungers/grommets 19 into the openings in the cable plate 150. The transition holder 62 is designed to hold a plurality of transitions 64. Spool brackets 63 attached to the rack post 121 are positioned to receive cables from the transitions 64 and take up any excess cable length (i.e., cable slack) for the cables that are routed to the enclosure mounted on the rack post 121.

As shown in FIGS. 1 and 3, the enclosure rack system 120 is provided to install up to eleven (11) 4 RU sized enclosures 200, 300 when fully populated. FIGS. 1 and 3 further show that in addition to the larger sized cable plate 150 described thus far, the incoming cable management system 110 may also include a smaller sized cable plate 160. The smaller sized cable plate 160 is functionally the same, having the same features as the larger sized cable plate 150, but just having smaller height dimensions. According to an exemplary embodiment, the larger sized cable plate 150 may be configured to enable ingress/egress cable management routing for up to four (4) of the enclosures 200, 300 installed onto the enclosure rack system 120 (e.g., consecutive enclosures), while the smaller cable plate 160 may be configured to enable ingress/egress cable management routing for up to three (3) of the enclosures 200, 300 installed onto the enclosure rack system 120 (e.g., consecutive enclosures). Different sized cable plates for enabling ingress/egress cable management routing for different number of enclosures may be provided according to other embodiments.

Figure 64:
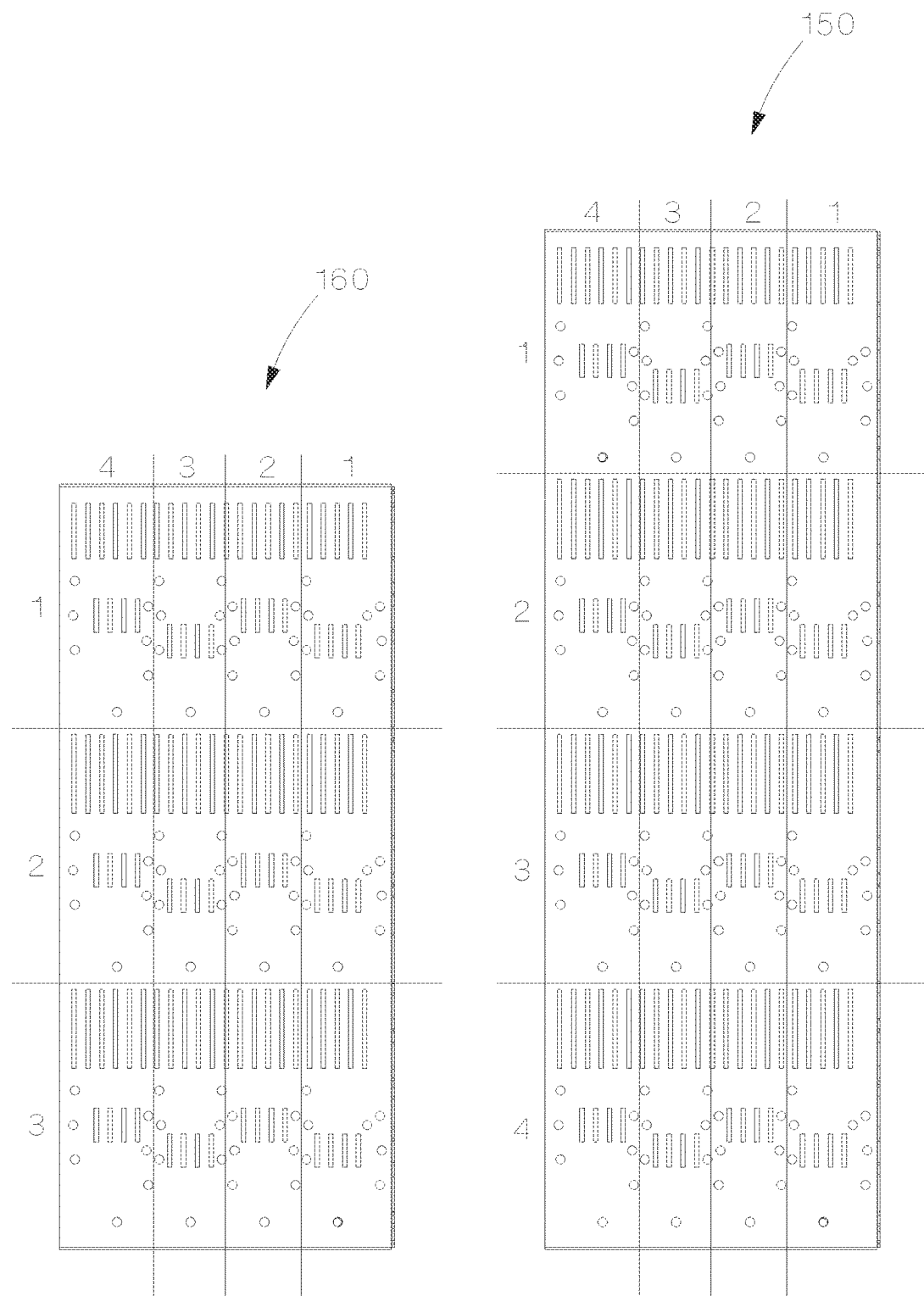
FIG. 64 is a front view of a two different sized cable plates, according to some embodiments.

In an effort to provide enhanced organization features, the surface area of the cable plates 150, 160 may be partitioned to be dedicated to a specific enclosure that is installed onto the enclosure rack system 120. FIG. 64 shows the cable plates 150, 160 having partition lines overlayed to show exemplary areas that are dedicated to receive cables for ingress/egress to specific enclosures. Each row outlined onto the cable plates 150, 160 is representative of a different dedicated enclosure. So for cable plate 160, row 1 includes areas (row-column) 1-1, 1-2, 1-3, and 1-4 that are dedicated to a first enclosure, row 2 includes areas 2-1, 2-2, 2-3, and 2-4 that are dedicated to a second enclosure, and row 3 includes areas 3-1, 3-2, 3-3, and 3-4 that are dedicated to a third enclosure. For cable plate 150, row 1 includes areas (row-column) 1-1, 1-2, 1-3, and 1-4 that are dedicated to a first enclosure, row 2 includes areas 2-1, 2-2, 2-3, and 2-4 that are dedicated to a second enclosure, row 3 includes areas 3-1, 3-2, 3-3, and 3-4 that are dedicated to a third enclosure, and row 4 includes areas 4-1, 4-2, 4-3, and 4-4 that are dedicated to a fourth enclosure.

Figure 65:
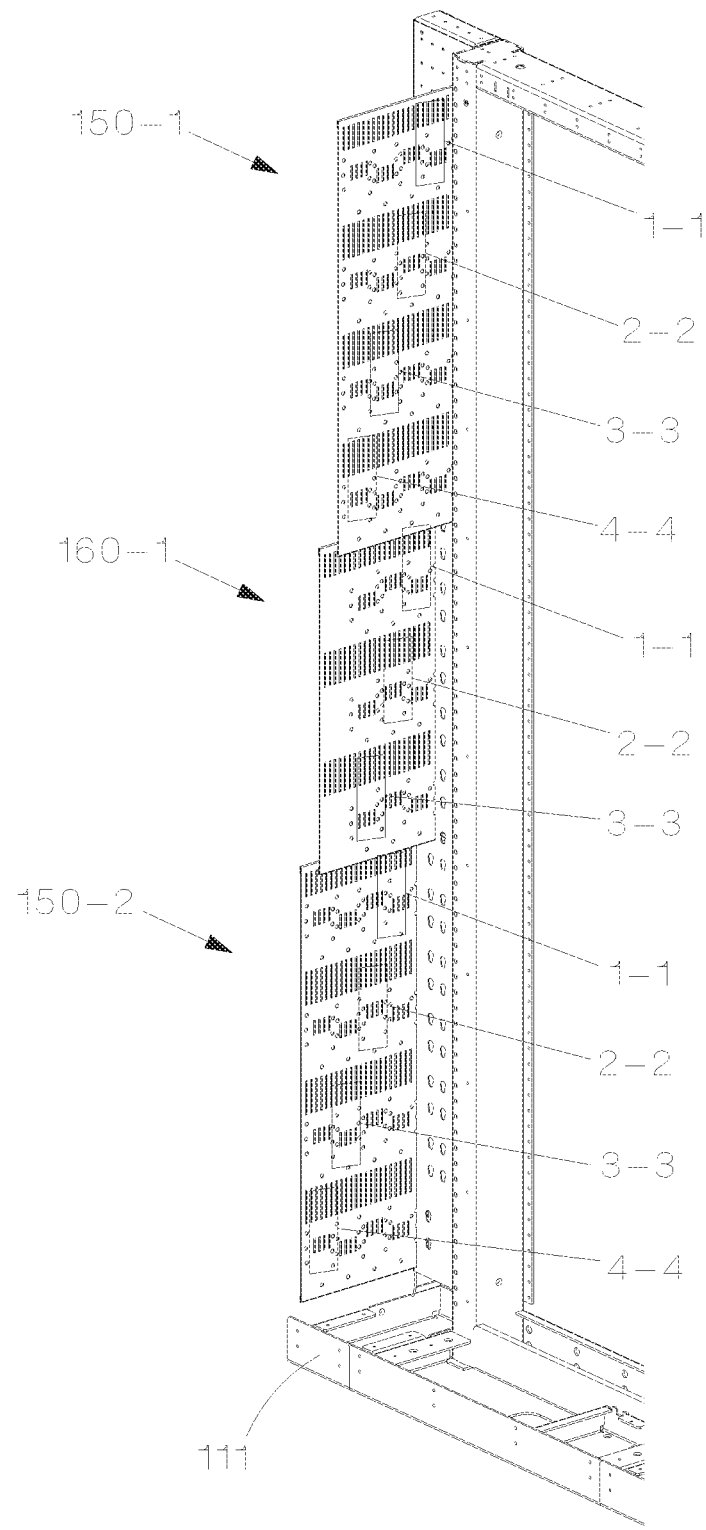
FIG. 65 is a front perspective view of an incoming cable management system including a pattern of cable plates, according to some embodiments.

FIG. 65 shows an exemplary arrangement of cable plates 150-1, 150-2, 160-1 installed onto the vertical panel 111 for managing cable ingress/egress for up to eleven (11) enclosures installed onto the enclosure rack system 120. Like the pattern shown in FIGS. 1 and 3, the cable plates 150, 160 themselves are installed in a cascading pattern from each other. Now within each of the cable plates 150-1, 150-2, 160-1, this exemplary arrangement provides a dedicated area on each of the cable plates 150-1, 150-2, 160-1 for managing cables going to dedicated enclosures. For example, on the first large cable plate 150-1 an area 1-1 is dedicated for managing cables to a first enclosure, an area 2-2 is dedicated for managing cables to a second enclosure, a third area 3-3 is dedicated for managing cables to a third enclosure, and an area 4-4 is dedicated for managing cables to a fourth enclosure. On the first small cable plate 160-1 an area 1-1 is dedicated for managing cables to a fifth enclosure, an area 2-2 is dedicated for managing cables to a sixth enclosure, and a third area 3-3 is dedicated for managing cables to a seventh enclosure. On the second large cable plate 150-2 an area 1-1 is dedicated for managing cables to an eighth enclosure, an area 2-2 is dedicated for managing cables to a ninth enclosure, a third area 3-3 is dedicated for managing cables to a tenth enclosure, and an area 4-4 is dedicated for managing cables to an eleventh enclosure. Each of the areas within the individual cables plates 150-1, 150-2, 160-1 is shown to be in a cascading pattern according to the areas described in FIG. 64, which enables little to no overlap in the adjacent areas to maximize organization of cables that are ingressing/egressing to the enclosures.

While the particular preferred embodiments described herein have been shown and described, it will be obvious to those skilled in the art that changes, and modifications, may be made without departing from the teaching of the embodied features described in this disclosure. The matter set forth in the foregoing description and accompanying drawings is offered by way of illustration only and not as limitation. The actual scope of the disclosure is intended to be defined in the following claims when viewed in their proper perspective.

What is claimed is:

1. A cable management system comprising:
   a rack;
   an enclosure configured to be installed onto the rack;
   a vertical cable manager configured to be secured to a first side of the rack, the vertical cable manager comprising:
   a first vertical panel including a plurality of apertures arranged in a predetermined pattern;
   a plurality of first management features, each of the plurality of first management features configured to be attached to the first vertical panel via at least one of the plurality of apertures, and wherein the plurality of first management features are configured to be arranged in a predetermined cascading pattern in which each of the plurality of first management features is offset from a neighboring one of the plurality of first management features in both a vertical and horizontal direction on the first vertical panel; and
   an incoming cable manager configured to be secured to a second side of the rack, the incoming cable manager comprising:
   a second vertical panel including a plurality of openings arranged in a predetermined pattern; and
   a plurality of second management features, each of the plurality of second management features configured to be attached to the second vertical panel via at least one of the openings, and wherein the plurality of second management features are configured to be arranged in a predetermined cascading pattern in which each of the plurality of second management features is offset from a neighboring one of the plurality of second management features in both a vertical and horizontal direction on the second vertical panel.

2. The cable management system of claim 1, wherein at least one of the plurality of first management features is a spool configured to be removably secured to the first vertical panel according to the predetermined pattern included in the first vertical panel.

3. The cable management system of claim 2, the spool including a face plate configured to attach to the spool, and wherein the face plate is configured to receive a label.

4. The cable management system of claim 2, the spool including at least two locking buttons for attaching the spool to the first vertical panel and a release tab for detaching the spool from the first vertical panel.

5. The cable management system of claim 1, wherein at least one of the plurality of second management features is a cable plate comprising a plurality of rectangular slits and a plurality of clearance holes.

6. The cable management system of claim 5, wherein the cable plate is configured to secure an anchor kit via a clearance hole.

7. The cable management system of claim 5, wherein the cable plate is configured to secure a tubing bracket via at least two of the rectangular slits, the tubing bracket configured to hold at least one breakout tubing.

8. The cable management system of claim 1, wherein at least one of the plurality of second management features is a cable plate configured to be secured to the second vertical panel according to the predetermined pattern included in the second vertical panel.

9. The cable management system of claim 8, wherein the cable plate is partitioned into a plurality of distinct areas.

* * * * *